(12) United States Patent
Molina et al.

(10) Patent No.: US 11,563,703 B2
(45) Date of Patent: *Jan. 24, 2023

(54) MESSAGING SYSTEM AND METHOD

(71) Applicant: Trenda Innovations, Inc., Glendale, CA (US)

(72) Inventors: Miguel A. Molina, Orange, CA (US); Maro Burunsuzyan, Los Angeles, CA (US); Andrew Taylor, Plano, TX (US)

(73) Assignee: Trenda Innovations, Inc., Glendale, CA (US)

( * ) Notice: Subject to any disclaimer, the term of this patent is extended or adjusted under 35 U.S.C. 154(b) by 552 days.

This patent is subject to a terminal disclaimer.

(21) Appl. No.: 14/874,415

(22) Filed: Oct. 3, 2015

(65) Prior Publication Data
US 2017/0099243 A1 Apr. 6, 2017
US 2019/0268291 A9 Aug. 29, 2019

Related U.S. Application Data

(63) Continuation of application No. 13/669,351, filed on Nov. 5, 2012, now Pat. No. 9,154,456.

(51) Int. Cl.
*H04L 41/22* (2022.01)
*H04L 51/00* (2022.01)
(Continued)

(52) U.S. Cl.
CPC .............. *H04L 51/12* (2013.01); *H04L 41/22* (2013.01); *H04L 51/10* (2013.01); *H04L 51/34* (2013.01); *H04L 51/36* (2013.01)

(58) Field of Classification Search
CPC ......... H04L 41/22; H04L 51/12; H04L 51/36; H04L 51/10; H04L 51/34
See application file for complete search history.

(56) References Cited

U.S. PATENT DOCUMENTS 5,696,596 A 12/1997 Kumar
6,161,142 A 12/2000 Wolfe et al.
(Continued)

FOREIGN PATENT DOCUMENTS

WO  WO2011055013 A1  5/2011

OTHER PUBLICATIONS

PCT/US2013/036952: 1. Chapter II: International Preliminary Report on Patentablity ; dated Apr. 15, 2014 2. Initial Publication and ISR dated Oct. 24, 2013.
(Continued)

*Primary Examiner* — Gil H. Lee
(74) *Attorney, Agent, or Firm* — Antonio Papageorgiou; Lombard & Geliebter LLP

(57) ABSTRACT

A messaging system, comprising an electronic message having integrated digital content that is scripted by seamless linking of multiplicity of electronic media components. An electronic media component is comprised of a compilation of one or more electronic media element, with an electronic media element comprised of one or more data. Communication protocols for delivery and receipt of the electronic message is used, with the multiplicity of electronic media components of a received electronic message seamlessly executed in an order, arrangement, and sequence intended by the scripted digital content at one of a first and second client-device.

15 Claims, 57 Drawing Sheets

(51) Int. Cl.
*H04L 51/234* (2022.01)
*H04L 51/10* (2022.01)
*H04L 51/56* (2022.01)

(56) References Cited

U.S. PATENT DOCUMENTS

| | | | |
|---|---|---|---|
| 6,345,279 B1 | 2/2002 | Li et al. | |
| 6,393,107 B1 | 5/2002 | Ball et al. | |
| 6,580,784 B2 | 6/2003 | Rodriguez et al. | |
| 6,950,875 B1 | 9/2005 | Slaughter et al. | |
| 7,149,755 B2 | 12/2006 | Obrador | |
| 7,181,538 B2 | 2/2007 | Tam et al. | |
| 7,280,133 B2 | 10/2007 | Lord | |
| 7,852,992 B1 | 12/2010 | Edamadaka et al. | |
| 7,865,394 B1 | 1/2011 | Calloway et al. | |
| 8,065,616 B2* | 11/2011 | Maaniitty | G06F 3/0484 |
| | | | 715/727 |
| 8,078,202 B1 | 12/2011 | Narayanachar | |
| 8,185,096 B2 | 5/2012 | Smith et al. | |
| 8,442,997 B2 | 5/2013 | Tipper et al. | |
| 9,100,221 B2 | 8/2015 | Appelman et al. | |
| 9,113,315 B2 | 8/2015 | Talwar et al. | |
| 9,154,456 B2* | 10/2015 | Molina | H04L 51/34 |
| 9,203,794 B2 | 12/2015 | Appelman et al. | |
| 9,338,123 B2 | 5/2016 | Frazier et al. | |
| 9,354,868 B2 | 5/2016 | Deluca et al. | |
| 9,356,905 B2 | 5/2016 | Malik et al. | |
| 9,363,147 B1 | 6/2016 | Quillen et al. | |
| 9,363,213 B2 | 6/2016 | Berstein et al. | |
| 9,385,983 B1 | 7/2016 | Sehn | |
| 9,519,644 B2 | 12/2016 | Snibbe et al. | |
| 9,608,949 B2 | 3/2017 | Skyrm et al. | |
| 9,619,129 B2 | 4/2017 | Herold | |
| 9,619,575 B2 | 4/2017 | Isaacs et al. | |
| 9,621,489 B2 | 4/2017 | Carey et al. | |
| 9,628,431 B2 | 4/2017 | Bernstein et al. | |
| 9,661,076 B2 | 5/2017 | Tseng | |
| 9,661,106 B2 | 5/2017 | Krieger et al. | |
| 9,684,935 B2 | 6/2017 | Matas | |
| 9,691,126 B2 | 6/2017 | Karpenko | |
| 9,692,814 B2 | 6/2017 | Sidhu et al. | |
| 9,904,730 B2* | 2/2018 | Coburn, IV | G11B 27/105 |
| 2005/0266884 A1* | 12/2005 | Marriott | H04L 51/066 |
| | | | 455/558 |
| 2006/0053468 A1 | 3/2006 | Sudoh et al. | |
| 2006/0092942 A1* | 5/2006 | Newson | H04L 29/06 |
| | | | 370/392 |
| 2006/0141923 A1 | 6/2006 | Goss | |
| 2006/0168064 A1* | 7/2006 | Huynh | G06Q 10/107 |
| | | | 709/206 |
| 2007/0066284 A1 | 3/2007 | Gatzke et al. | |
| 2007/0190978 A1 | 8/2007 | White et al. | |
| 2008/0039124 A1* | 2/2008 | Linder | H04M 1/72544 |
| | | | 455/466 |
| 2008/0176590 A1 | 8/2008 | Hsu | |
| 2008/0189395 A1 | 8/2008 | Stremel et al. | |
| 2008/0248788 A1 | 10/2008 | Smith et al. | |
| 2008/0295130 A1 | 11/2008 | Worthen | |
| 2009/0177673 A1 | 7/2009 | Cunningham | |
| 2009/0316692 A1 | 12/2009 | Trapp et al. | |
| 2010/0185776 A1 | 7/2010 | Hosur et al. | |
| 2011/0066940 A1 | 3/2011 | Asghari Kamrani et al. | |
| 2011/0093794 A1 | 4/2011 | Grace | |
| 2011/0300833 A1 | 12/2011 | Shaw | |
| 2012/0021785 A1 | 1/2012 | Weinrib | |
| 2013/0275525 A1* | 10/2013 | Molina | H04L 51/10 |
| | | | 709/206 |
| 2015/0134757 A1 | 5/2015 | Crawford | |
| 2015/0277691 A1 | 10/2015 | Matas | |
| 2015/0341303 A1 | 11/2015 | Lu | |
| 2015/0358275 A1 | 12/2015 | Talwar et al. | |
| 2016/0014070 A1 | 1/2016 | Adkins | |
| 2016/0021337 A1 | 1/2016 | Enete et al. | |
| 2016/0078404 A1 | 3/2016 | O'Shaugnessy et al. | |
| 2016/0080304 A1 | 3/2016 | Hamlin et al. | |
| 2016/0156574 A1 | 6/2016 | Hum et al. | |
| 2016/0219006 A1 | 7/2016 | Yuen et al. | |
| 2016/0277903 A1 | 9/2016 | Poosala et al. | |
| 2016/0284011 A1 | 9/2016 | Dong et al. | |
| 2016/0285808 A1 | 9/2016 | Franklin et al. | |
| 2016/0299658 A1 | 10/2016 | Langholz et al. | |
| 2016/0328360 A1 | 11/2016 | Pavlovskaia et al. | |
| 2017/0019446 A1 | 1/2017 | Son et al. | |
| 2017/0068579 A1 | 3/2017 | Franklin et al. | |
| 2017/0085599 A1 | 3/2017 | Roche et al. | |
| 2017/0100669 A1 | 4/2017 | Blayer et al. | |
| 2017/0140214 A1 | 5/2017 | Matas et al. | |
| 2017/0149727 A1 | 5/2017 | Wang et al. | |
| 2017/0154014 A1 | 6/2017 | Arnold et al. | |
| 2017/0180222 A1 | 6/2017 | Eilat et al. | |
| 2017/0180299 A1 | 6/2017 | Garza | |
| 2017/0195276 A1 | 7/2017 | Systrom et al. | |
| 2017/0201575 A1 | 7/2017 | Song et al. | |

OTHER PUBLICATIONS

PCT/US2013/036952: 3. International Search Report (ISR) dated Jun. 28, 2013 4. Search Strategy dated Jun. 28, 2013 5. Written Opinion dated Jun. 28, 2013.

* cited by examiner

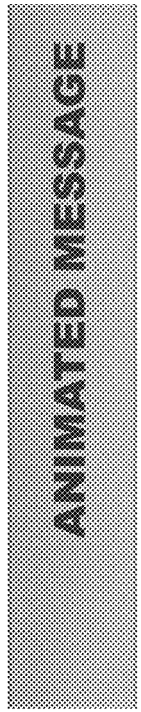
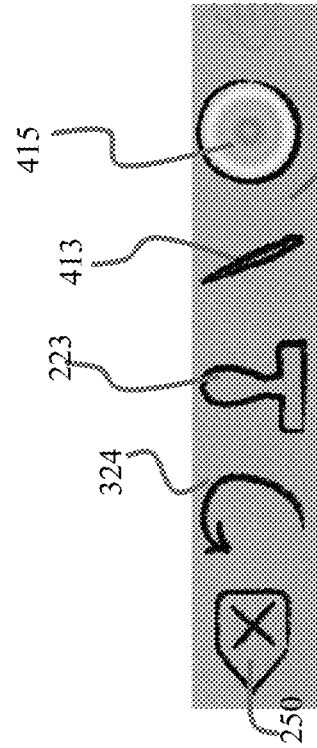
FIG. 4J-2
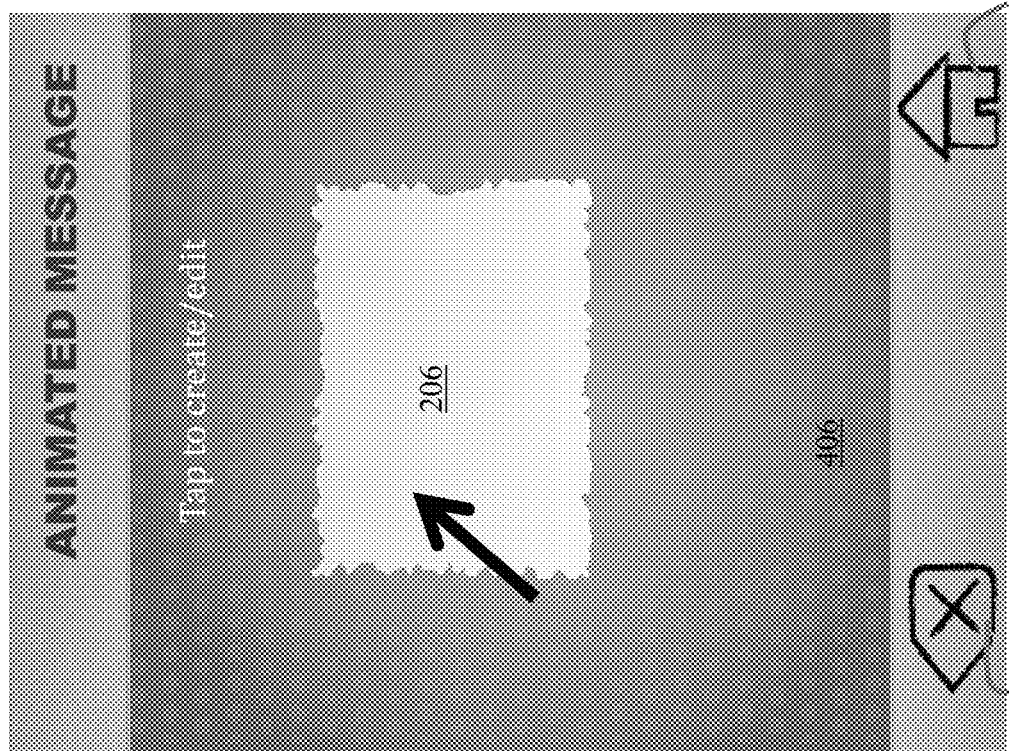
FIG. 4J-1

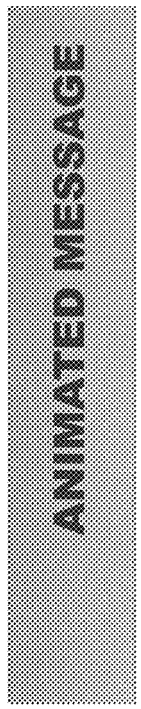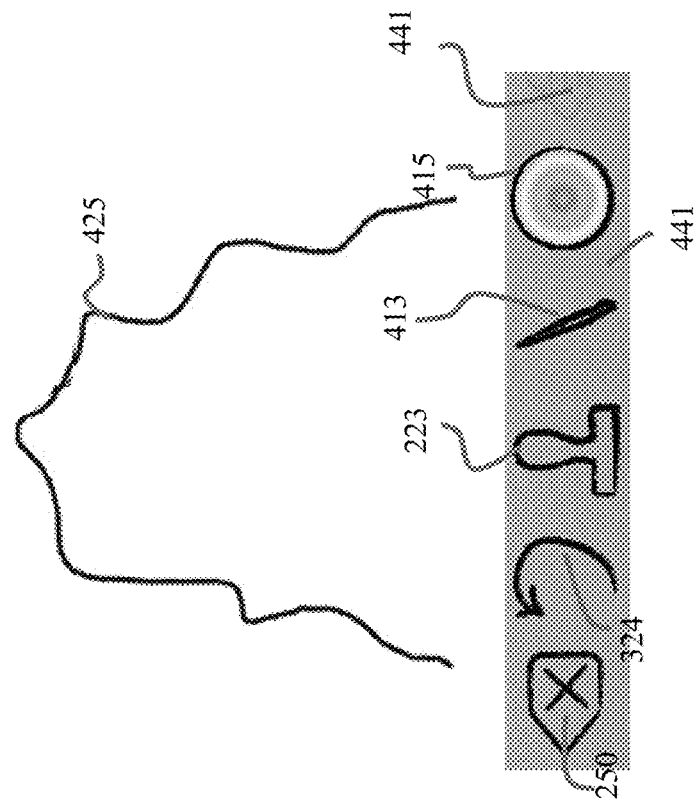
FIG. 4J-4
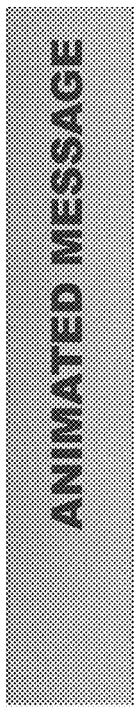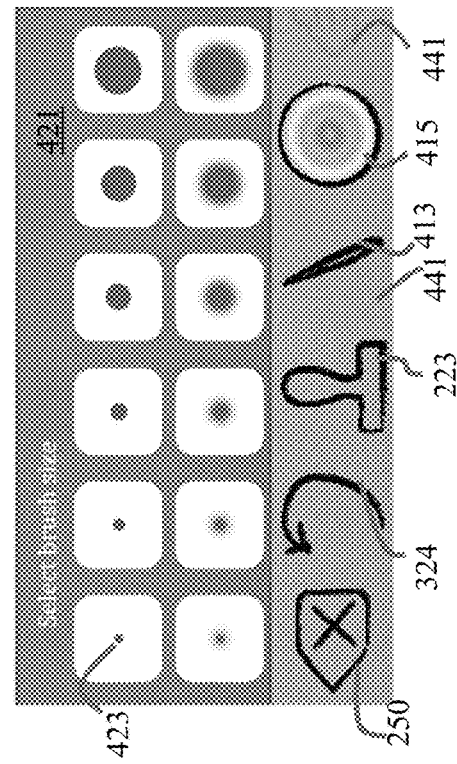
FIG. 4J-3

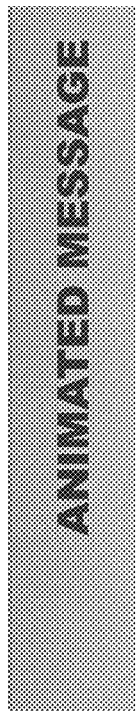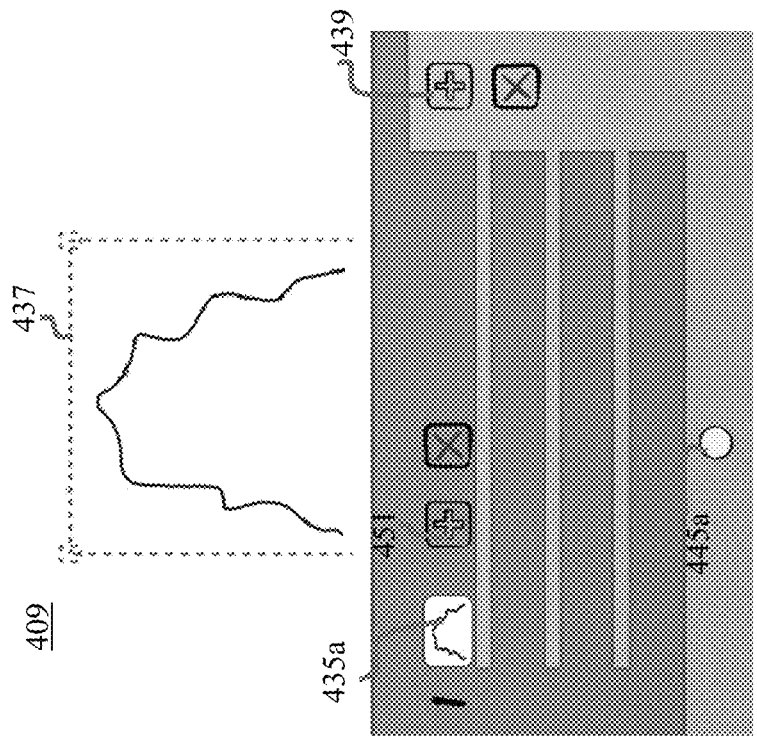
FIG. 4J-6
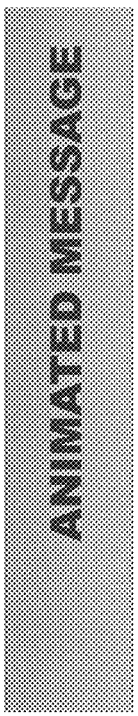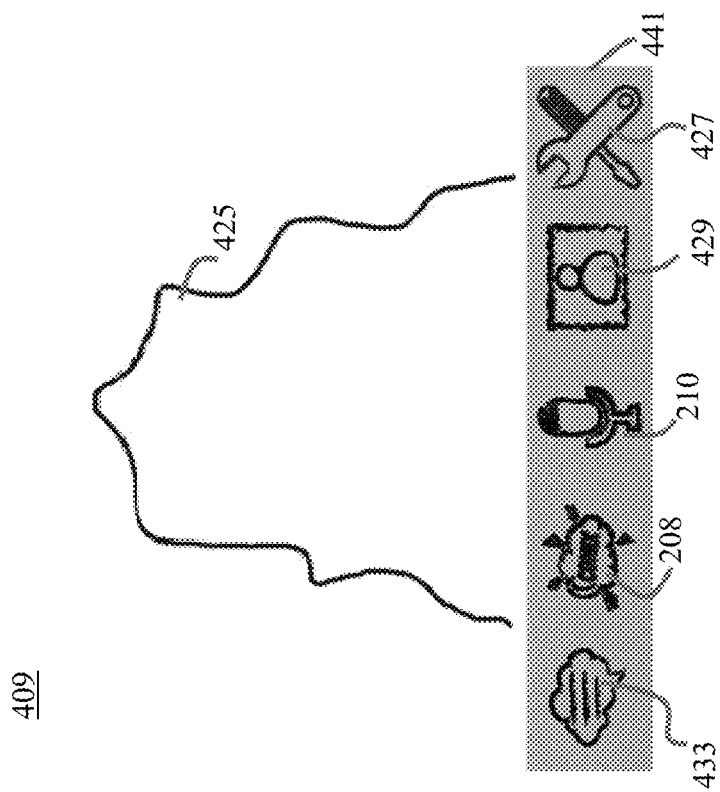
FIG. 4J-5

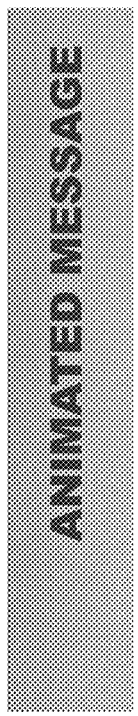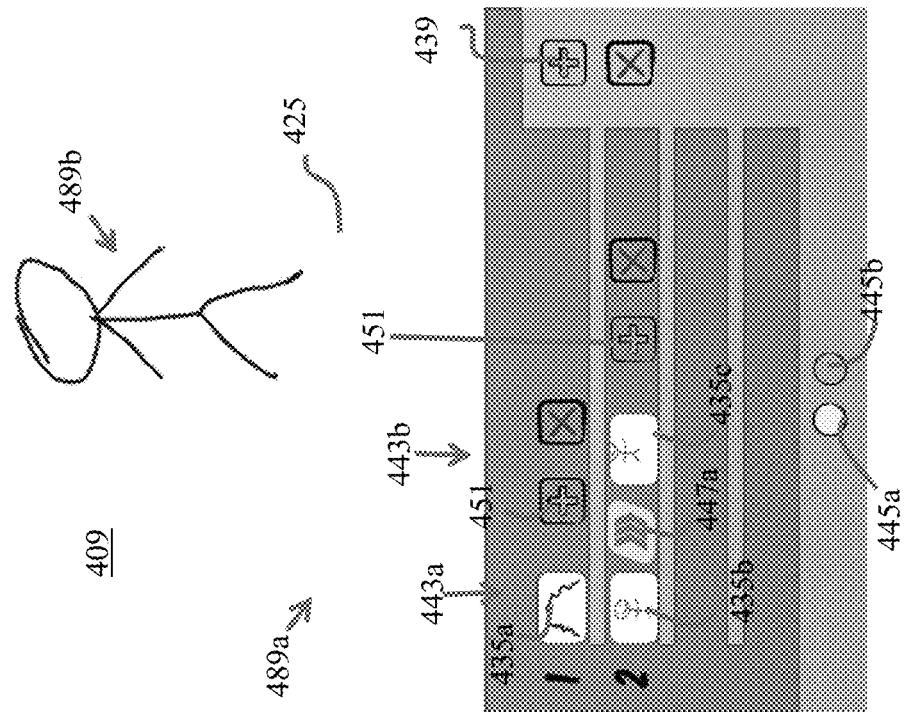
FIG. 4J-9a
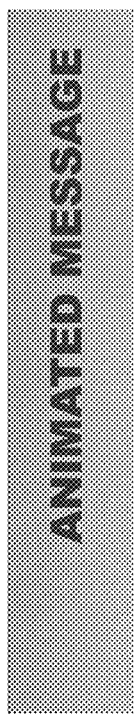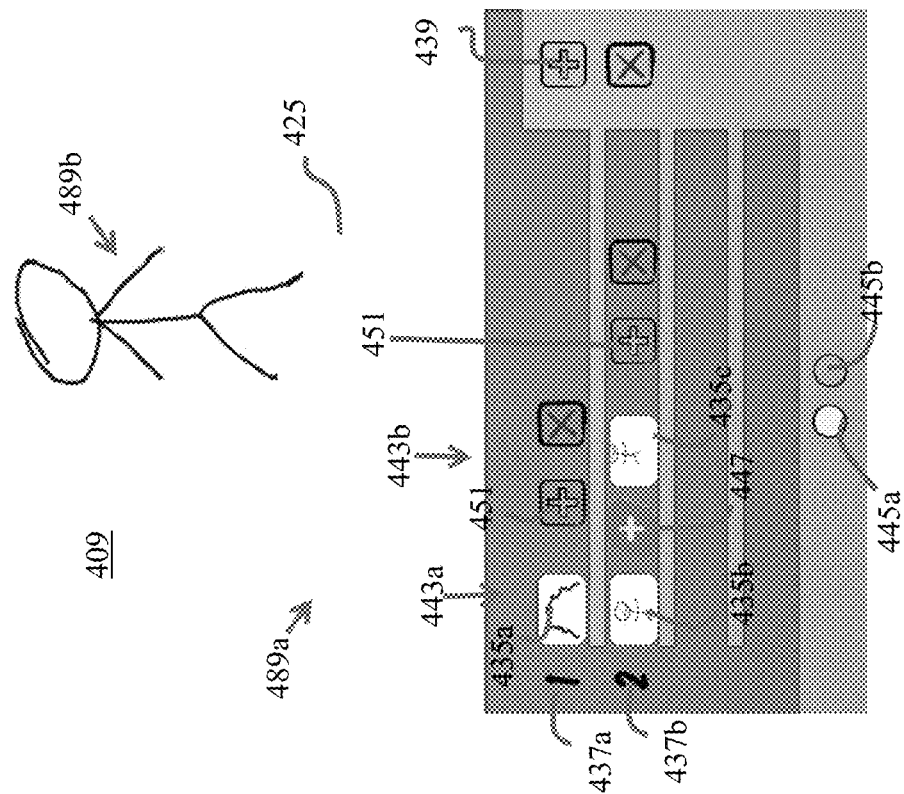
FIG. 4J-9b

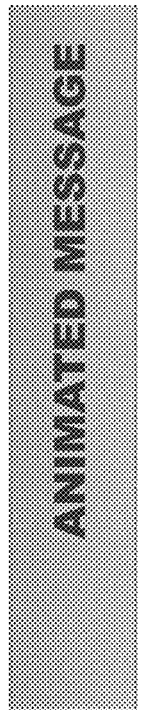 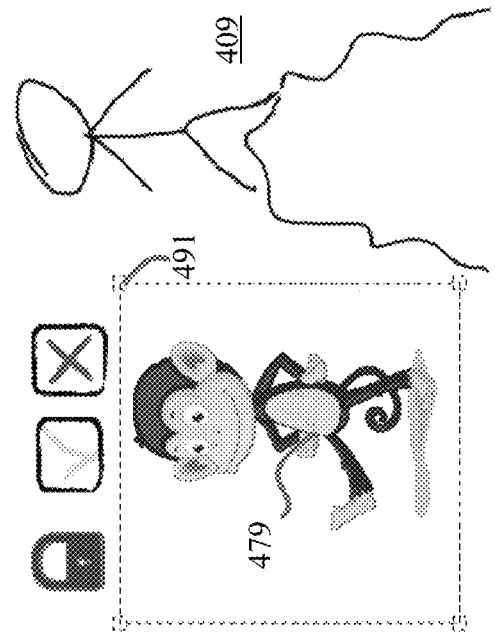 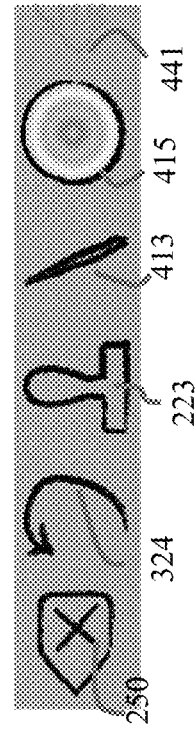
FIG. 4J-16
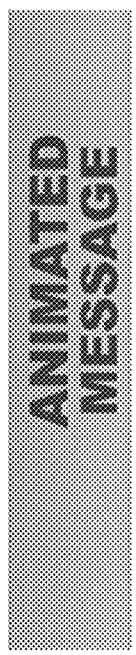 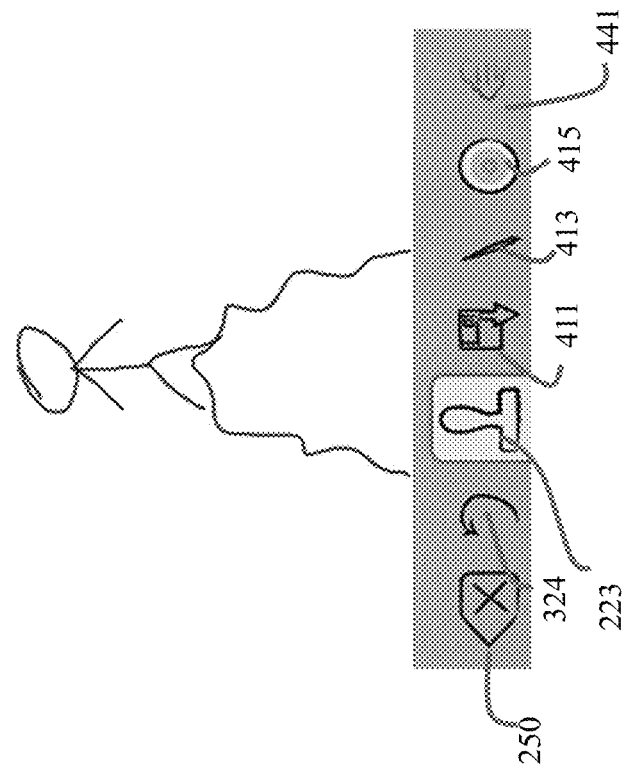
FIG. 4J-15

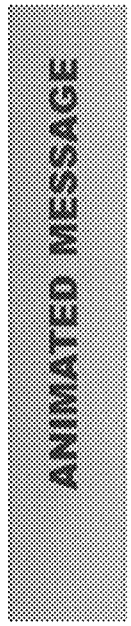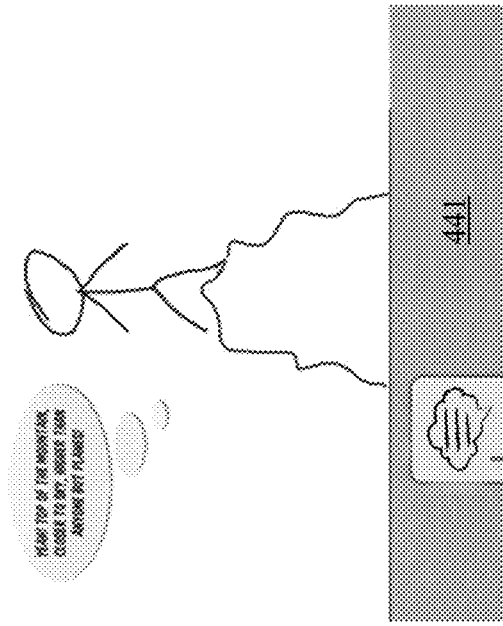
FIG. 4J-19
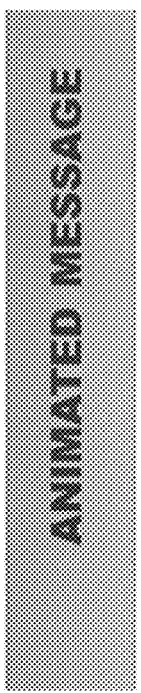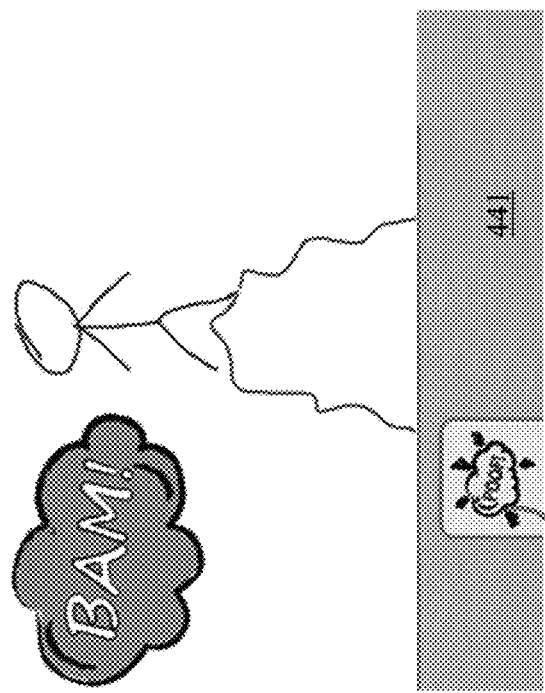
FIG. 4J-18

MESSAGING SYSTEM AND METHOD

CROSS-REFERENCE TO RELATED APPLICATIONS

This Application is a continuation application claiming the benefit of priority of the U.S. Non-Provisional Utility patent application Ser. No. 13/669,351 with a filing date Nov. 5, 2012 (Now U.S. Pat. No. 9,154,456), which claims the benefit of priority of U.S. Provisional Utility Patent Application No. 61/625,423, filed Apr. 17, 2012, the entire disclosures of all of which applications are expressly incorporated by reference in their entirety herein. It should be noted that where a definition or use of a term in the incorporated patent application is inconsistent or contrary to the definition of that term provided herein, the definition of that term provided herein applies and the definition of that term in the incorporated patent application does not apply.

Where a definition or use of a term in the incorporated Provisional Patent Application No. 61/625,423, filed Apr. 17, 2012 is inconsistent or contrary to the definition of that term provided herein, the definition of that term provided herein applies and the definition of that term in the incorporated Provisional Patent Application No. 61/625,423, filed Apr. 17, 2012 does not apply.

BACKGROUND OF THE INVENTION

Field of the Invention

This invention generally relates to communications and, more particularly, to composition and delivery of a composed communications that uses multiplicity of different types of digital media for appropriate conveyance of a message of the sender that is desired to be communicated.

Description of Related Art

Communications protocols exist that enable individuals to first compose, and then deliver a message, non-limiting examples of which may include electronic mails (or e-mails), various different types of messaging services such as Hypertext Transfer Protocol (HTTP), Transmission Control Protocol (TCP) and Internet Protocol (IP), Short Message Service (SMS), Enhanced Messaging Service (EMS), Multimedia Messaging Service (MMS), Voice over Internet Protocol (VoIP) that include messaging services and so on that are well known and have been in use for a number of years.

Most conventional protocols are limited in their ability to appropriately convey the thought that is desired to be communicated within a message. To appropriately convey the thoughts of the individual, the composed message must make the thoughts (or ideas, impressions, emotions or feelings) of the individual known and understandable to the other individuals who receive the message.

SMS is a non-limiting example of a conventional communication protocol that is extensively used to forward short sentences (texts) that in general, do not fully convey the thought or emotions of the individual. In fact, in a great number of instances, most receivers misunderstand SMS text messages. For example, an individual may forward a SMS text message that is serious, but the receiver may interpret the message as humorous and visa versa. As another example, MMS may be used to forward a voice, picture or video as mere attachments in addition to text, but the receiver may first view the attached picture or video with no understanding of its context, and then read the accompanying text to understand or contextualize the picture or the video viewed, with the sender intending that the receiver first read the text and then viewed the picture or video for full understanding. As yet another example, conventional emails allow users to attach various types of media, but the composer of the email has no control as to which attachments will first be viewed by the receiver for the best understanding of the senders message. VoIP provides voice/video technology, but the messaging services provided by VoIP are similar to the messaging services discussed above with similar issues.

Accordingly, in light of the current state of the art and the drawbacks to current communications systems and methodologies, a need exists for a communication system and method that would enable individuals to compose a message using a vast variety of different types of standard, customized, and customizable media, and that the composed message would be delivered to a receiver via conventional communications protocols native to the electronic devices (e.g., SMS, MMS, TCP/IP, HTTP, etc.), and that the various types of media constituting the composed message would execute in the order, arrangement, or sequence intended by the composer of the message.

BRIEF SUMMARY OF THE INVENTION

A non-limiting, exemplary aspect of the present invention provides a messaging system, comprising:
an electronic message having integrated digital content; the integrated digital content is scripted by seamless linking of multiplicity of electronic media components, with an electronic media component comprised of a compilation of one or more electronic media element, with an electronic media element comprised of one or more data;
communication protocols for delivery and receipt of the electronic message, with the multiplicity of electronic media components of a received electronic message seamlessly executed in an order, arrangement, and sequence intended by the scripted digital content at one of a first and second client-device.

Another non-limiting, exemplary aspect of the present invention provides a computer program product for a messaging system, the computer program product comprising a computer-readable medium having computer program instructions stored therein for causing one or more computers to perform operations of:
composing an electronic message using digital content sourced from multiplicity of electronic media, with the multiplicity of electronic media constituting the composed electronic message;
delivering the composed electronic message; and
executing the multiplicity of media at a receiver end in an order, arrangement, and sequence intended by the composed electronic message.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding part(s) throughout.

DETAILED DESCRIPTION OF THE INVENTION

Figure 1A:
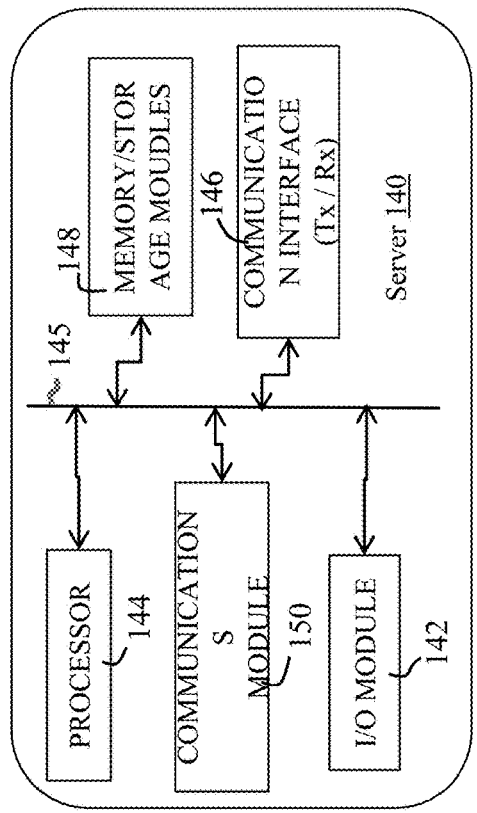
FIG. 1A is an exemplary illustration of well-known, conventional computing machine as server device hardware.

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers. Further, each block within a flowchart may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

In the description given below, when it is necessary to distinguish the various members, elements, sections/portions, or components of the different types of GUI icons or any other aspects from each other, the description will follow reference numbers with a small alphabet character such as (for example) "profile pictures 224a, 224b, 224c, and etc." If the description is common to all of the various members, elements, sections/portions, or components of all GUI icons or other aspects such as (for example) to all profile pictures 224a, 224b, 224c, and etc., then they are simply referred to with reference number only and with no alphabet character such as (for example) "profile picture 224."

The below-described computer hardware and software are presented for purposes of illustrating the basic underlying client-device and server computer components that may be employed for implementing the present invention. For purposes of discussion, the following description will present examples in which it will be assumed that there exists one or more "server" (e.g., database server and/or application server) that communicates with one or more client-devices (e.g., personal computers, mobile devices, or others). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below. Therefore, for example, while the present invention may operate within a single computing machine (server or client device) or operate directly between client devices without the use of servers, the present invention is preferably embodied in a computer system such as a client/server system. Client/server environments, database and or application servers, and networks are very well documented in the technical, trade, and patent literature.

Throughout the present invention the term "user" or "end user" may refer to one or more entities that forward one or more messages, one or more entities that receive one or more messages, or both.

As indicated above, most conventional messaging systems are limited in their ability to appropriately convey the thought that is desired to be communicated within a message. This may require the message to use various different types of media (including some that may require customizations) and use the different types of media in an appropriate order or arrangement within a single message. Regrettably, most conventional communications limit the number and types of media that may be incorporated into a single message, and others that do allow several media types, have limited or no ability to customize the media. As importantly, most conventional communications lack the ability to allow a user to actually compose (order or arrange) the sequential execution of the various different types of media that constitute the message so to precisely convey the thought (or emotion, feelings, tone, etc.) that is desired to be communicated when the receiver plays back the composed message. That is, the composer of the message has no control over how or the order in which the receiver plays back the different types of multiple media that constitute the overall message. Accordingly, the present invention provides a communication system and method that enables individuals to compose an electronic message using a vast variety of different types of standard, customized, and customizable media, and that the composed message is delivered to a receiver via conventional communications protocols native to the electronic devices (e.g., SMS, MMS, TCP/IP, HTTP, etc.), and that the various types of media constituting the composed message execute in the order, arrangement, and sequence intended by the composer of the message.

The messaging system of the present invention uses a management scheme to manage electronic messages. The management scheme includes maintaining of records that function to keep track and account of each electronic message, from creation to receipt. A record is a number of related items of information that are handled as a unit. The records include parameters, properties, or attributes that relate to specific aspects of the electronic messages, with values (i.e., data) that define the attributes. The records may be implemented by a variety of means, non-limiting example of which may include the use of databases. The present invention defines a database as a structured set of data that may or may not use or even be in a table format that are held in one or more computing machine, accessible by various means. Non-limiting examples of various well-known conventional database systems that may be used to implement records may include, for example, well-known, conventional relational databases, flat file databases, Extensible Markup Language (XML) databases, or others, or combinations thereof.

The messaging system of the present invention provides a user interface that is understandable by human intellect and human senses for interaction. A non-limiting example of a user interface may include a graphic user interface (GUI) to allow a visual way of interacting with the messaging system. The disclosed user interface provided throughout the disclosure is meant to be illustrative and for convenience of example only and should not be limiting. Therefore, the present invention is not limited to any particular GUI configuration and may be implemented in a variety of different types of user interfaces. Further, all GUI representations of any concepts, aspects, functions, or features may be varied and therefore, none should be limiting. The non-limiting, non-exhaustive illustrations of the GUI used throughout the disclosure are provided only for a framework for discussion. For example, the mere act or function of "selection" (e.g., selecting a media type, which is detailed below) may be accomplished by numerous GUI configurations or representations of the concept of "selection" that are too numerous to mention individually, non-exhaustive, non-limiting examples of which may include the use of GUI radio-buttons, GUI pull-down menus, individual GUI icons that are tapped, which direct users to other types of "selection" GUI, a simple list of text, tapping, and etc. As another simple example, GUI that is used to represent an "Add" button to add a picture to a message for example, or some other concept, aspect, function, or feature may be represented by a completely different set of GUI representations (i.e., configurations, shapes, colors, etc.) shown in the present application without limitations and without departing from the spirit and scope of the claims.

Figure 1B:
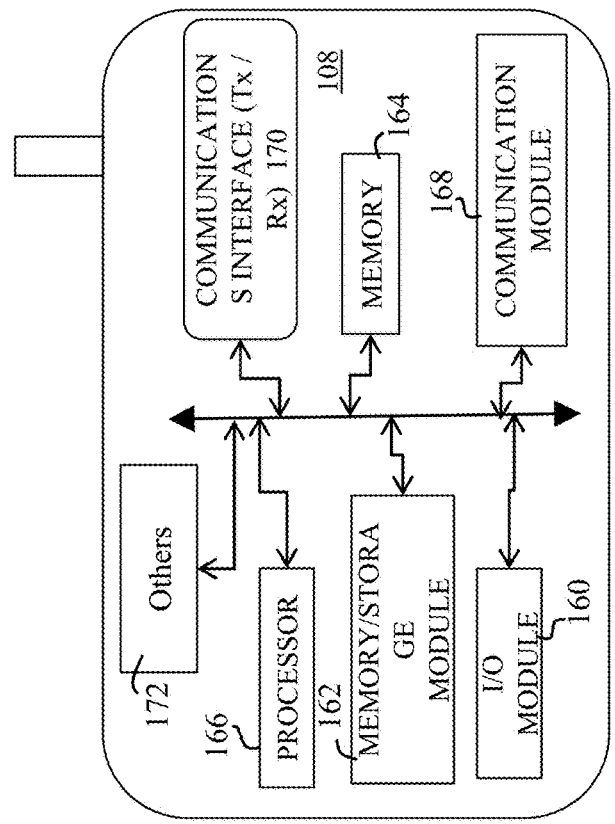
FIG. 1B is an exemplary illustration of well-known, conventional computing machine as client device hardware.

The present invention may be implemented on conventional computing machines that may include server and or client devices. FIG. 1A is an exemplary illustration of well-known, conventional computing machine as server device hardware, and FIG. 1B is an exemplary illustration of well-known, conventional computing machine as client device hardware.

As illustrated in FIG. 1A, the computing machines for implementing the messaging system of the present invention may include one or more well known conventional server devices (hereinafter referred to simply as "server" or "servers") in one or more locations. The exemplary illustrated server 140 is an example representing a typical conventional server (that may function as a database server) that is comprised of input and output (I/O) module 142 for receiving information and or data from various devices, including, but not limited to Cloud Computing Systems and services, client devices, other servers and so on, including any external computers connected to the servers 140, a network and or Internet connection, or any computer readable medium such as a floppy disk, Compact Disk (CD), a Digital Versatile Disk/Digital Video Disk (DVD), flash drive, etc.

The I/O module 142 may also be configured for receiving user input from another input device such as keyboard, a mouse, or any other input device (e.g., touch screen). Note that the I/O module 142 may include multiple "ports" for receiving data and user input, and may also be configured to receive information from remote databases or computer or servers using wired or wireless connections, including other external systems.

The I/O module 142 is connected with the processor 144 via a bus system 145 for providing output to various entities, possibly through a video display. Output may also be provided to other devices or other programs, e.g. to other software modules or Cloud Computing Systems and services for use therein, or possibly serving as a wired or wireless gateway to external databases or other processing devices such as client devices.

Further associated with the server 140 is communication interface 146, which may include a wireless or wired transceiver Tx/Rx for implementing desired communications protocols. The processor 144 is coupled with a memory/storage module 148 (e.g., Random Access Memory, Read Only Memory, Hard drive, Could Systems, etc.) to permit software such as control information to be manipulated by commands to the processor 144. The memory/storage module 148 may also include other storage solutions for storage of data (e.g. removal CD, DVD, flash drive, etc.) and or fixed storage, Cloud Computing Systems and services storage, etc.

As stated above, FIG. 1B is an exemplary illustration of well-known, conventional computing machine as client devices that may be used to implement the messaging system of the present invention. As illustrated, the client device 108 may be any well-known conventional computing machine, non-limiting examples of which may include netbooks, notebooks, laptops, mobile devices such as mobile phones, or any other devices that are Network and or Internet enabled. The client device 108 includes the typical, conventional components such as an I/O module 160 (e.g., a keyboard or touch screen display, etc.), a storage module 162 for storing information (may use Cloud Computing Systems and services), a memory 164 used by a processor 166 to execute programs, a communication module 168 for implementing desired communication protocol, a communications interface (e.g., transceiver module) 170 for transmitting and receiving data, and may or may not include other components 172 such as an image/video/sound capture device such as a camera, voice recording microphone, stylus, etc.

Figure 1C:
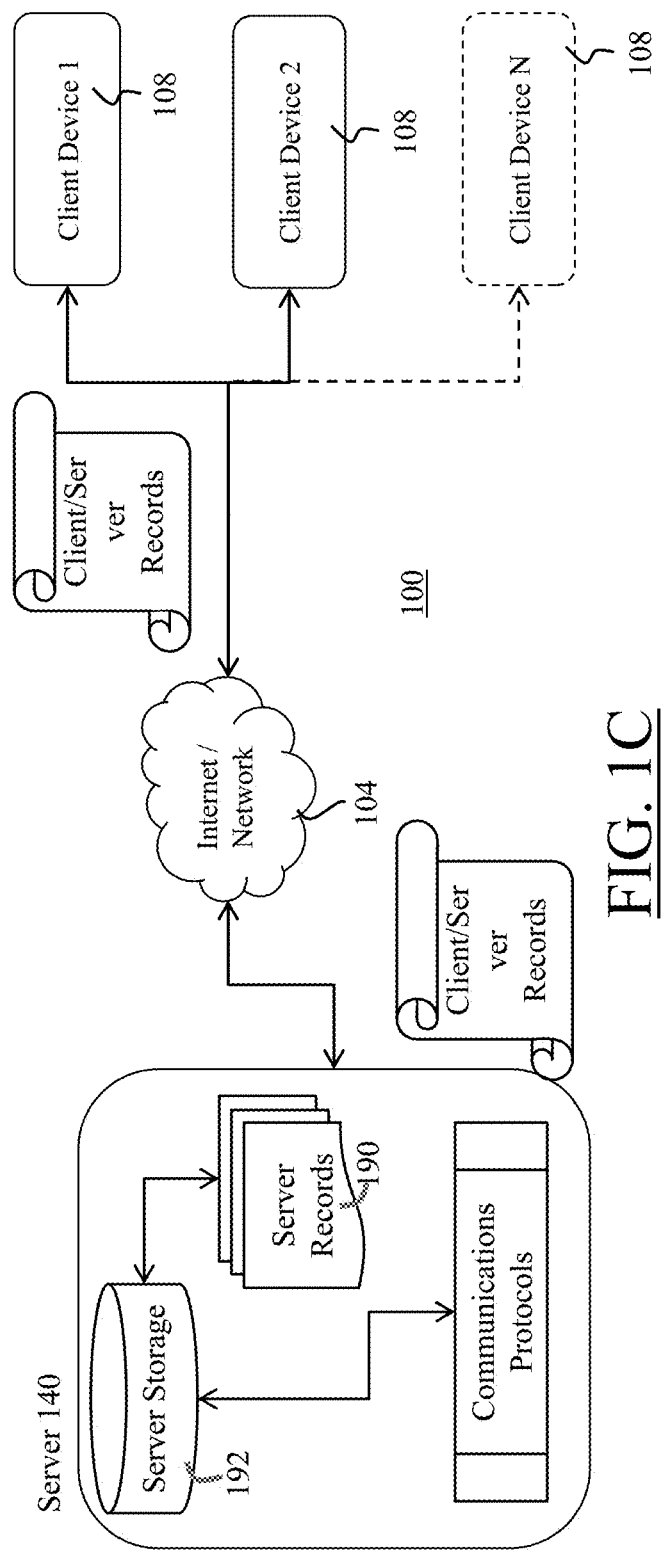
FIG. 1C illustrates the general overview of a conventional client/server database system suitable for implementing the present invention.

FIG. 1C illustrates the general overview of a conventional client/server database system 100 suitable for implementing the present invention. As shown, the system 100 comprises one or more client-devices 108 connected to a server 140 (e.g., in the form of a database server) via Internet/Network 104. Specifically, the client-devices 108 comprise one or more standalone client-devices (e.g., mobile phones) connected to one or more database server system 140 using a conventional network/Internet 104 and conventional communications protocols.

The network/Internet 104 may be any one of a number of conventional, well-known network systems that includes functionality for packaging client-device communications in the well-known Structured Query Language (SQL) together with any parameter (or attributes) information into a format (of one or more packets) suitable for communications between the database server system 140 and client-devices 108. FIG. 1C is further described in detail in relation to client/server records.

Figure 2A:
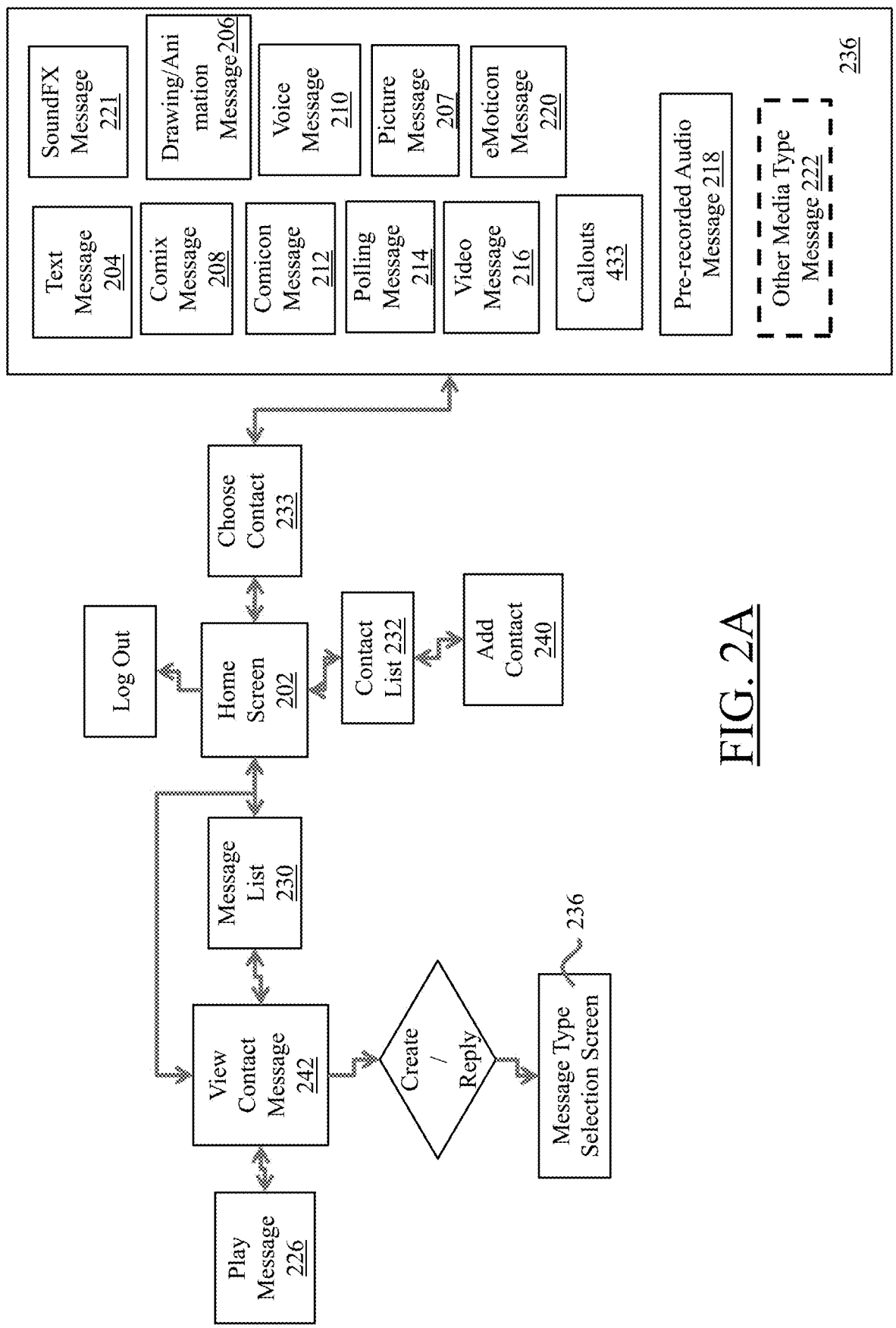
FIG. 2A is a non-limiting, exemplary block diagram schematically illustrating the home screen and navigation to other modules and functionalities of the present invention, a non-limiting exemplary GUI of which are shown in FIGS. 2B to 2C-2.
Figure 2B:
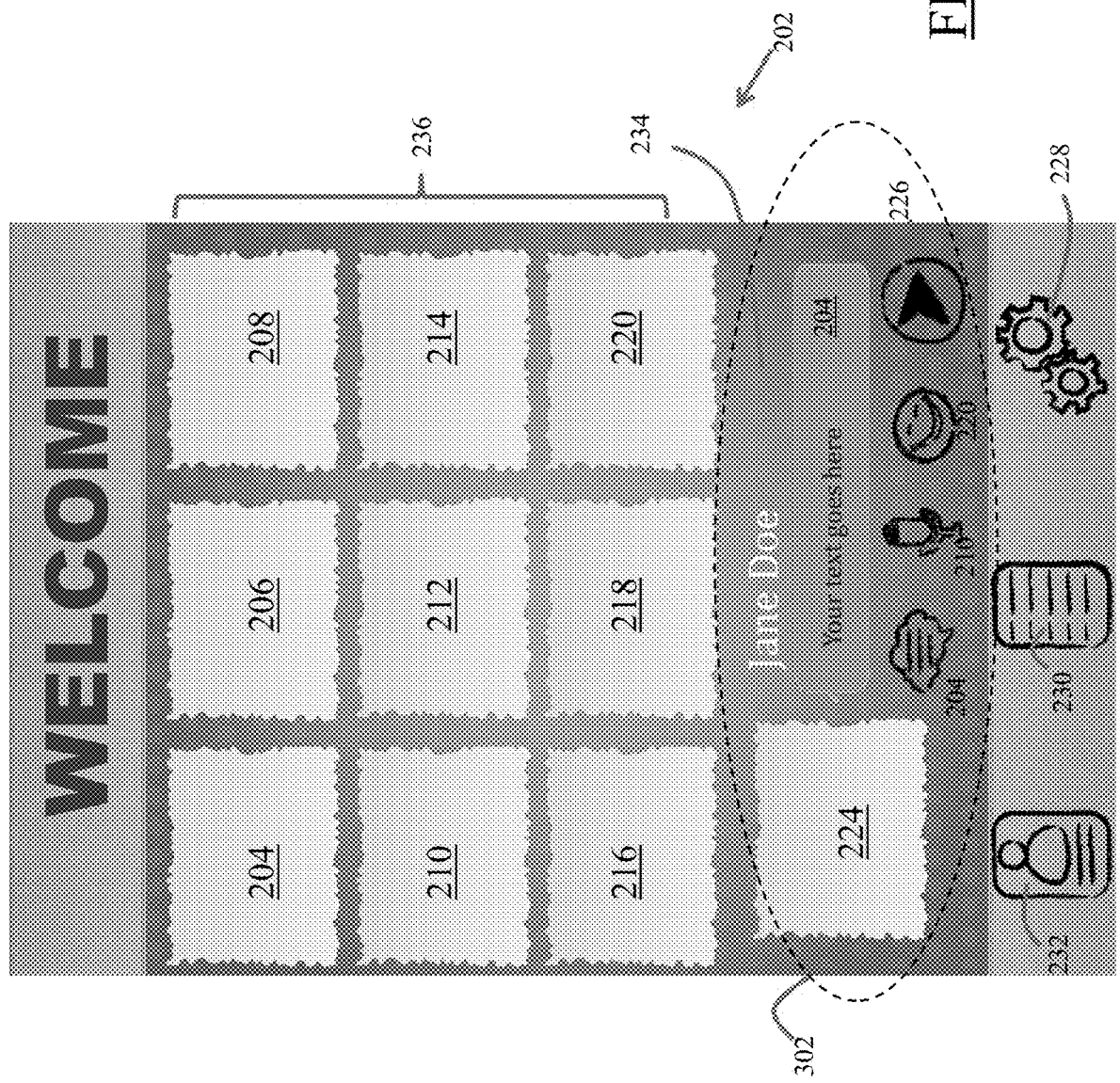

FIG. 2A is a non-limiting, exemplary block diagram schematically illustrating the home screen and navigation to other modules and functionalities of the present invention, a non-limiting exemplary GUI of which is shown in FIG. 2B. Upon registration and login, the user is generally directed to a home screen 202. It should be noted that the methods or processes for download, installation, registration, and login to create a new user account or to login into an existing account of the messaging system of the present invention via an electronic device (e.g., mobile devices, desktops, laptops, etc.) is done through well-known existing processes. Upon creation or logging into a user account, the messaging system of the present invention may cull existing user contacts from a variety of other social networks or email accounts, including allowing the registered user to simply add contacts directly, similar to well-known existing processes. Nonetheless, after logging into the messing system of the present invention, the user is presented with a home or welcome screen as illustrated in FIGS. 2A and 2B.

Referring to FIGS. 2A and 2B, the home screen 202 of the messaging system in accordance with the present invention provides central navigation to all features of the application, including enabling a quick method to create a message, and view incoming messages. The home screen 202 features various GUI icons (e.g., icons 204 to 222) that when selected automatically start the process of composing a new message. The home screen 202 may include scrolling capability (up/down and/or left/right) to display more electronic media components 236 not shown in the viewable area. Therefore, the number of the displayed electronic media components 236 shown in FIG. 2B is not limited to the nine media types shown in the current viewing area of the screen.

The home screen 202 further includes GUI that represent the unread electronic messages 302 (that may be scrolled), pausing for a short duration to display the text part 204 of the message, who it is from (profile image 224 and name 234 of the sender of the message 302), a first few of the electronic media components 236 (e.g., text icon 204, voice message icon 210, emoticon message icon 220, etc.) of the electronic message 302, and a GUI play button 226 that takes the users directly to the message and commences playing the message 302, executing in proper order the electronic media components 236 of the message 302. The home screen 202 further includes GUI that allows users to access settings 228, message lists 230, and contacts 232.

As illustrated in FIGS. 2A and 2B, the home screen 202 provides end users with a GUI icon 232 for accessing a list of contacts to either retrieve or add new contacts 240 (FIG. 2A), which are done through well-known existing processes. The contact list 232 provides a quick summary of users contacts, including profile image, contact name, the last time a message was forwarded to a contact on the contact list 232, and the last time a contact was logged into the messaging system of the present invention, very similar to conventional processes.

Selecting a contact displays the contact information screen with further details, which allows users to remove them from contact list, delete messages, etc. There are a variety of mechanisms to find a contact within a lengthy contact list, including the use of well known, existing search tools to search for and select a particular contact (the search may include culling contacts from external social networks or other linked networks, e.g., email accounts, etc.). As indicated in the block diagram of FIG. 2A, the user may either choose one or more contacts 233 and then commence composing an electronic message 302 by selecting and composing one or more electronic media components 236 or, alternatively, users may first select to compose an electronic message 302 by first selecting and composing one or more electronic media components 236, and then select one or more contacts 233 to whom they wish to forward the composed electronic message 302 (very similar to an email where content of email may be composed with or without contacts).

As illustrated in FIGS. 2A and 2B, the home screen 202 provides end users with a GUI icon 228 for settings, which enables users to set and personalize in well-known conventional manner various aspects (e.g., color, font size, etc.) of the application and it also includes information with respect to version information, and so no.

Figures 2, 2C:
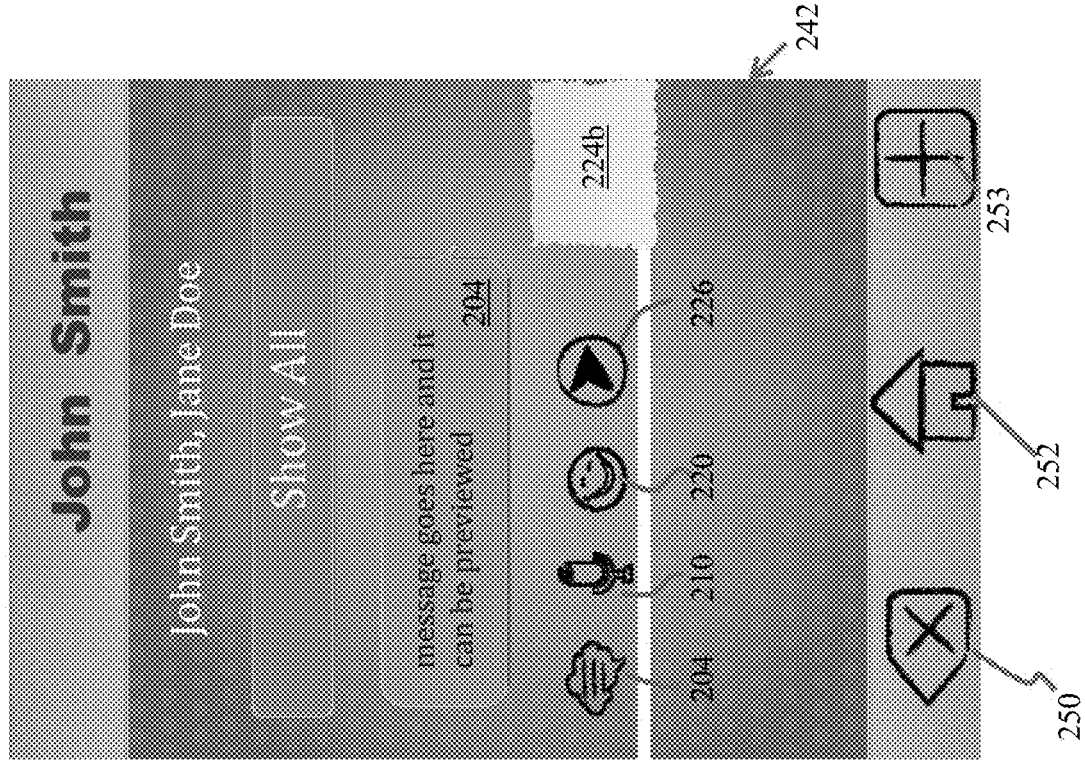
Figures 1, 2C:
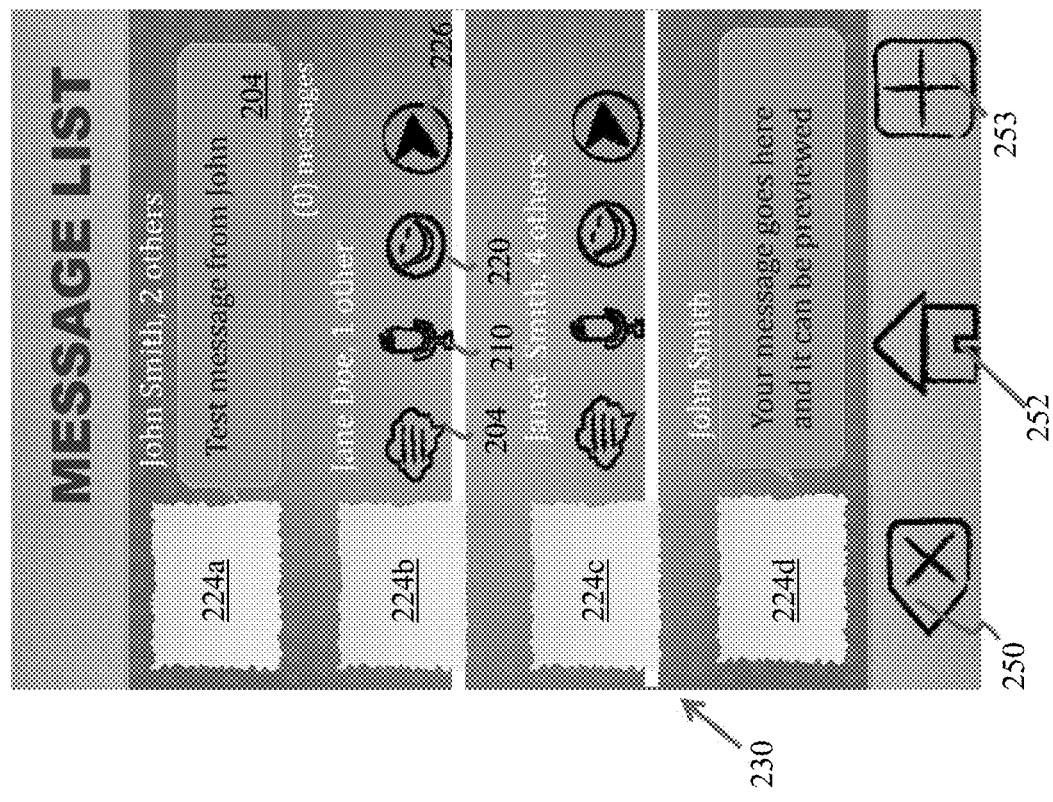

As further illustrated in FIGS. 2A and 2B, selecting the message list GUI icon 230 directs users to the actual message list, a non-limiting example of which is illustrated in FIG. 2C-1. The message list 230 is a listing of received messages, including electronic media components icons 236 associated with a particular received message. The message list 230 provides users a scrollable list of all of users most recent messages from various contacts. The message list 230 displays the text 204 of the first unread message from a contact, an indication of how many unread messages users have with that contact, and if the message contains media components icons for a few media components 236 (e.g., text icon 204, voice message icon 210, emoticon message icon 220, etc.) and a GUI icon 226 in an exemplary form of a button to play the message.

As further illustrated in FIG. 2C-1, selecting a particular received message directs users to the contact messages screen 242 (shown in FIG. 2C-2) that shows a list of all messages with a particular contact where users may read the text 204 of the message as well as see icons (e.g., text icon 204, voice message icon 210, emoticon message icon 220, etc.) for the first few electronic media components 236, including a GUI icon such as a play button 226 if there are electronic media components 236 to view. Upon selection of a play icon 226, the message is played in the order the composer of the message intended it.

Selecting the GUI icon 226 for play from the message list 230 (FIG. 2C-1), the home screen 202 (FIG. 2B), or the contact message list 240 (FIG. 2C-2) will direct users to the read message screen 304 (FIG. 3A), where the users can "read" their received electronic message 302. The message list 230 and the contact message list 240 also include additional navigational GUI icons such as "back" 250 and "home" 252, including the plus "+" GUI icon 253 for generation of a new message and or a reply to a received message (the application of which is context based). In particular, the plus GUI icon 253 within the message list 230 of FIG. 2C-1 will generate a new message to be composed whereas the plus GUI icon 253 in the contact message list 242 of FIG. 2C-2, will simply create a reply to the received message with automatically selecting the contacts (similar to conventional reply to conventional messages or emails).

Figure 3A:
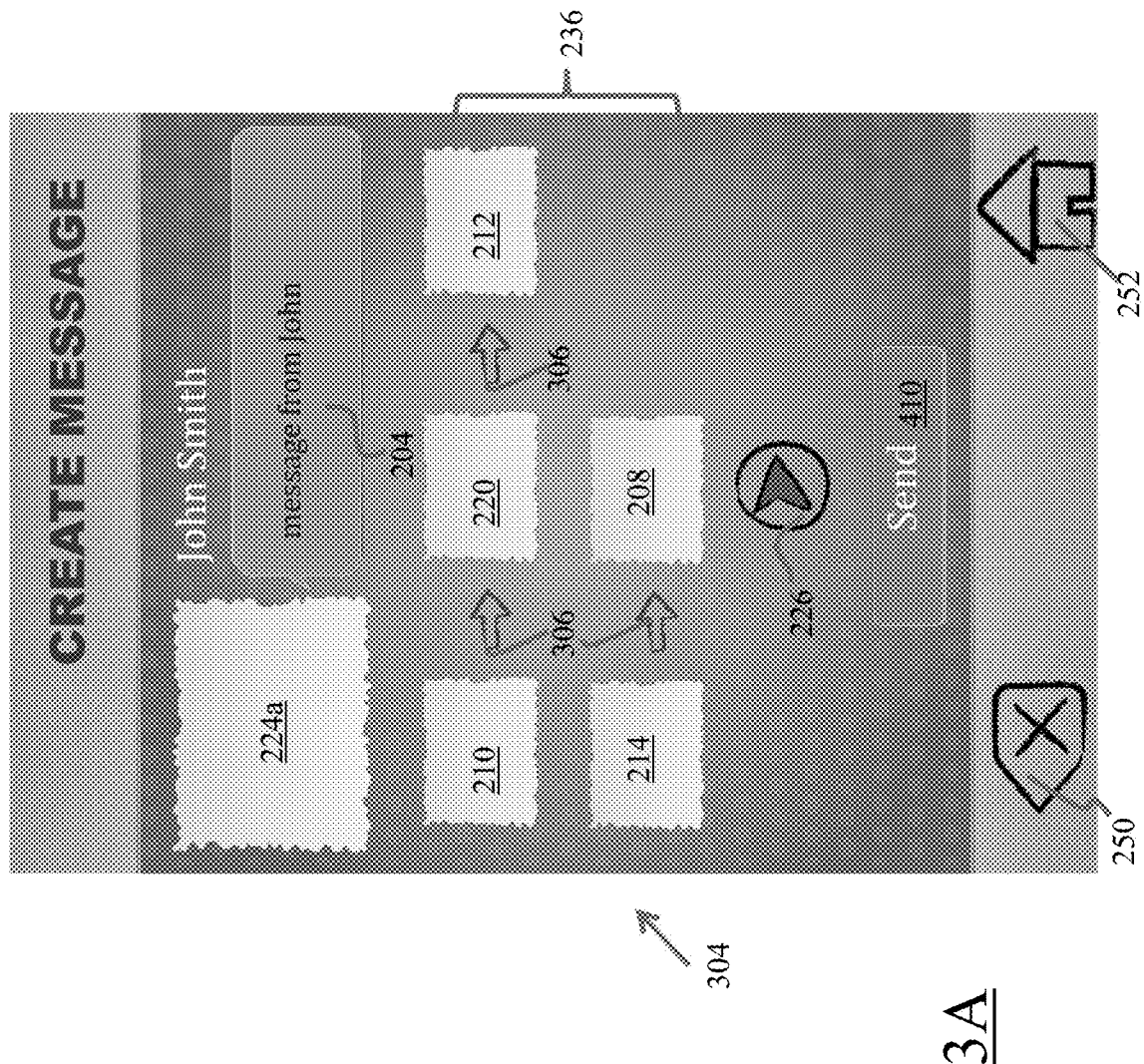
FIGS. 3A to 3I are non-limiting, exemplary illustrations that demonstrate a viewing of an electronic message by a recipient in accordance with the present invention.

FIGS. 3A to 3I are non-limiting, exemplary illustrations that demonstrate the "reading" or viewing of an electronic message in accordance with the present invention. As illustrated in FIG. 3A, the read message screen 304 includes an electronic message 302 that was composed by an end-user (the sender of the message). The electronic message 302 in accordance with the present invention includes an integrated digital content (e.g., text, video, audio, comicons, polling, etc.), wherein the integrated digital content is scripted by seamless linking 306 of multiplicity of electronic media components 236, with an electronic media component 236 (e.g., a comicon 212) comprised of a compilation of one or more electronic media element (e.g., audio and picture), with an electronic media element comprised of one or more data (e.g., audio file such as MP3, and picture file such as JPEG). As indicated above, the messaging system of the present invention uses conventional communication protocols for delivery and receipt of the electronic message 302, with the multiplicity of electronic media components 236 of a received electronic message 302 seamlessly executed in an order, arrangement, and sequence intended by the scripted digital content at one of a first and second client-device 108.

As illustrated in FIG. 3A, the text portion of an electronic media component 236 of an electronic message 302 may be displayed first if there is any text as part of the message 302. For example, if there is an electronic media component 236 that includes text such as a polling message (detailed below), the text portion associated with the polling message may be shown first. If more than one electronic media component 236 of the electronic message 302 include one or more texts, then the texts will be display in the order (detailed below) defined by the composer. It should be noted that although it is preferred to have a text portion of an electronic media component 236 displayed first, the present invention may easily display an electronic media component 236 (regardless of whether it has a text portion associated therewith) in the exact order composed by the user. The read message screen 304 further includes one or more icons (e.g., 210, 220, 212, 214, 208, and etc.) representing electronic media components 236 as an integral part of the electronic message 302, these electronic media components 236 will be played in the order indicated by the links 306 (starting from top-left). Selecting the play icon 226 automatically plays each of the electronic media components 236 in order.

FIGS. 3B to 3G are non-limiting, exemplary illustrations of the various display screen that is progressively viewed by the viewer of the electronic message 302 exemplarily illustrated in FIG. 3A as the message 302 is played. In general, those electronic media components 236 that require their own screen will cause the read message screen 304 in FIG. 3A to become "hidden." Non-limiting, non-exhaustive listings of such electronic media components 236 that may require their own display screen may include animations, comicons, and etc. that have graphics associated with them. As the electronic message 302 of the read message screen 304 of FIG. 3A is played, each icon associated with a specific electronic media component 236 is highlighted to indicate which item is playing. The receiving end-user has the option of selecting (e.g., by tapping) a specific icon associated with a specific electronic media component 236 shown in FIG. 3A so to automatically replay that particular electronic media component 236 out of order if the end-user (the receiver of the message) chooses.

Figures 1, 3B:
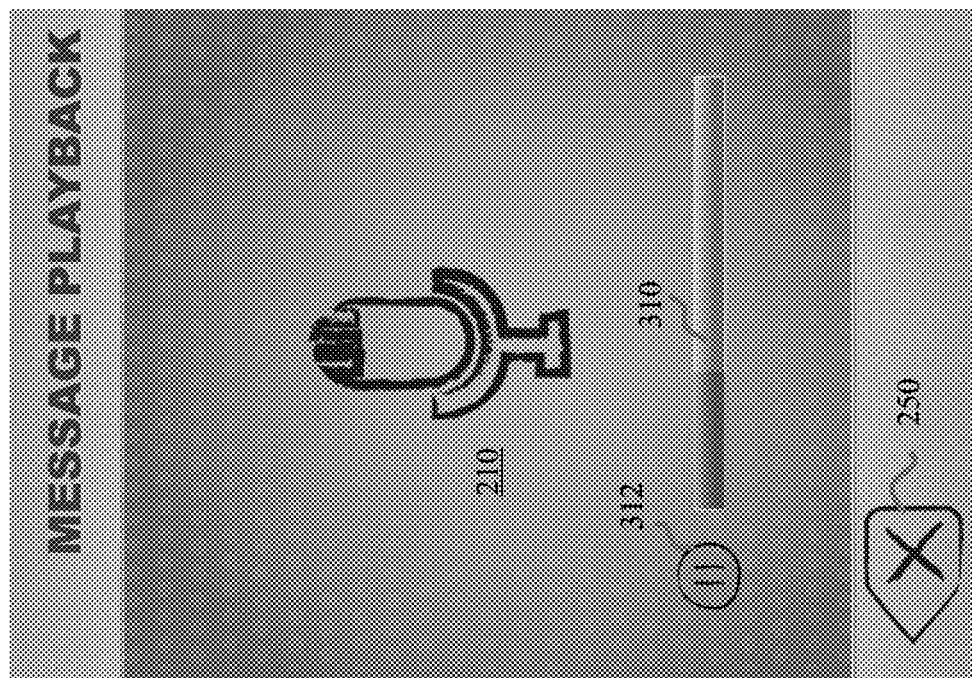
Figure 3B:
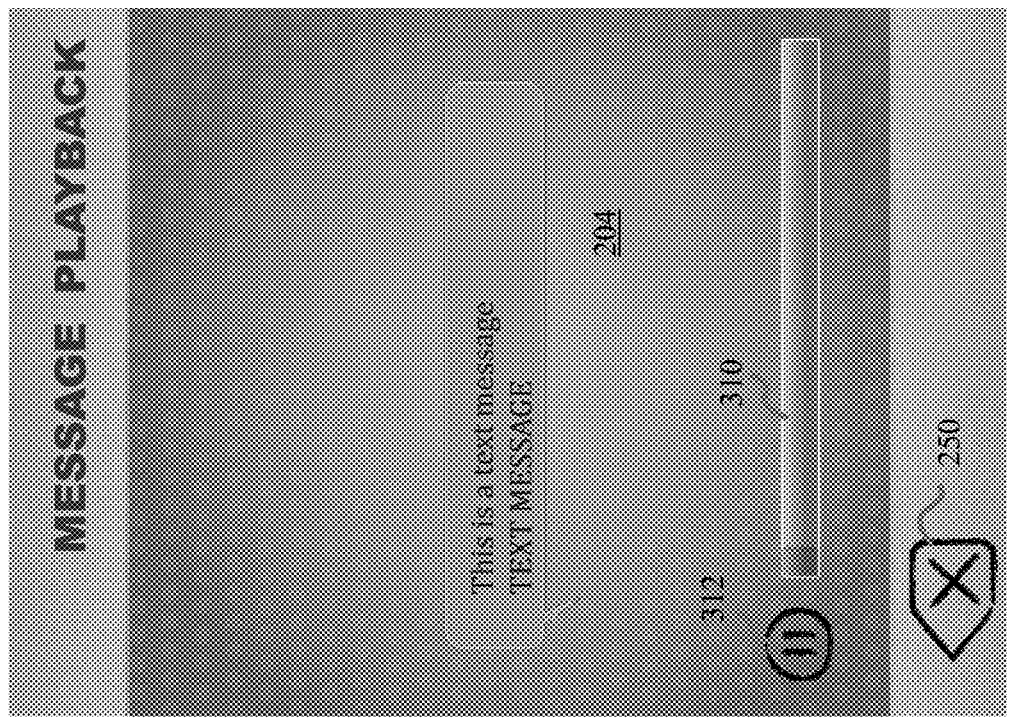

As illustrated in FIGS. 3A and 3B, the first electronic media component 236 played in the correct order is the text message 204. The text message 204 is played in a conventional manner in that a text of the message is displayed for the receiver to read. The entire electronic message 302 includes a progress bar 310 that indicates to the viewer of the message 302 the progression or duration of play of entire message 302, a pause icon 312 to pause the play of the entire electronic message 302, and a "back" icon 250 to return to the previous display screen (which in this instance would be the read message screen 304 of FIG. 3A). It should be noted that as soon as the play of a particular electronic media component 236 is completed, the next electronic media component 236 of the electronic message 302 automatically commences its play.

Figure 3D:
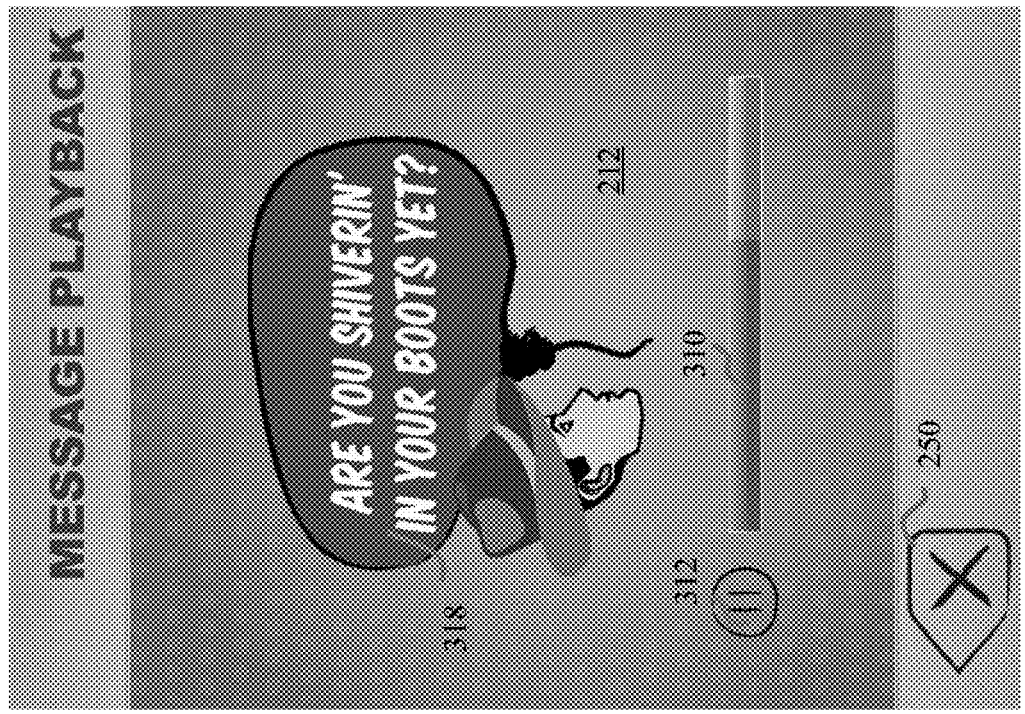
Figure 3C:
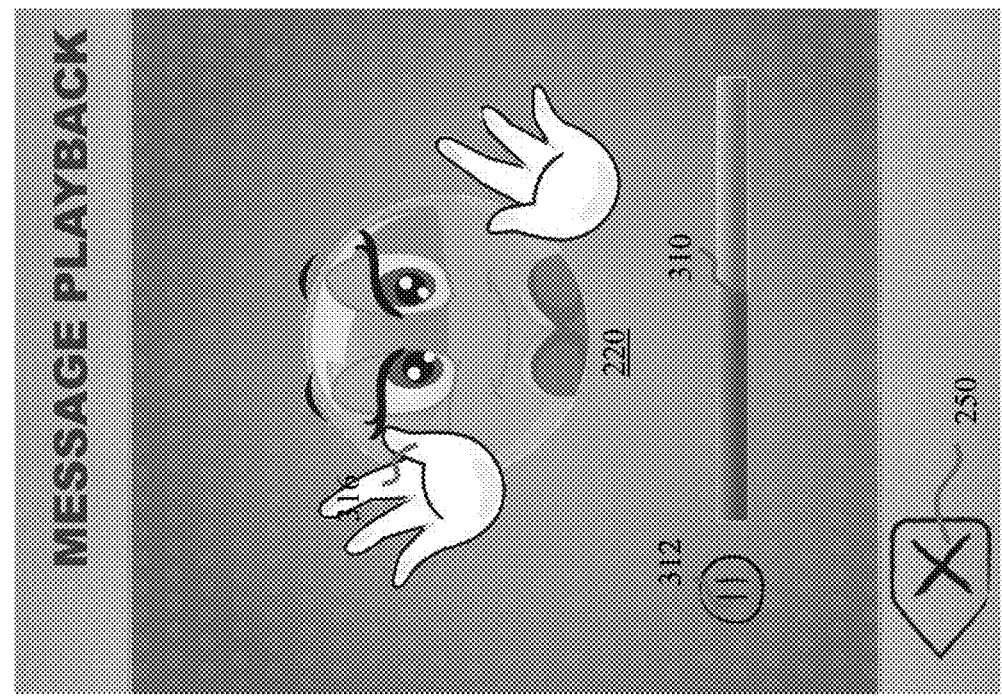

As illustrated in FIGS. 3A and 3B-1, the second electronic media component 236 played in the correct order is the voice message 210 (with the first media component 236 composed by the sender as the illustrated text 204). The voice message 210 includes a recording of a sound (recorded by the composer of the electronic message 302), which may include voice or any other sound. As with most other electronic media components, the voice message 210 includes a progress bar 310, a pause icon 312, and a "back" icon 250 to return to the previous display screen (which in this instance would be the text message screen 210 of FIG. 3B. Therefore, as further illustrated in FIGS. 3A and 3C, the next electronic media component 236 of the electronic message 302 to be played is the emoticon message 220, which includes an emoticon 316 and a sound file, plus the progress bar GUI 310, pause GUI icon 312, and "back" GUI icon 250. After completion of the play of the emoticon message 220, the next electronic media component 236 to be played in its order indicated in FIG. 3A is the comicon message 212 (as illustrated in FIGS. 3A and 3D), which includes a comicon 318, plus the progress bar GUI icon 310, pause GUI icon 312, and "back" GUI icon 250.

Figure 3F:
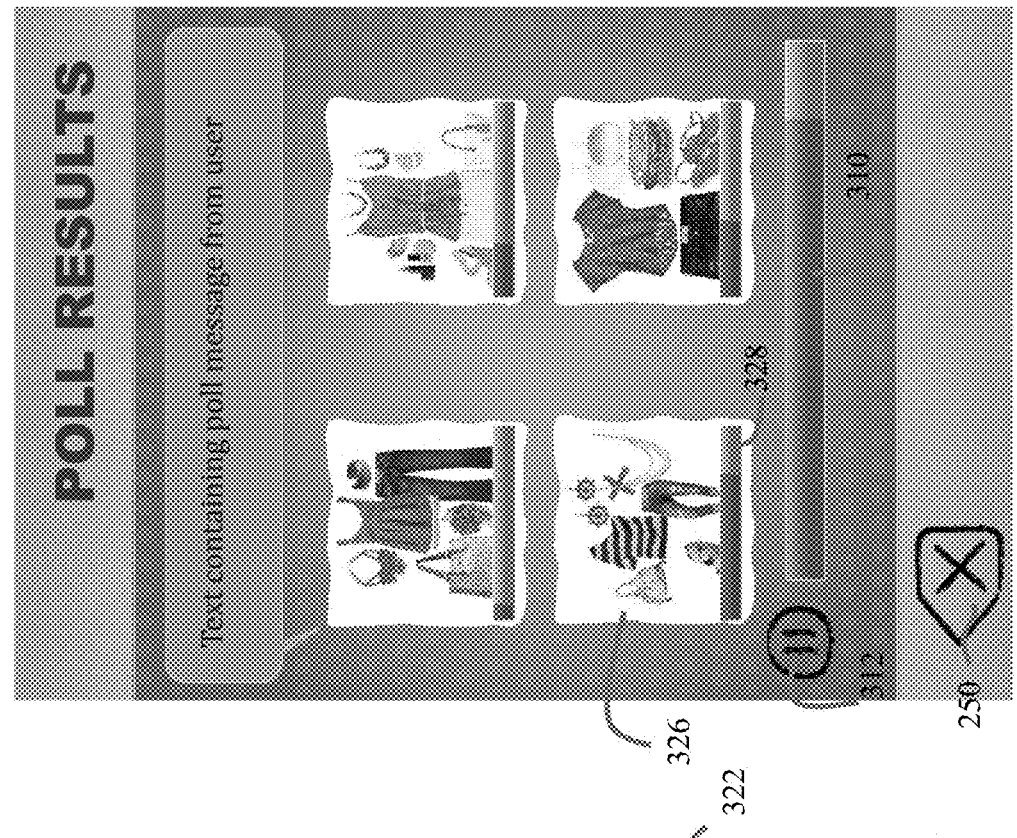
Figure 3E:
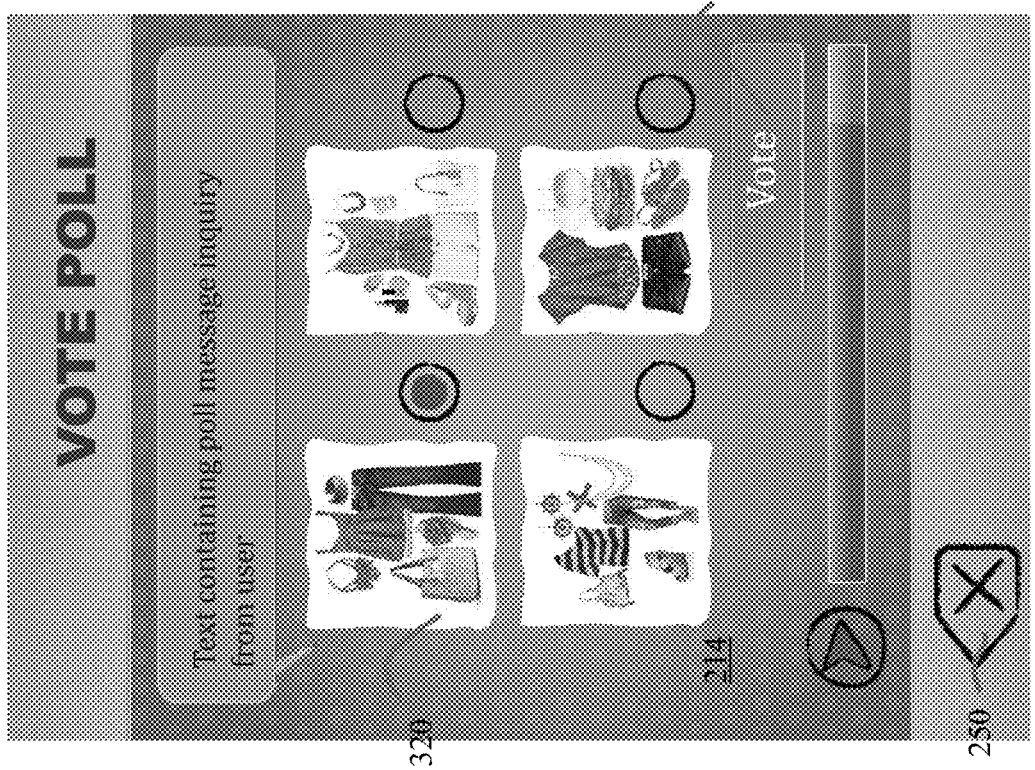
Figure 3G:
Figure 3I:
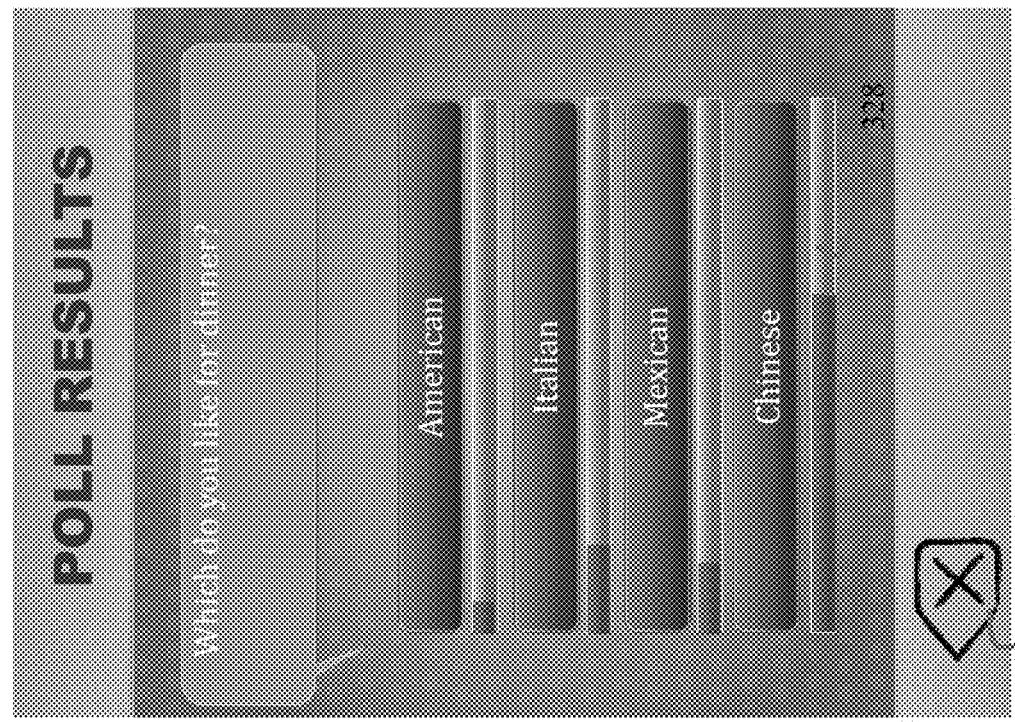

As illustrated in FIGS. 3A and 3E, the next electronic media component 236 to be played in the order indicated in FIG. 3A is a polling message 214, wherein the composer of the electronic message 302 may request the recipients to take a poll and vote for a particular content. A polling message 214 is an electronic media component 236 of an electronic message 302 that itself is comprised of one or more electronic media components 236 for which a polling inquiry is made. The polling message 214 includes a polling ballot (e.g., FIGS. 3E and 3H), the results of which, that is, the polling responses shown in FIGS. 3F and 3I are provided to one or more client devices based on one or more criteria. In general, the set of criteria for dispersion of the polling results is provided to the server as a set of instructions, which the server then executes to determine conditions upon which a distribution decision is to be made with respect to the feedback (e.g., voting) results. In this particular instance illustrated in FIG. 3E, the composer of the electronic message 302 has asked the recipients of the electronic message 302 to vote on a particular outfit, with FIG. 3E showing the recipient of the electronic message 302 selecting the top-left content 320, and "tapping" the vote GUI icon 322 to register the vote. It should be noted that to undo a vote, a user may simply select another radio button, where the first selection may automatically be replaced with the second selection (assuming the polling message 214 was composed such that only one selection is possible). The results of the vote are shown in FIG. 3F, wherein the majority of receipts of the electronic message 302 have voted for the outfit shown in the lower-left corner 326, with a bar 328 that indicates the voting majority. After the polling message, as illustrated in FIGS. 3A and 3G, the next, and final electronic media component 236 is played in the order indicated in FIG. 3A, which is the comix message 208.

Figure 3H:
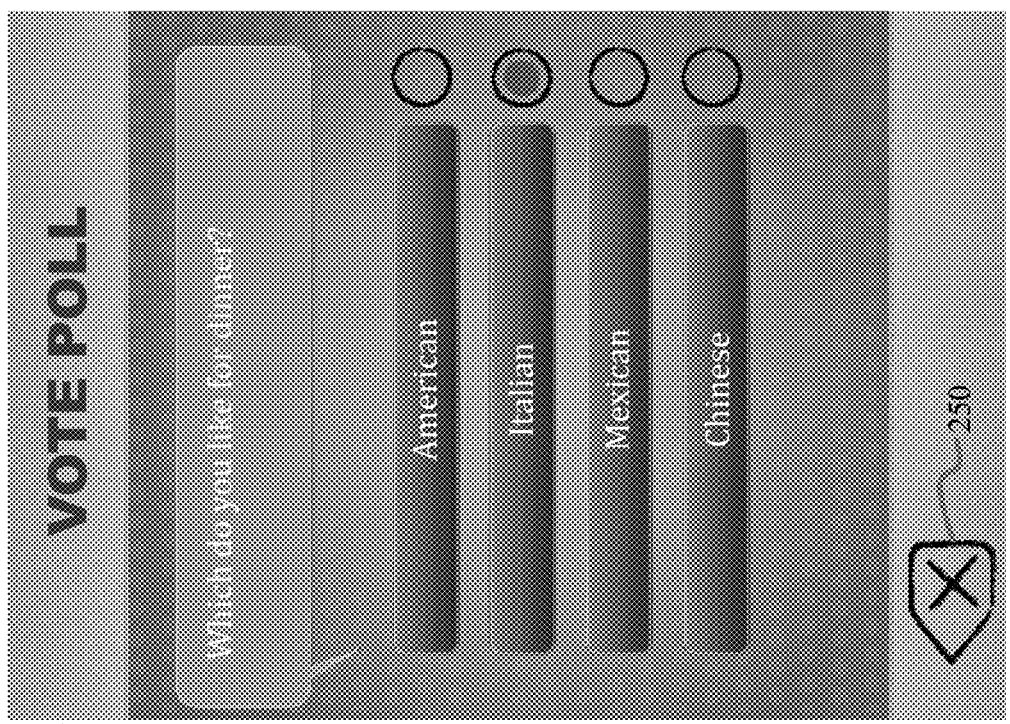

FIGS. 3H and 3I are non-limiting exemplary illustration of a messaging example of a polling message 214 where polling is a text polling rather than other media types. In the example shown in FIG. 3H, the recipients of the electronic message 302 receives a text based polling inquiry about dinner, where one of the recipients selects and votes "American," with the results of the poll shown in FIG. 3I, where 100% of all recipients voted for "American."

Figure 4:
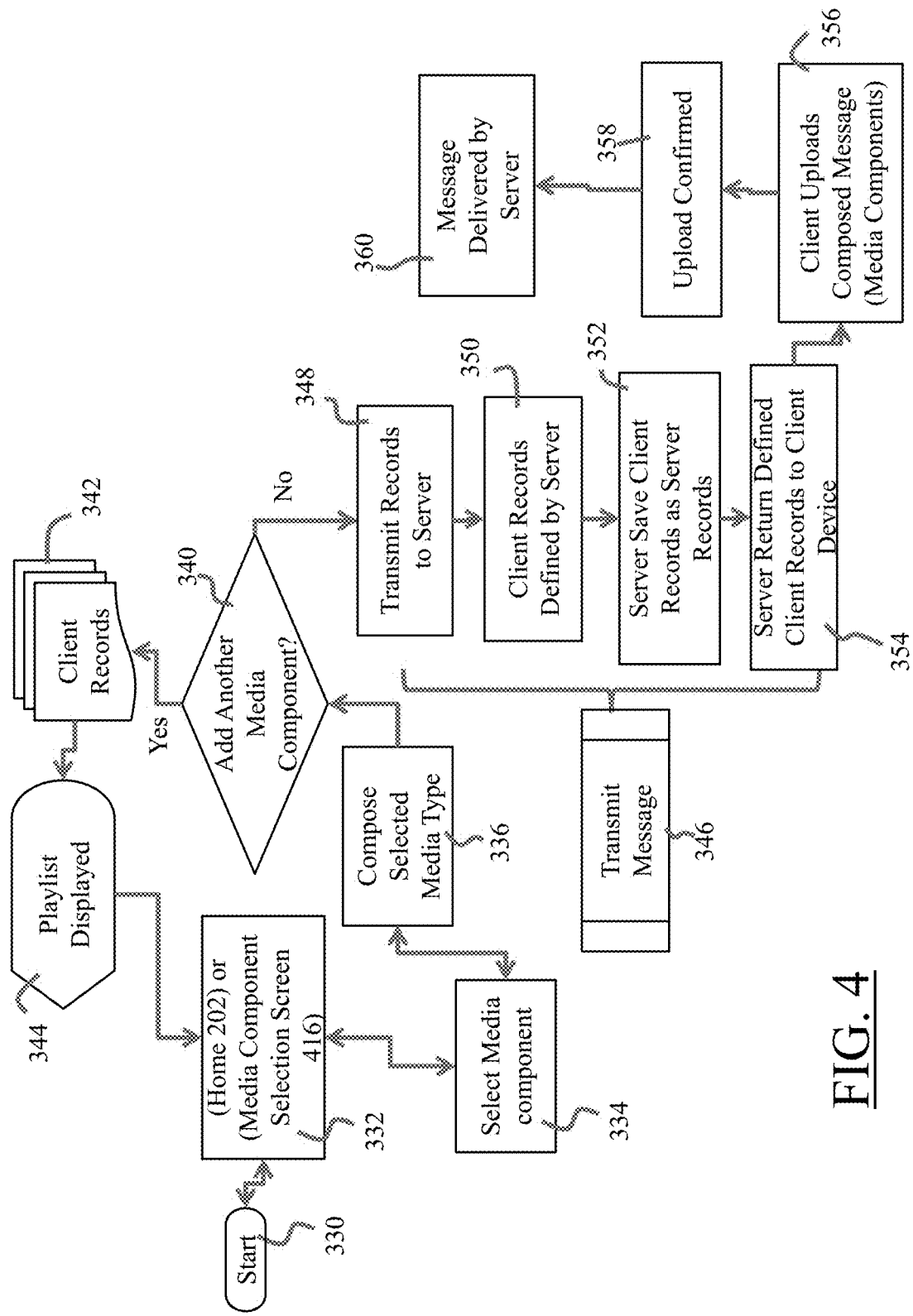
FIG. 4 in particular is a non-limiting exemplary block diagram, which schematically provides an overall overview illustration of the composition and delivery of an electronic message in accordance with the present invention.
Figure 4B:
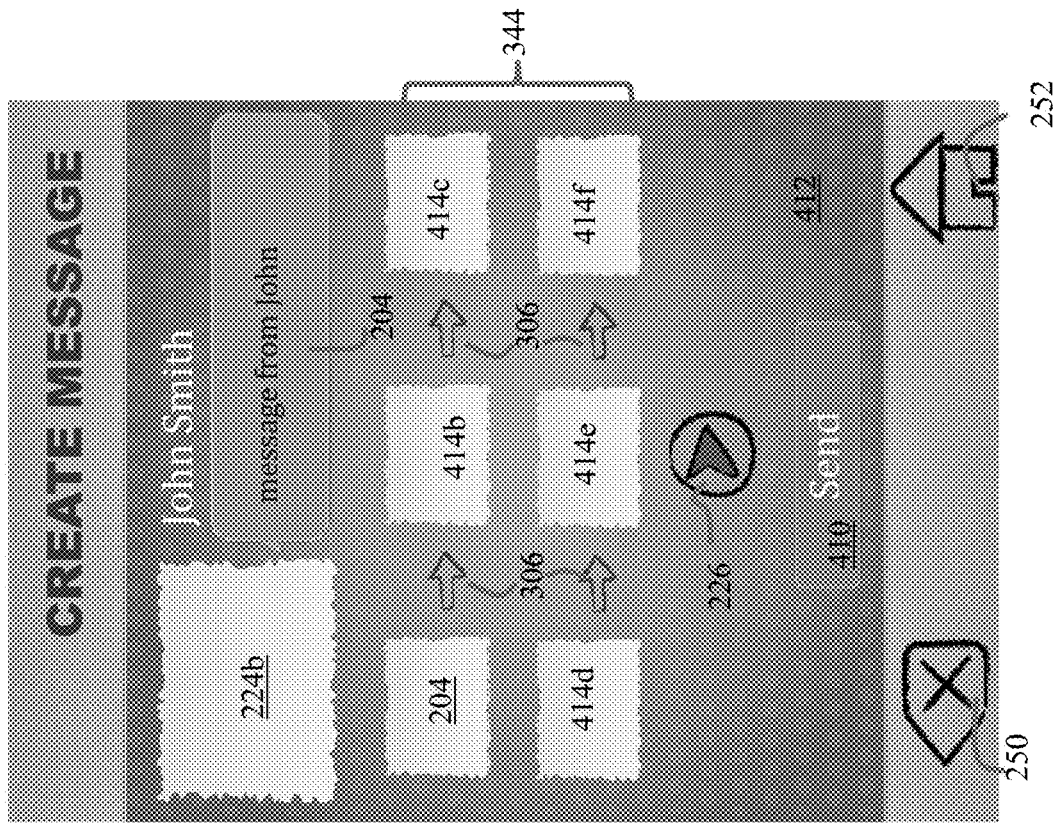
FIGS. 4A to 4L-6 show non-limiting, exemplary GUI representations of a finite set of non-limiting, exemplary electronic media components for composing a message in accordance with the general, overview scheme shown in FIG. 4.
Figure 4A:
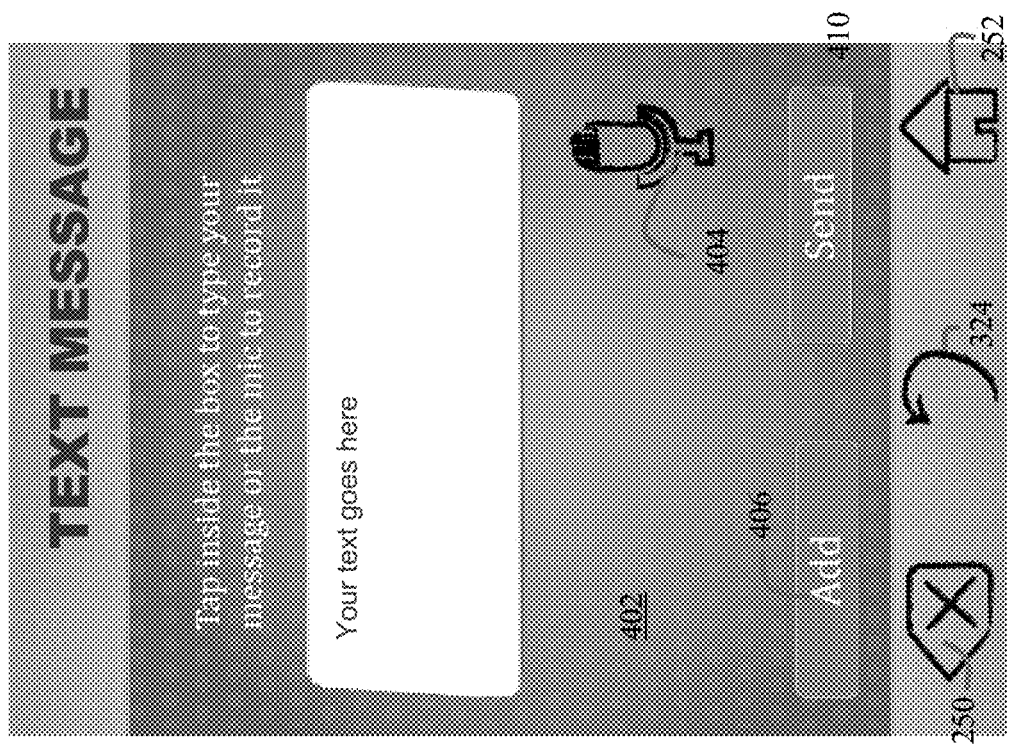
Figures 1, 4D:
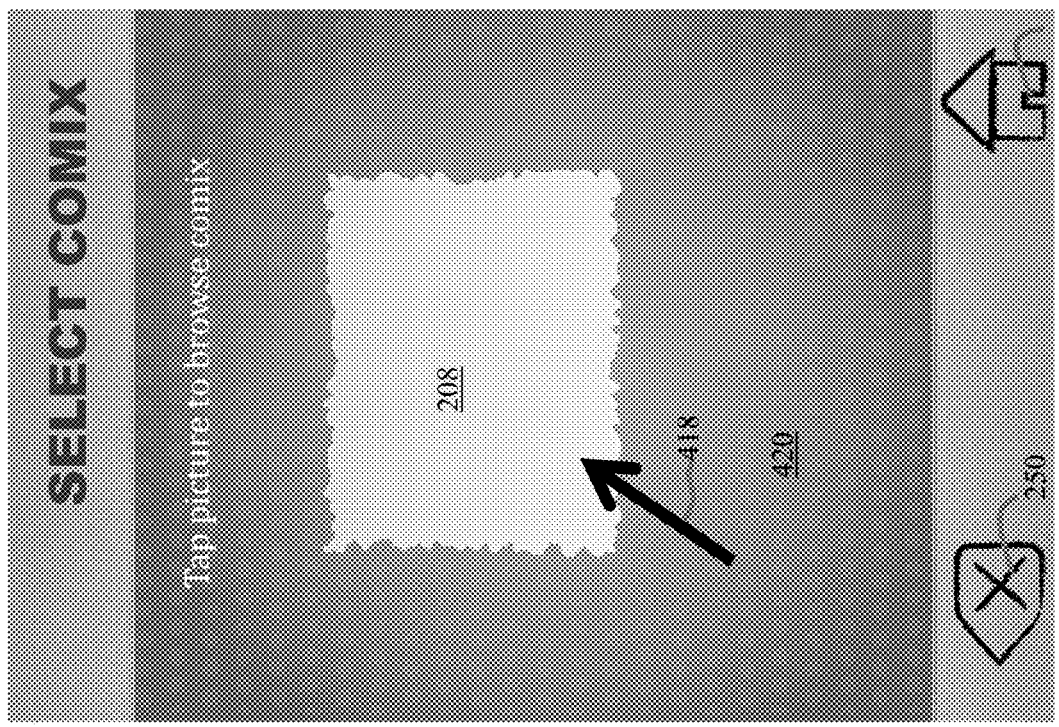
Figure 4C:
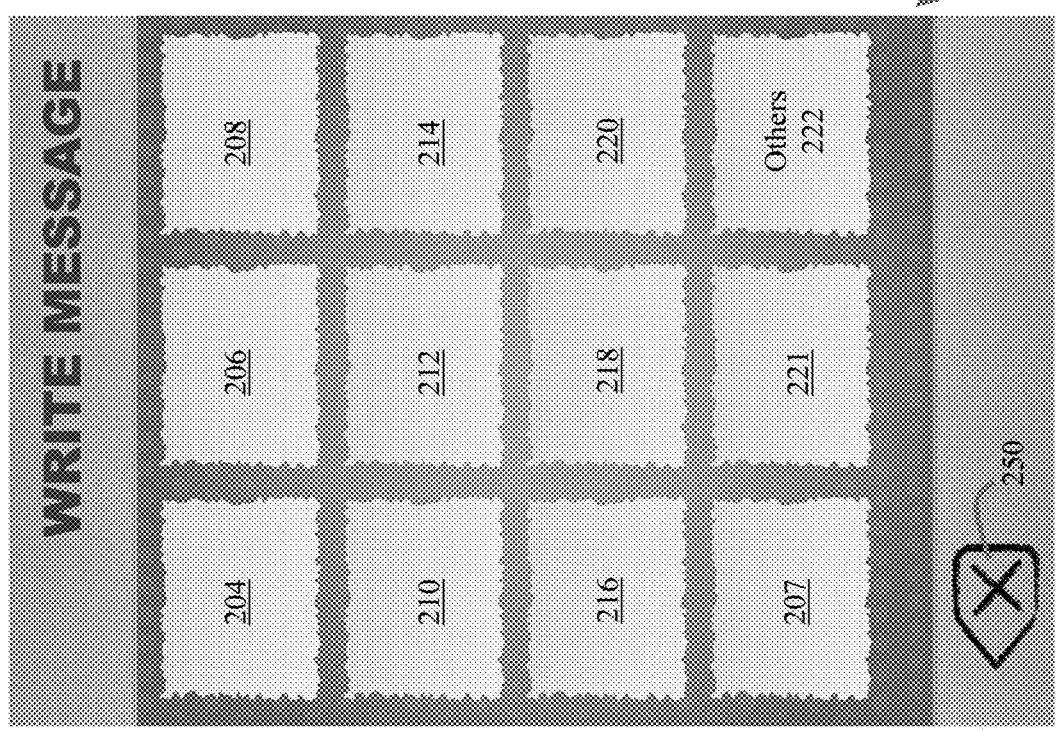
Figures 2, 4D:
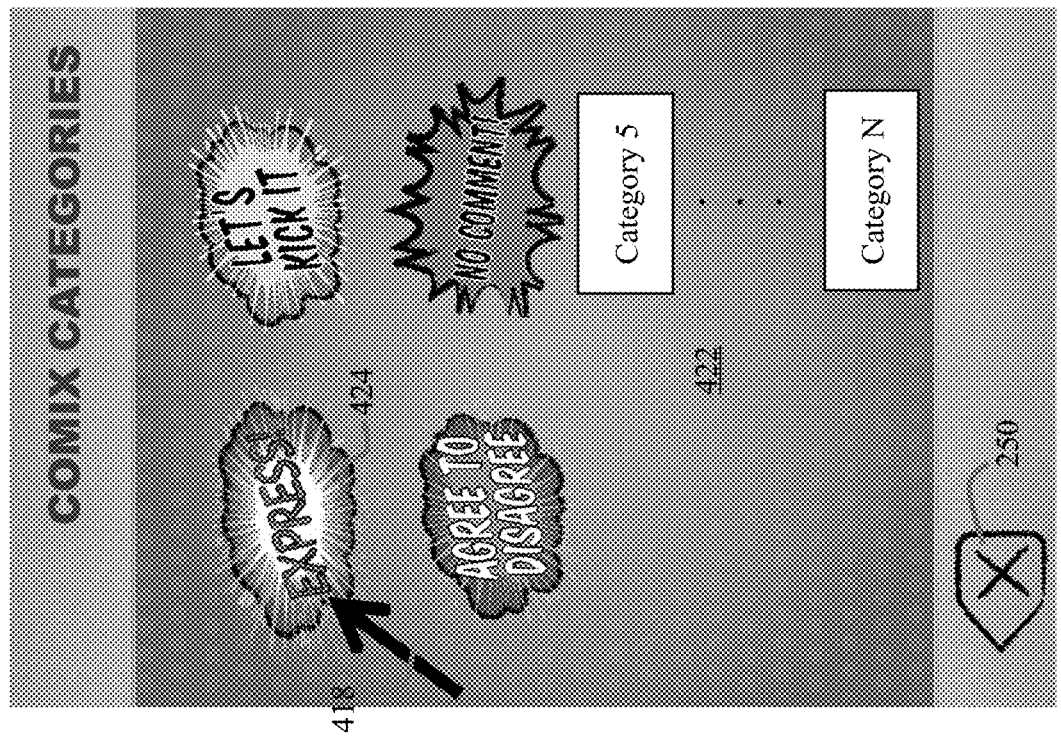
Figures 3, 4D:
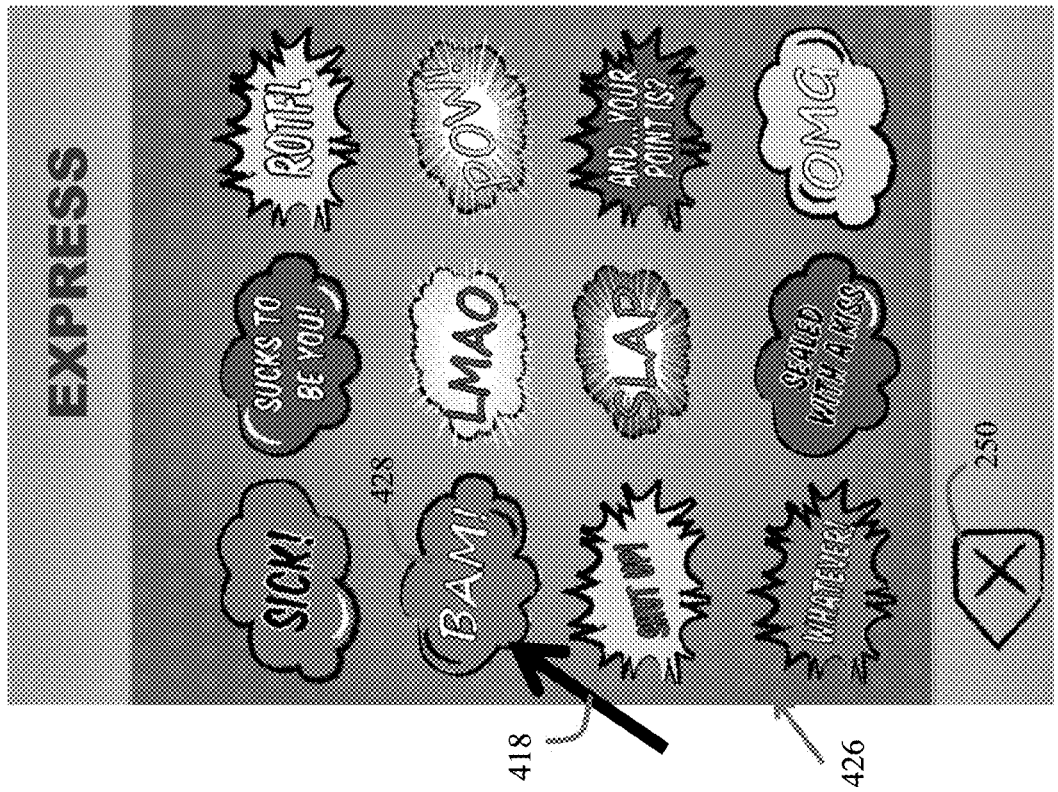
Figures 4, 4D, 5:
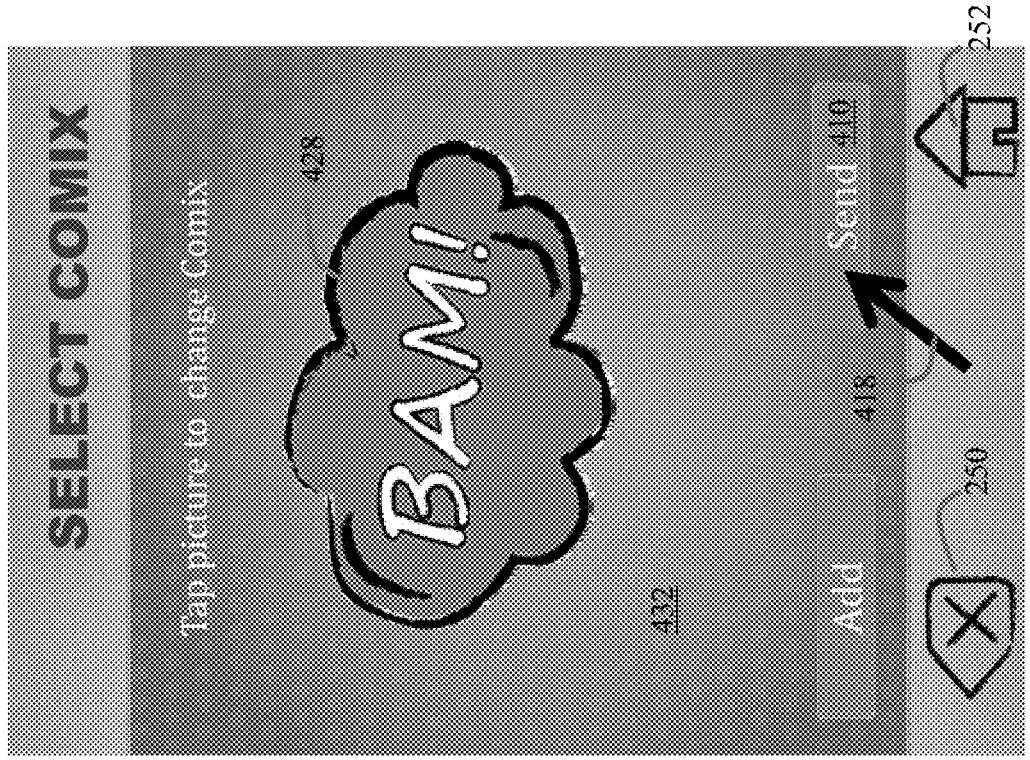
Figures 4, 4D:
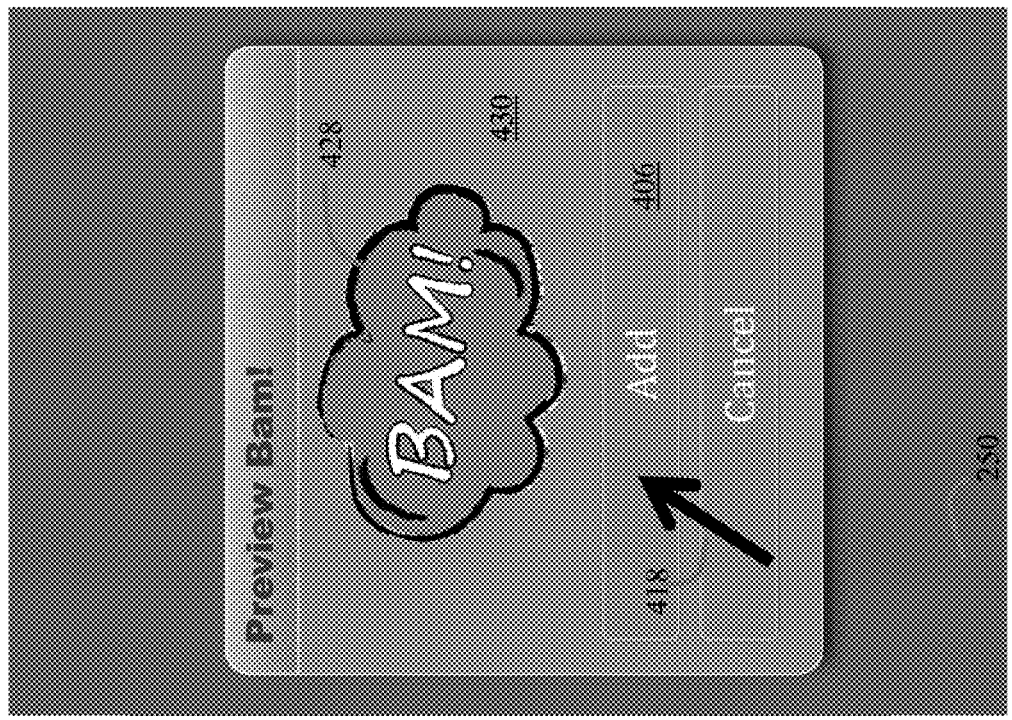
Figures 1, 4E:
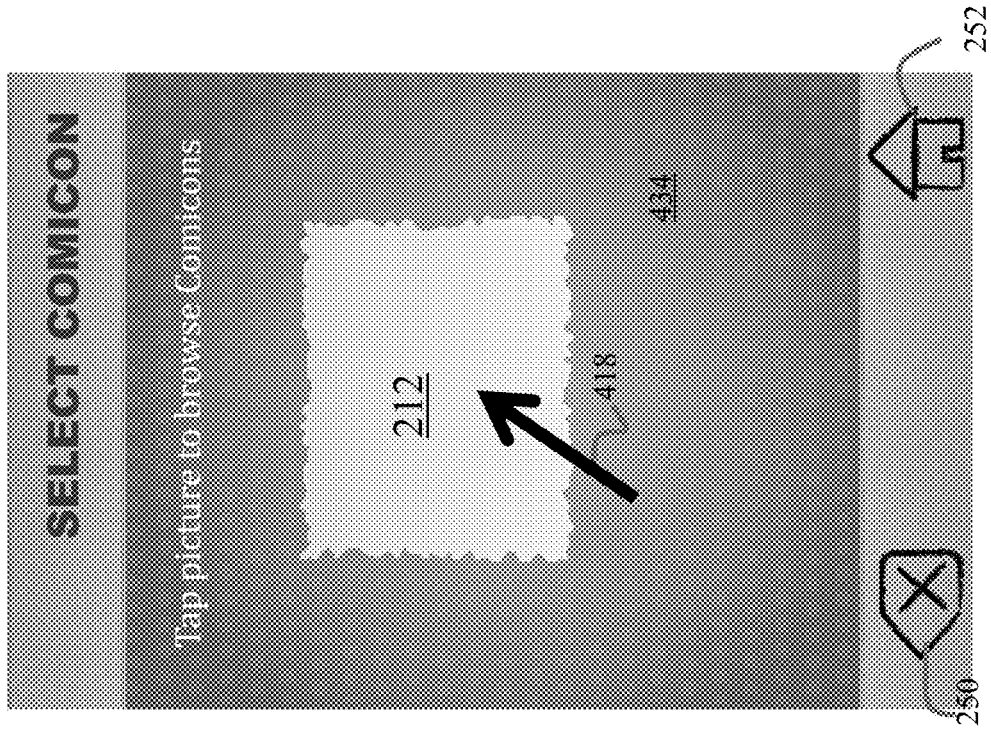
Figures 4, 4D, 5, 6:
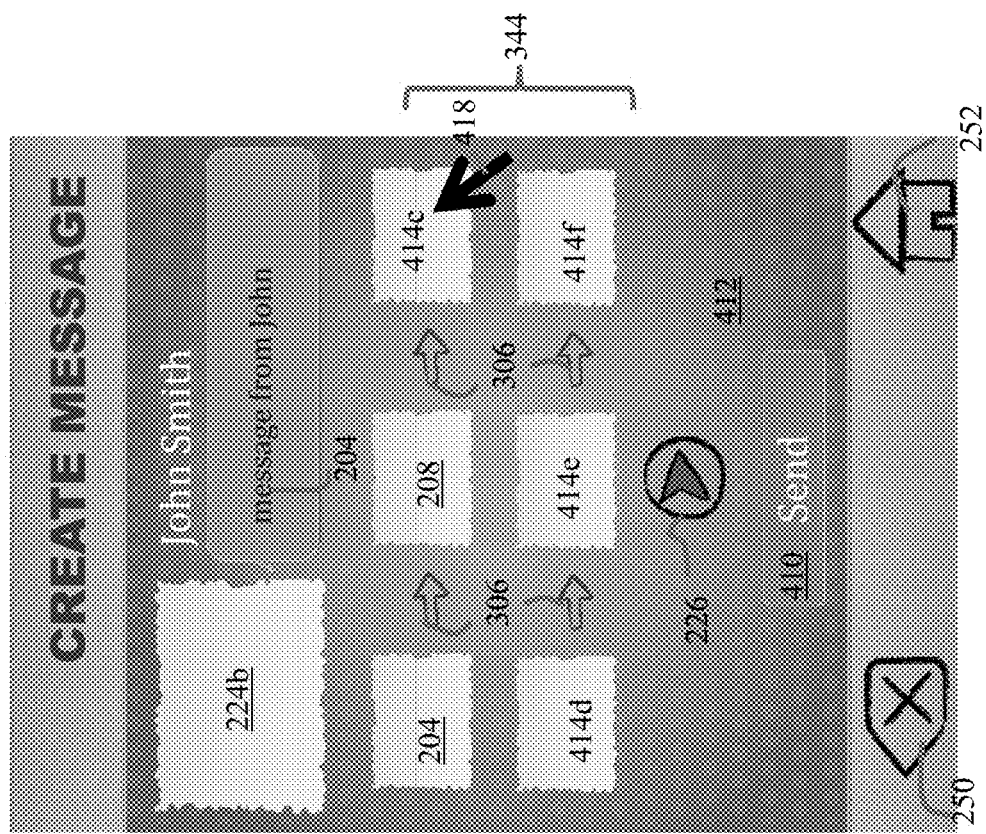
Figures 3, 4E:
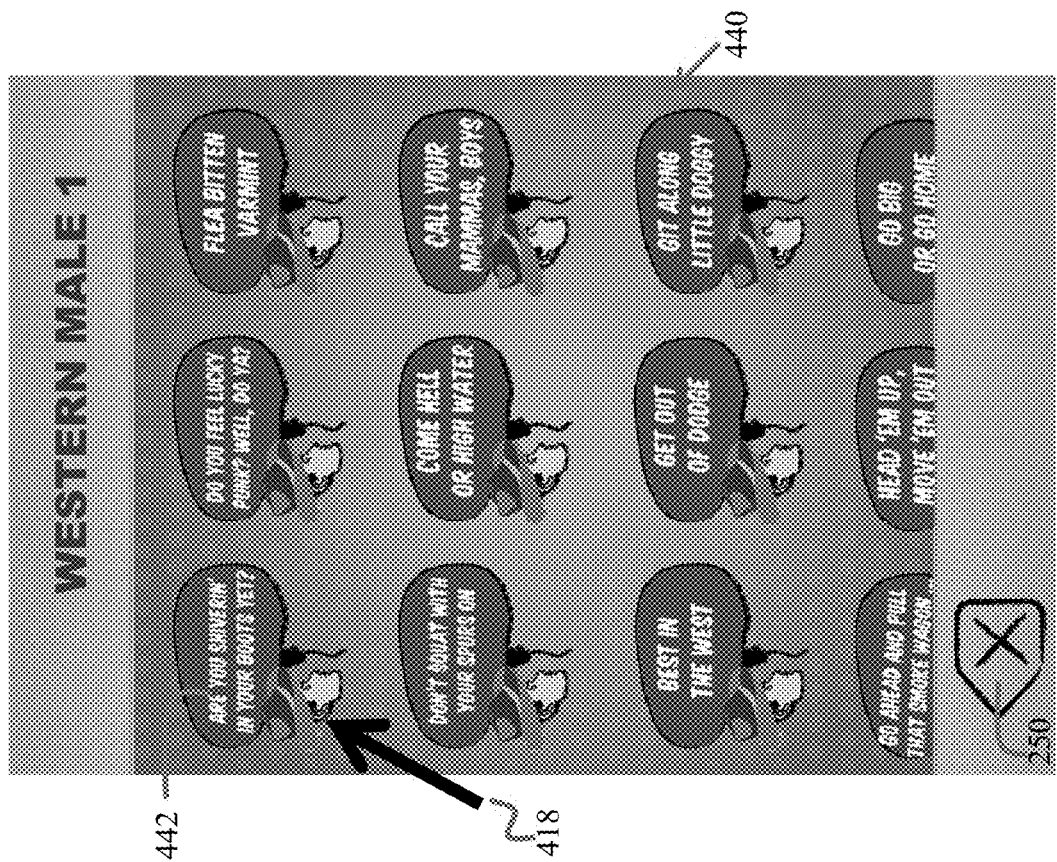
Figures 2, 4E:
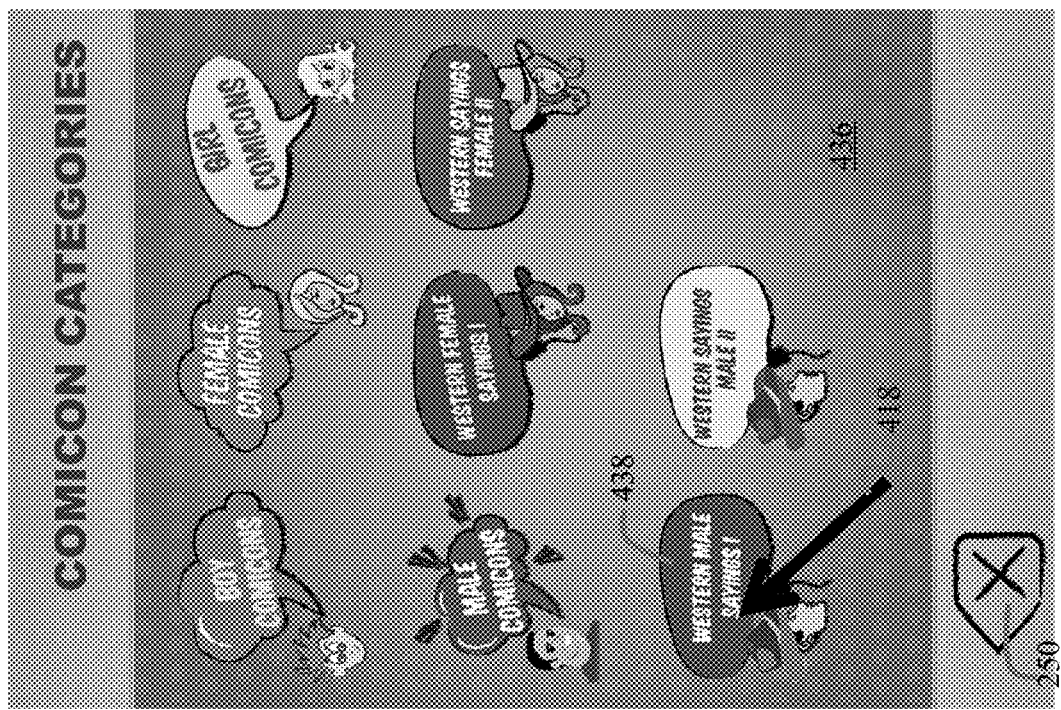
Figures 4, 4E, 5:
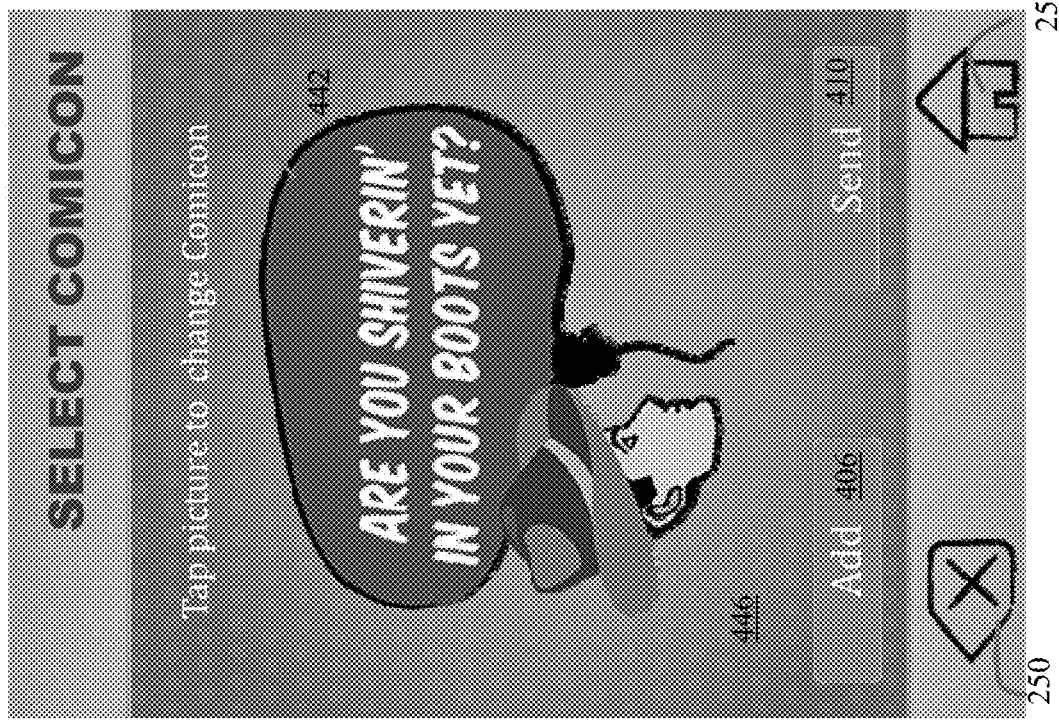
Figures 4, 4E:
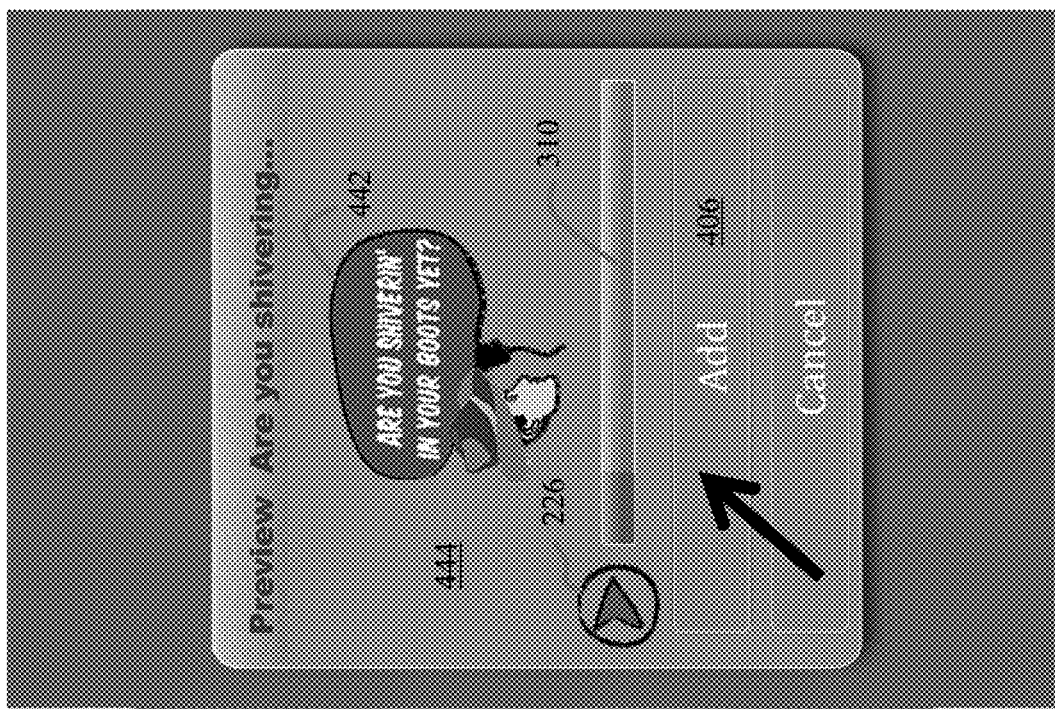
Figures 1, 4F:
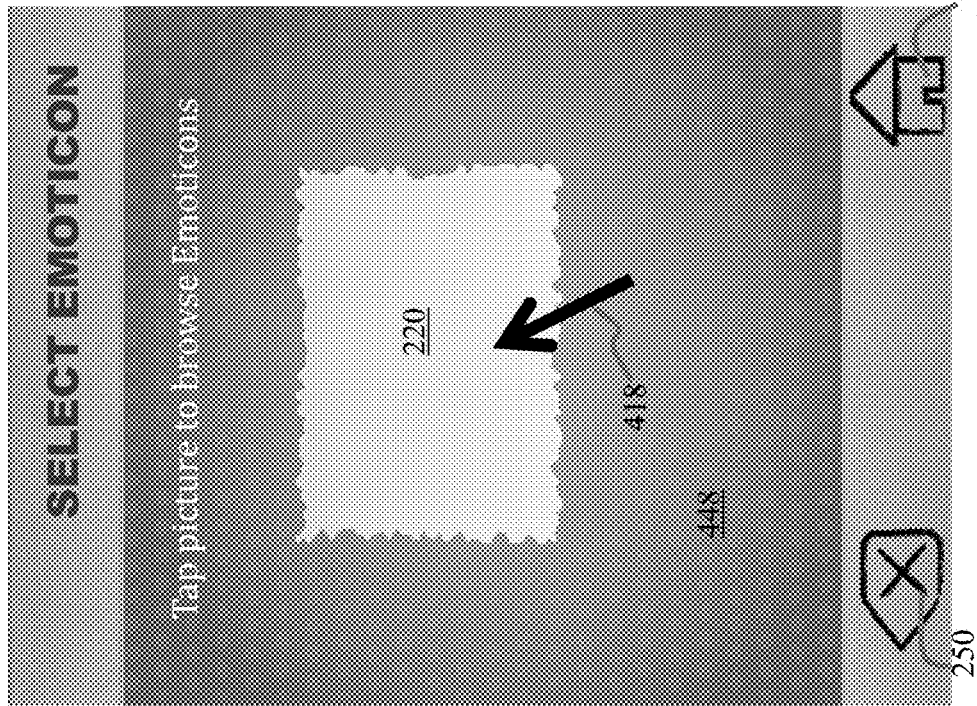
Figures 4, 4E, 5, 6:
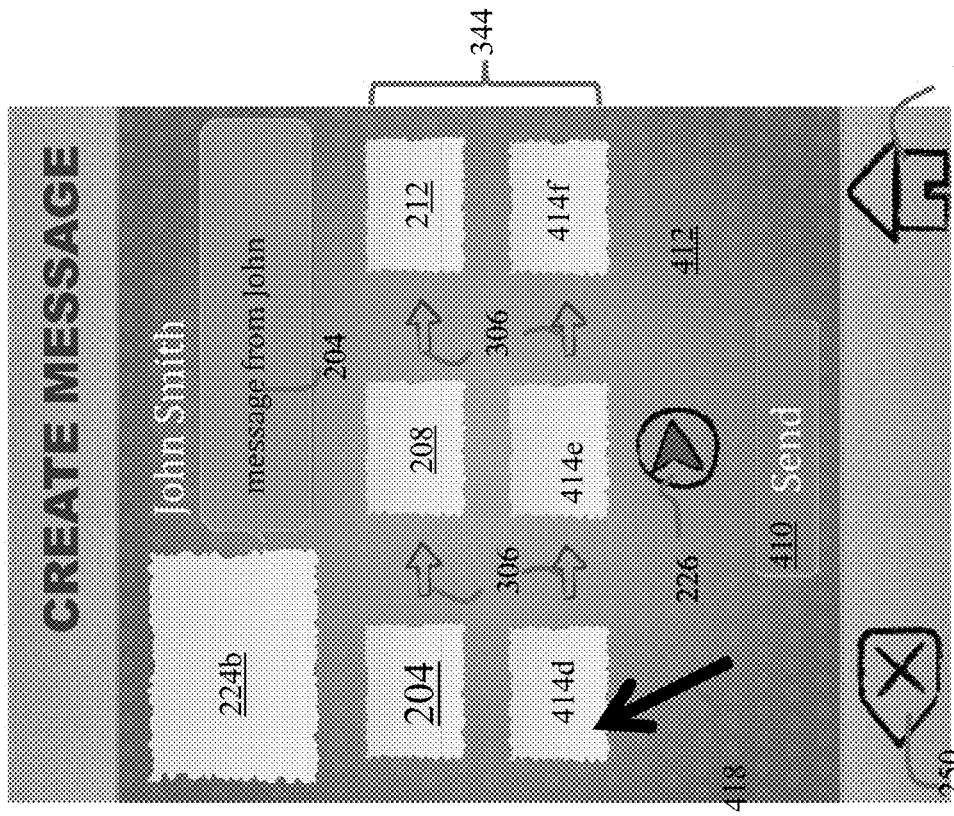
Figures 2, 3, 4F:
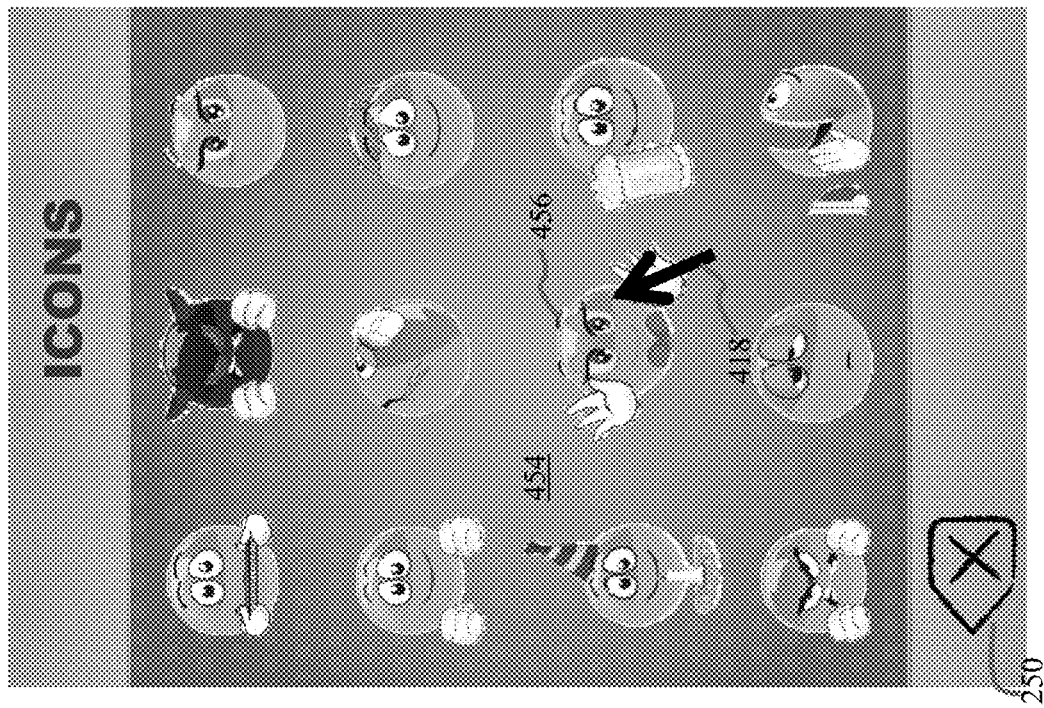
Figures 4, 4F, 5:
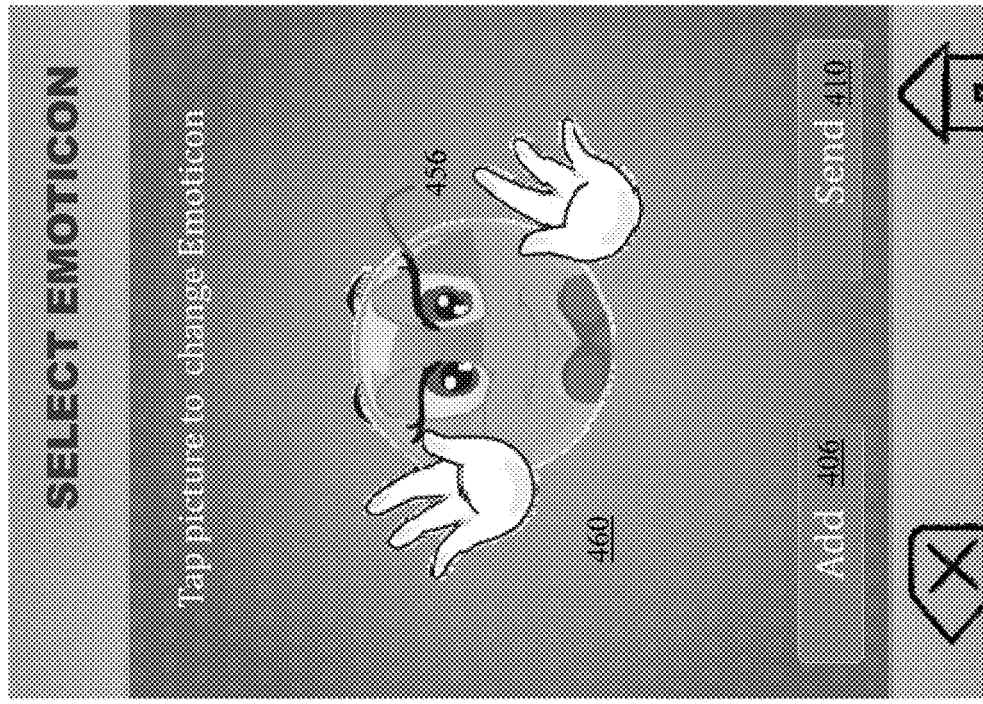
Figures 4, 4F:
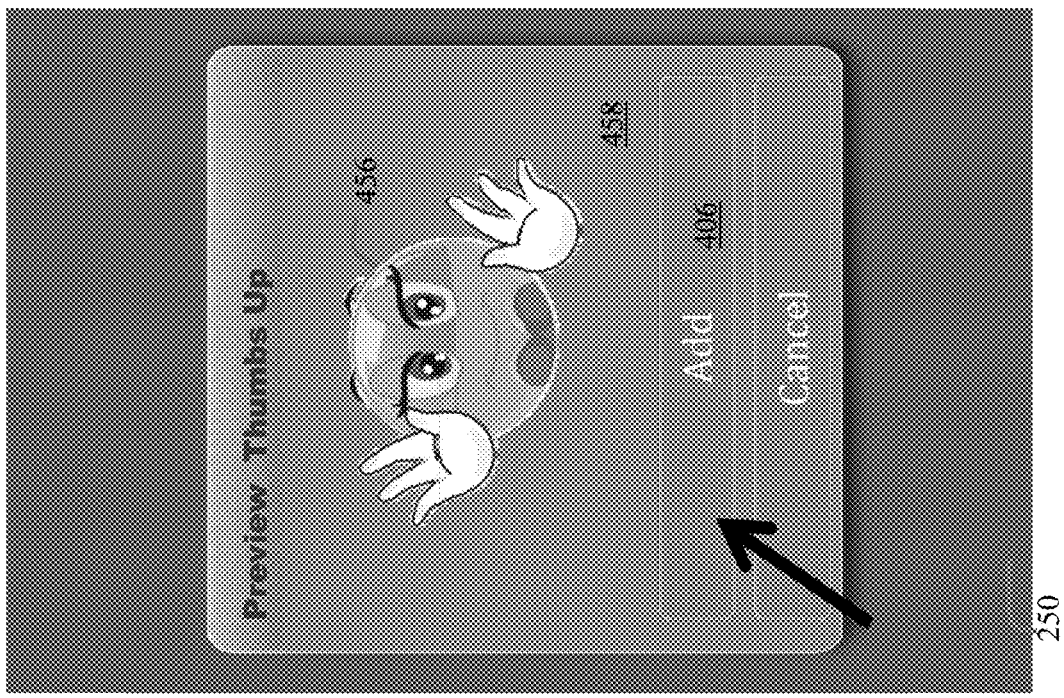
Figures 1, 4G:
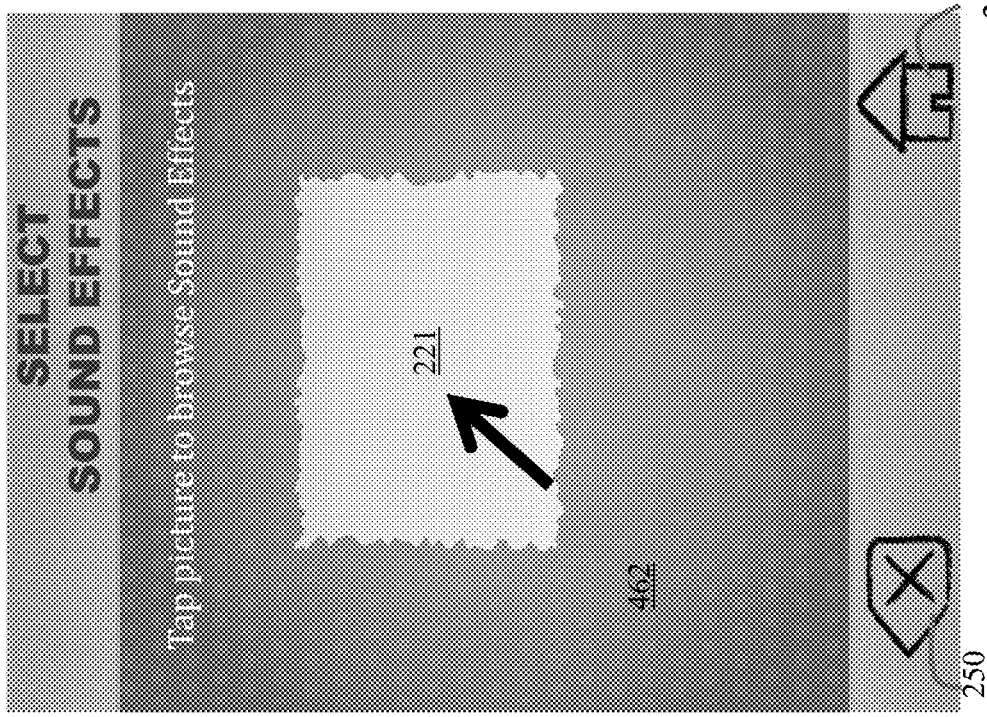
Figures 4, 4F, 5, 6:
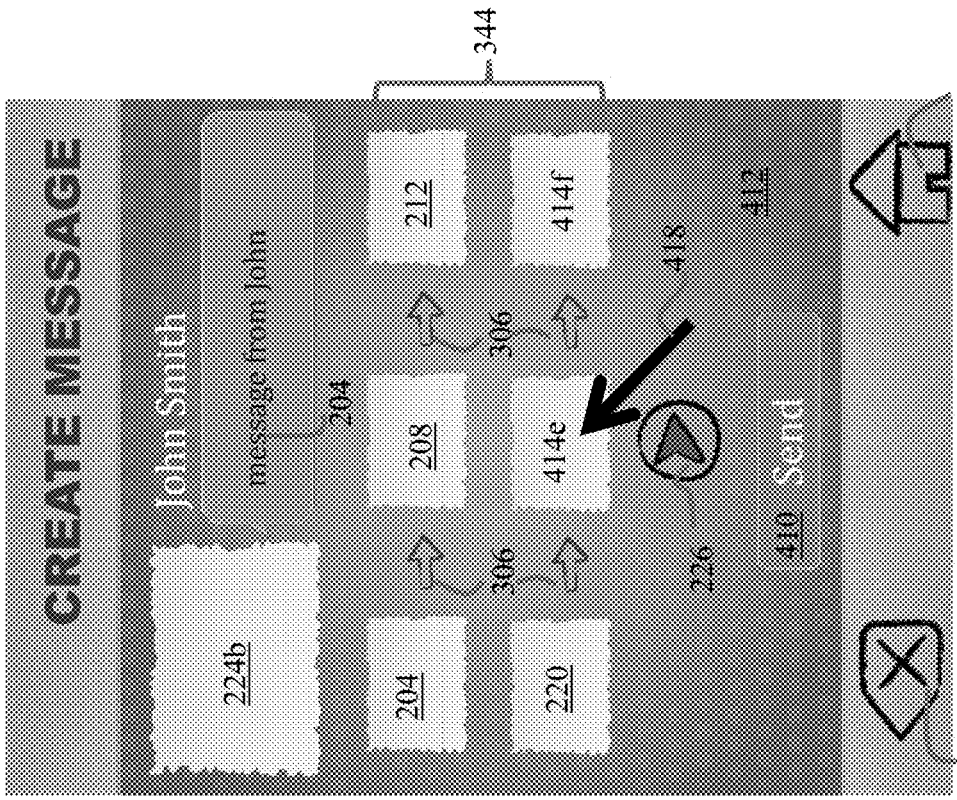
Figures 3, 4G:
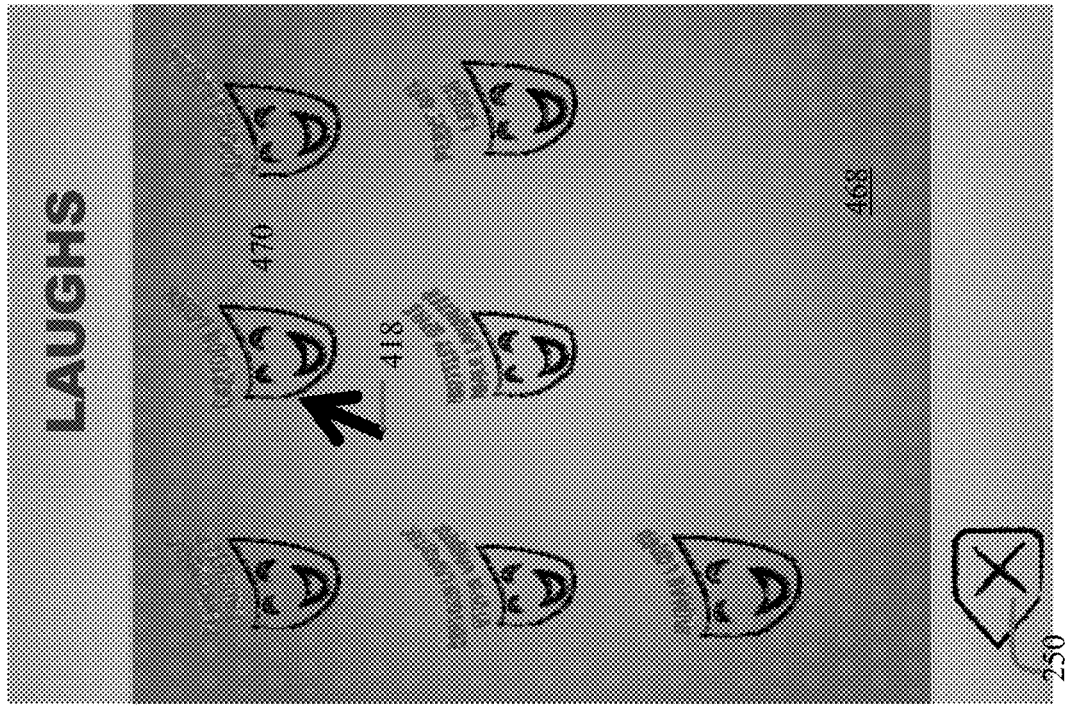
Figures 2, 4G:
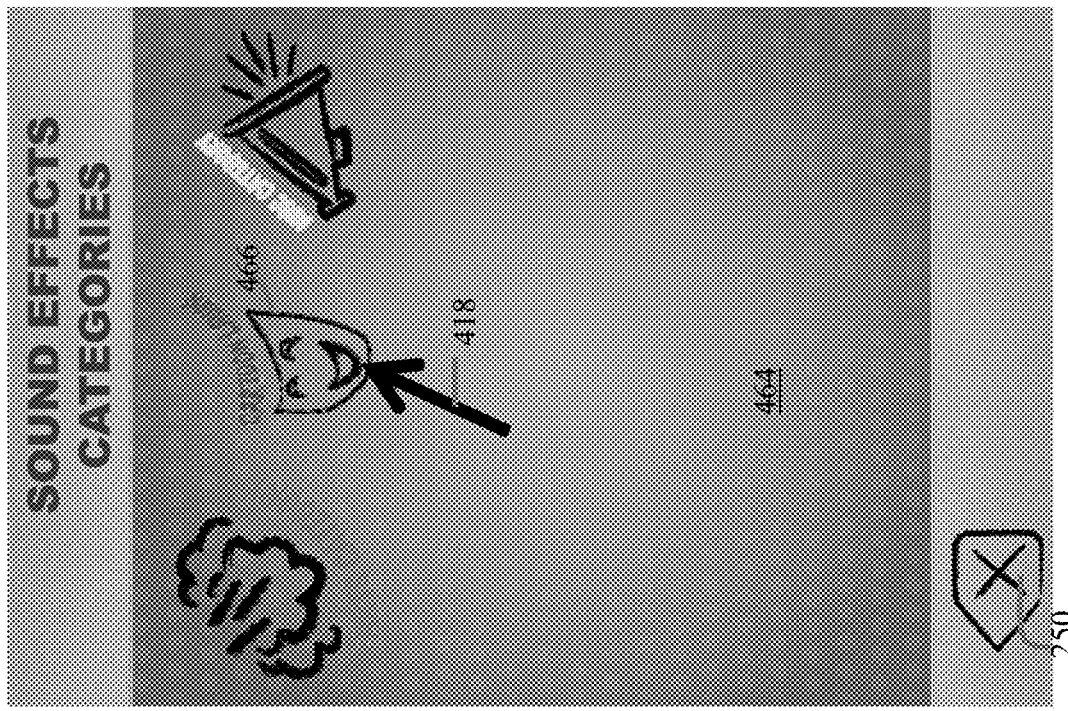
Figures 4, 4G, 5:
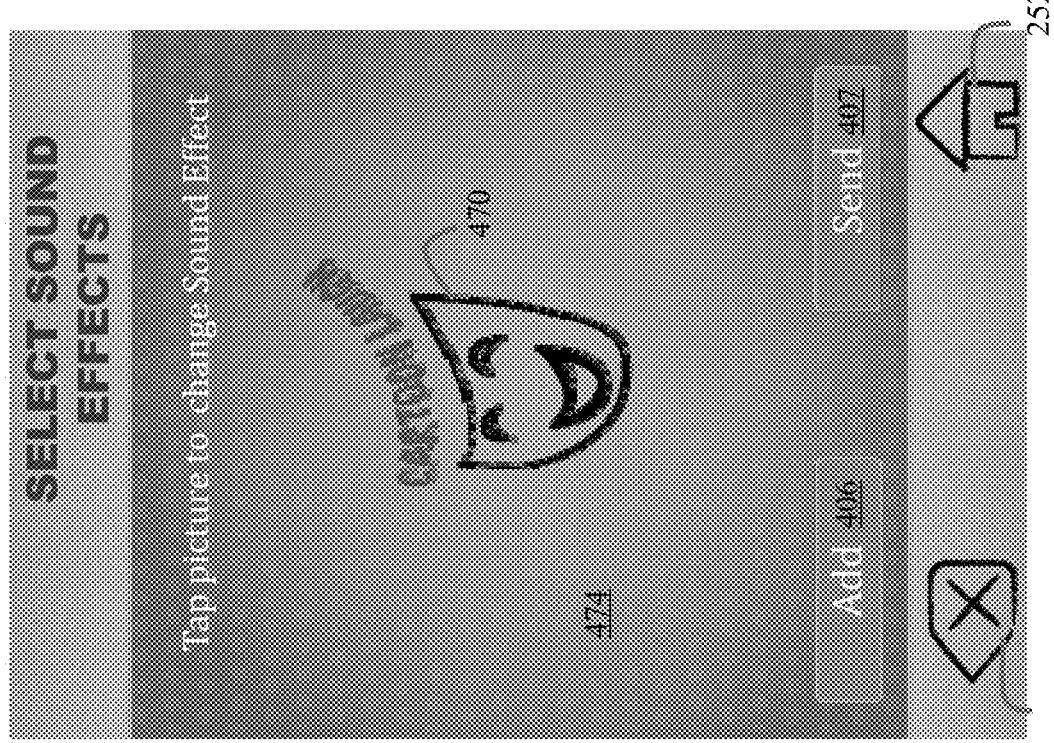
Figures 4, 4G:
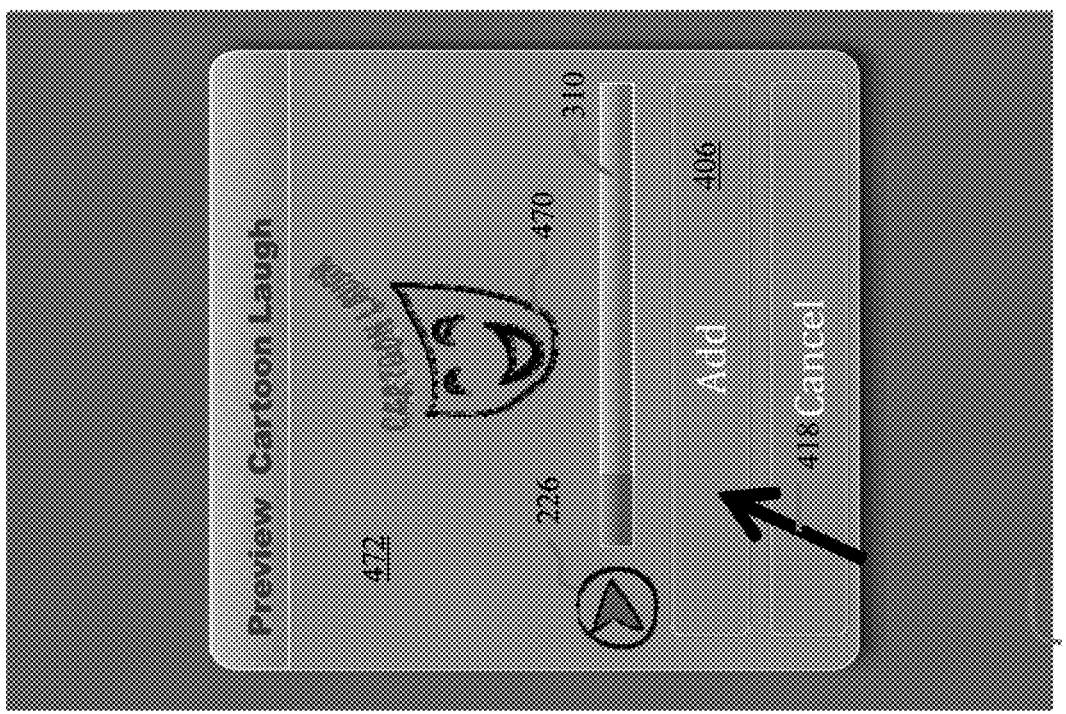
Figures 4, 4G, 5, 6, 7:
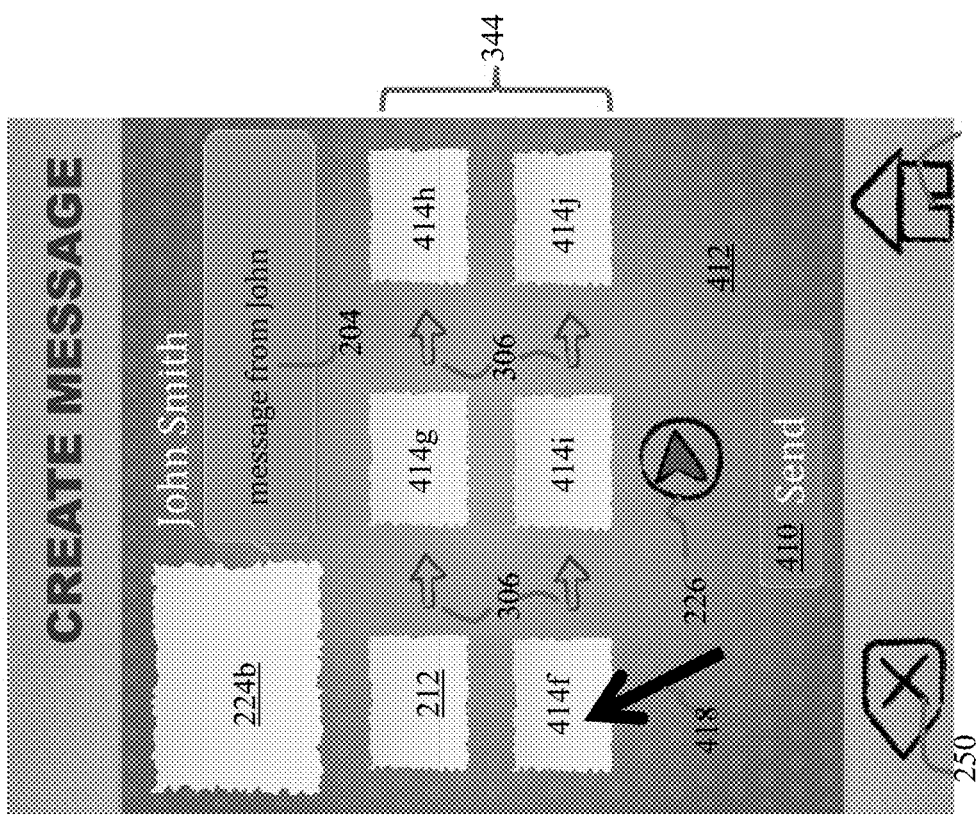
Figures 4, 4G, 5, 6:
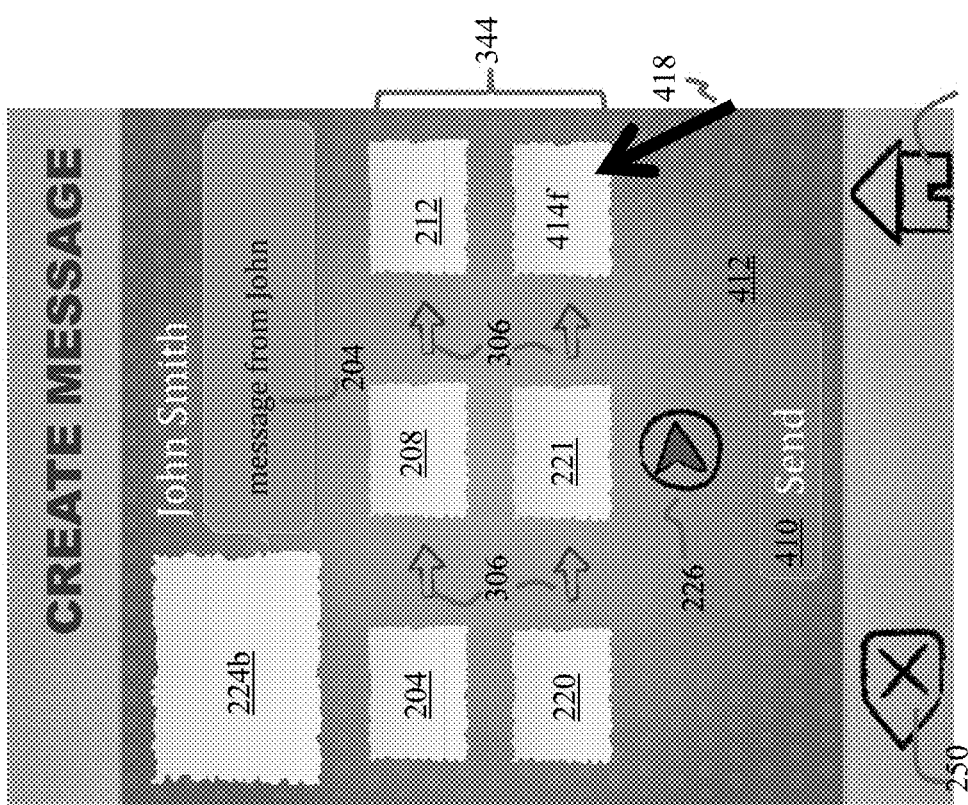
Figures 2, 4H:
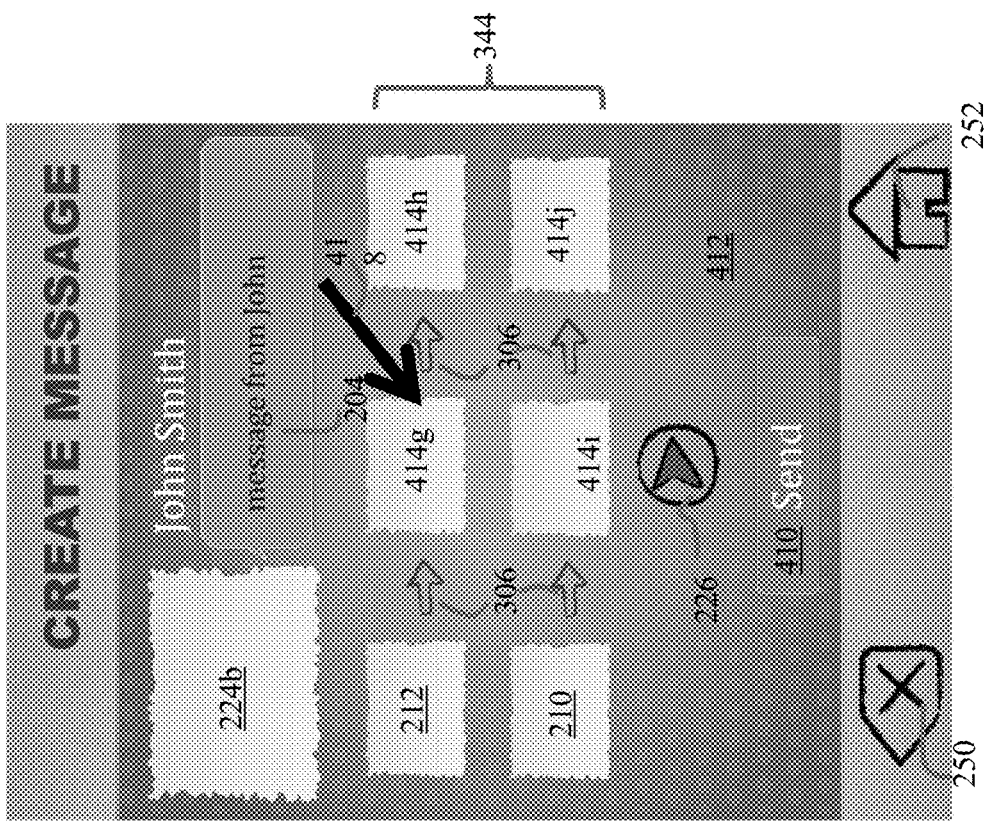
Figures 1, 4H:
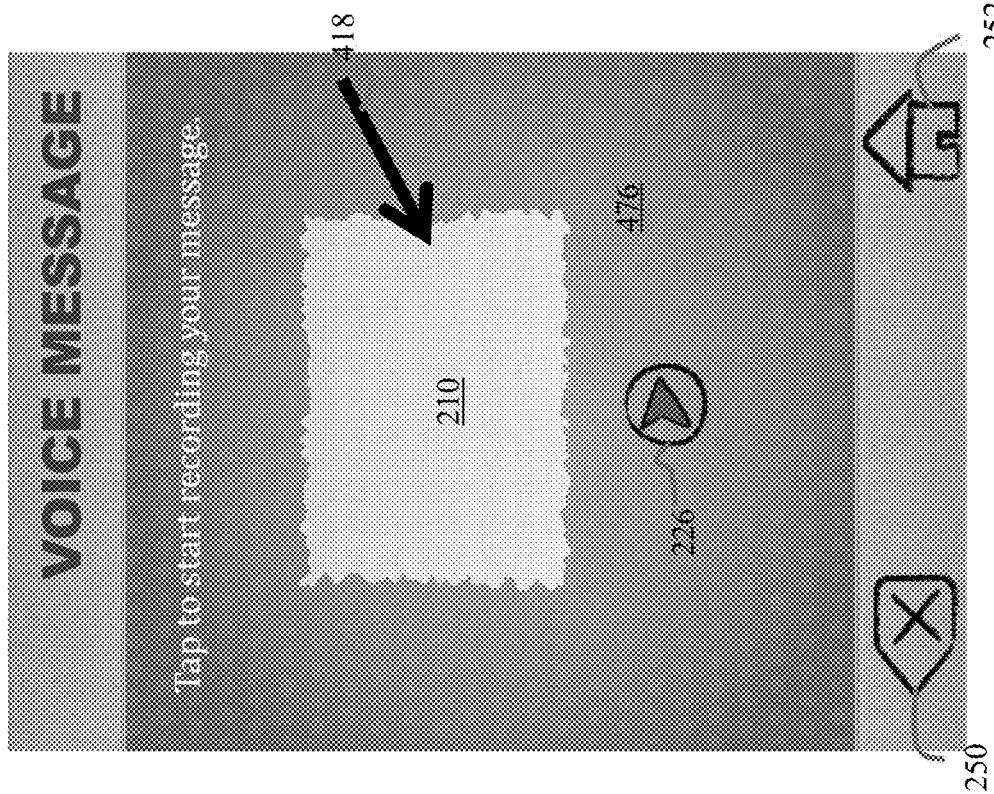
Figures 4, 4H:
Figures 3, 4H:
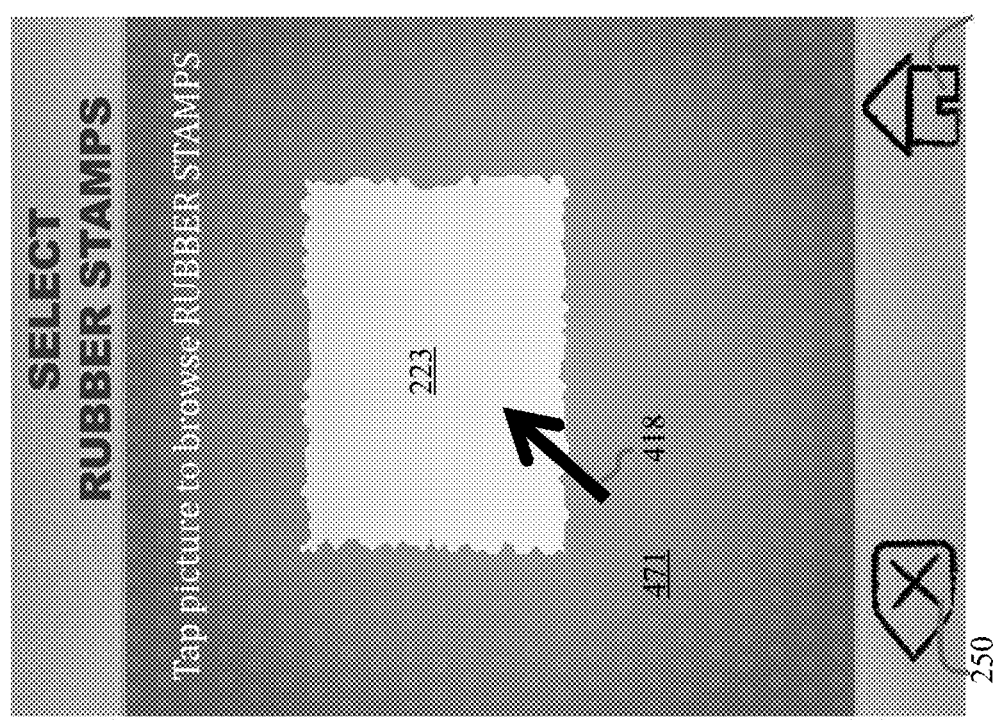
Figures 4, 4H, 5, 6:
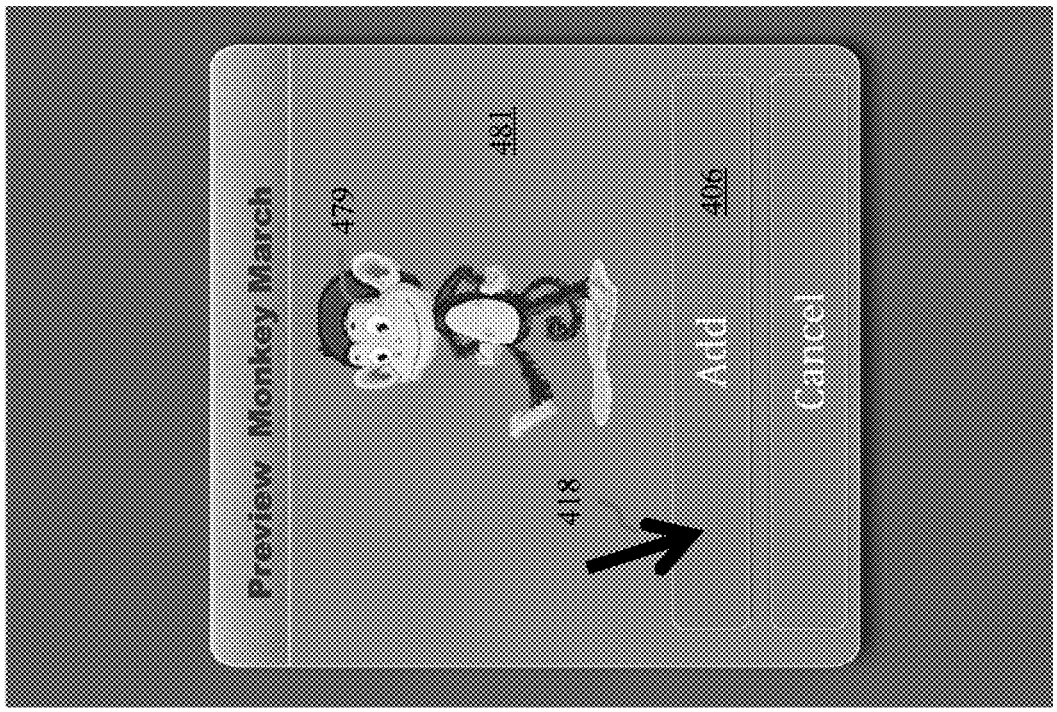
Figures 4, 4H, 5:
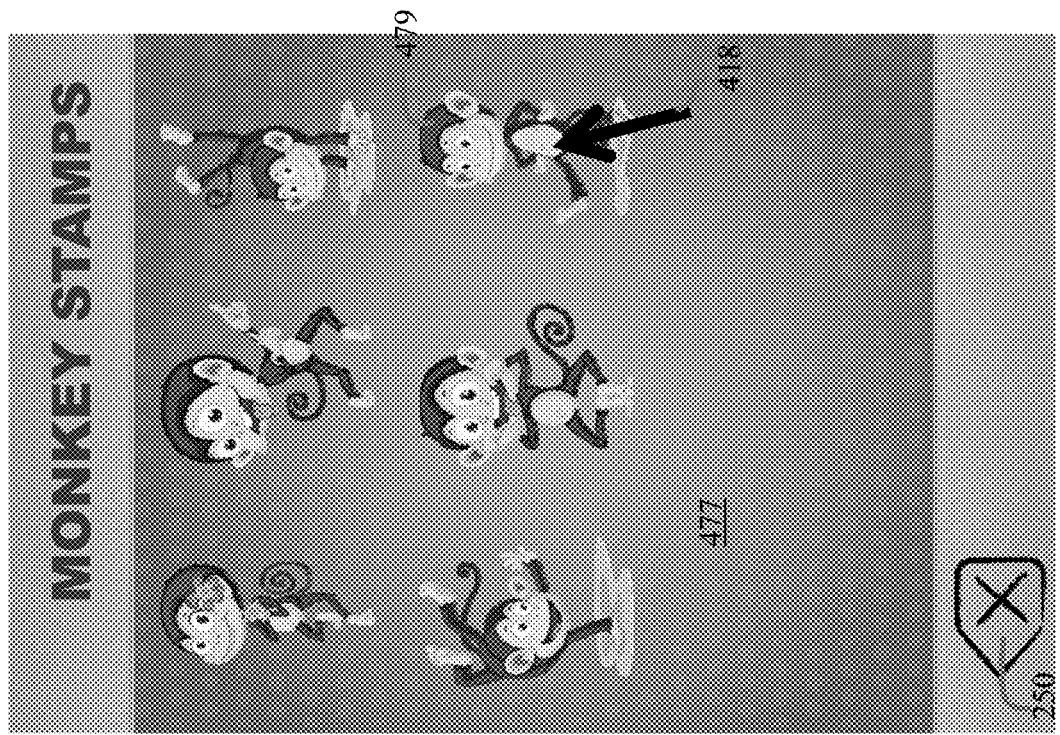
Figures 4, 4H, 5, 6, 7, 8:
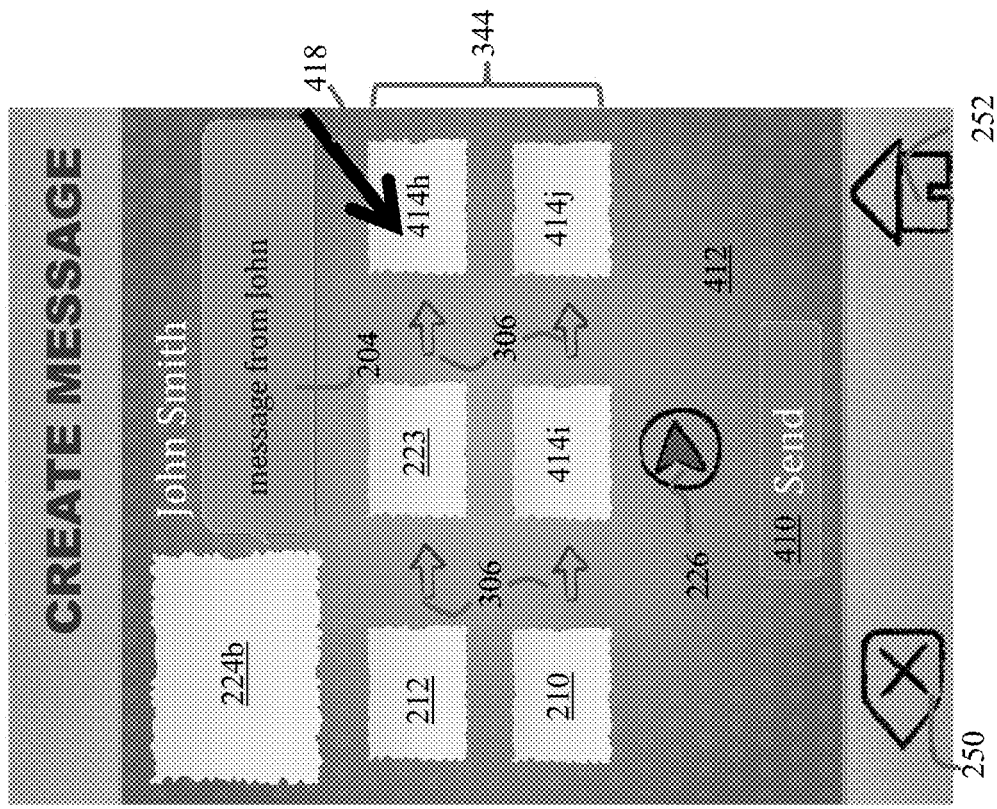
Figures 4, 4H, 5, 6, 7:
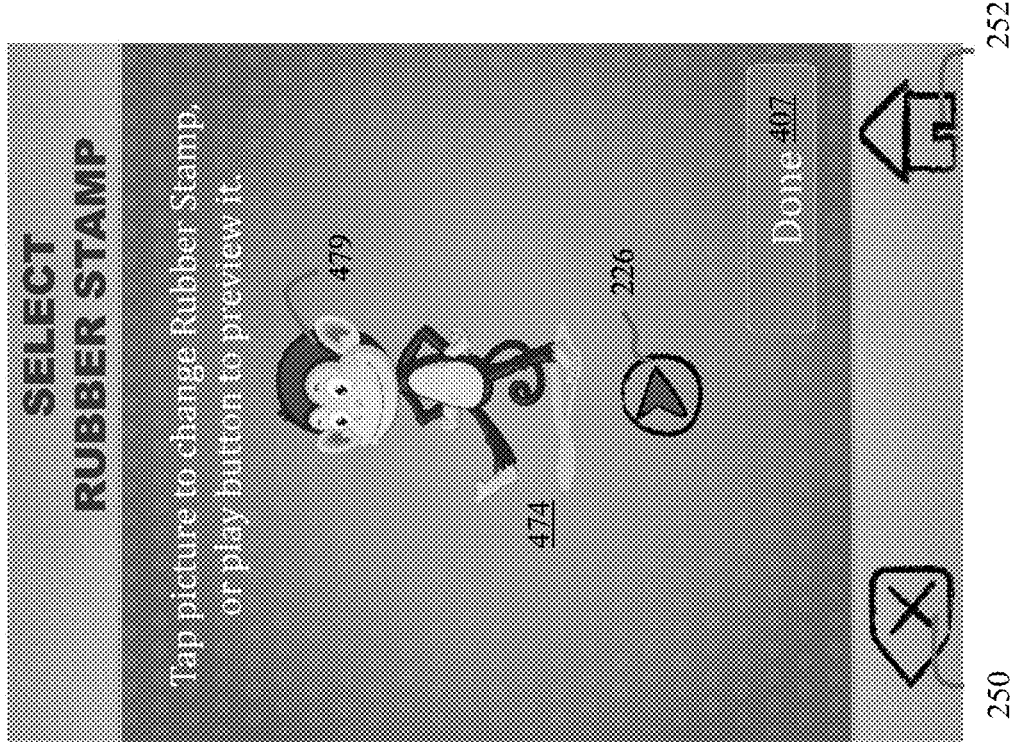
Figures 2, 4I:
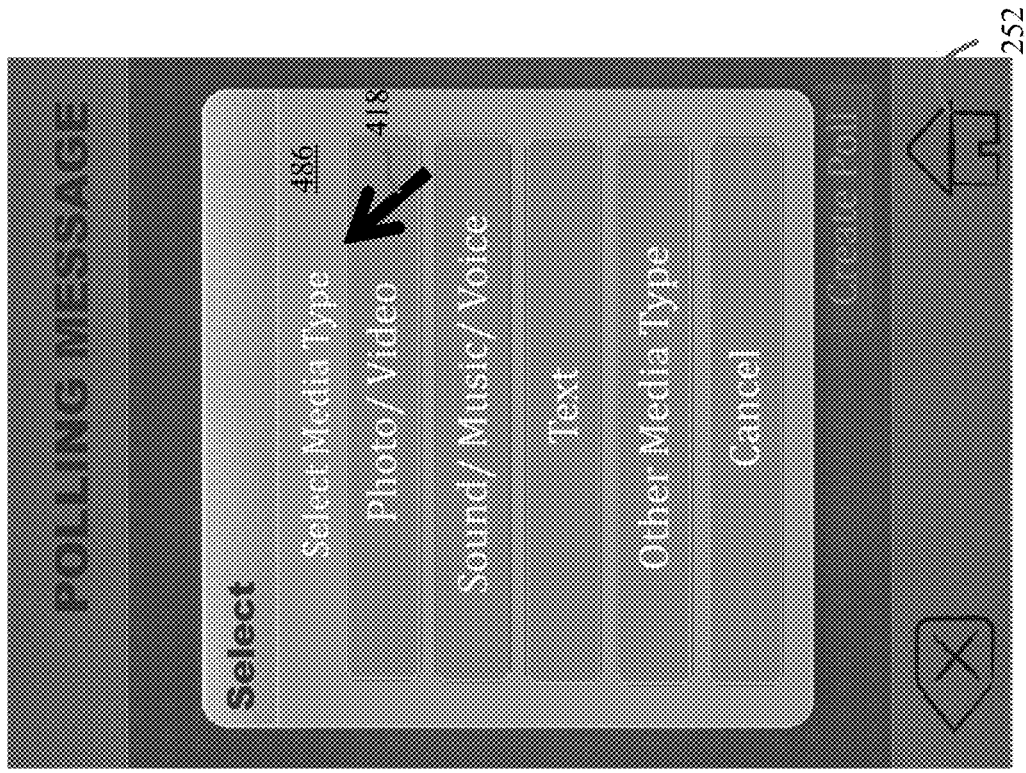
Figures 1, 4I:
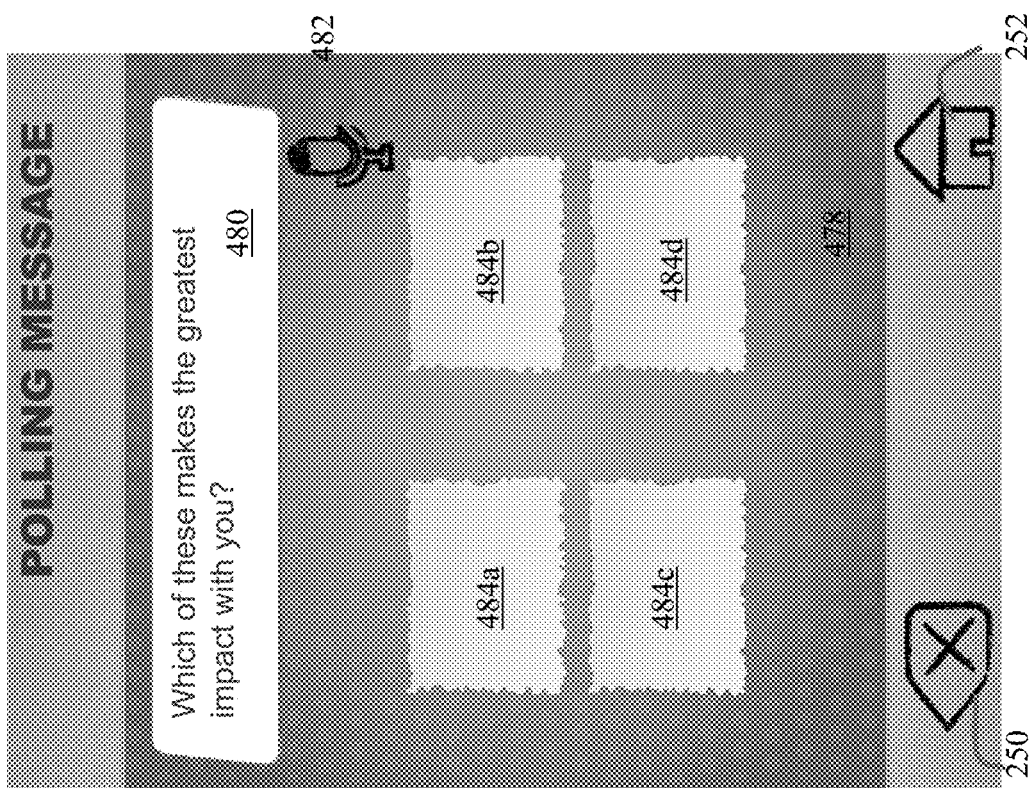
Figures 4, 4I:
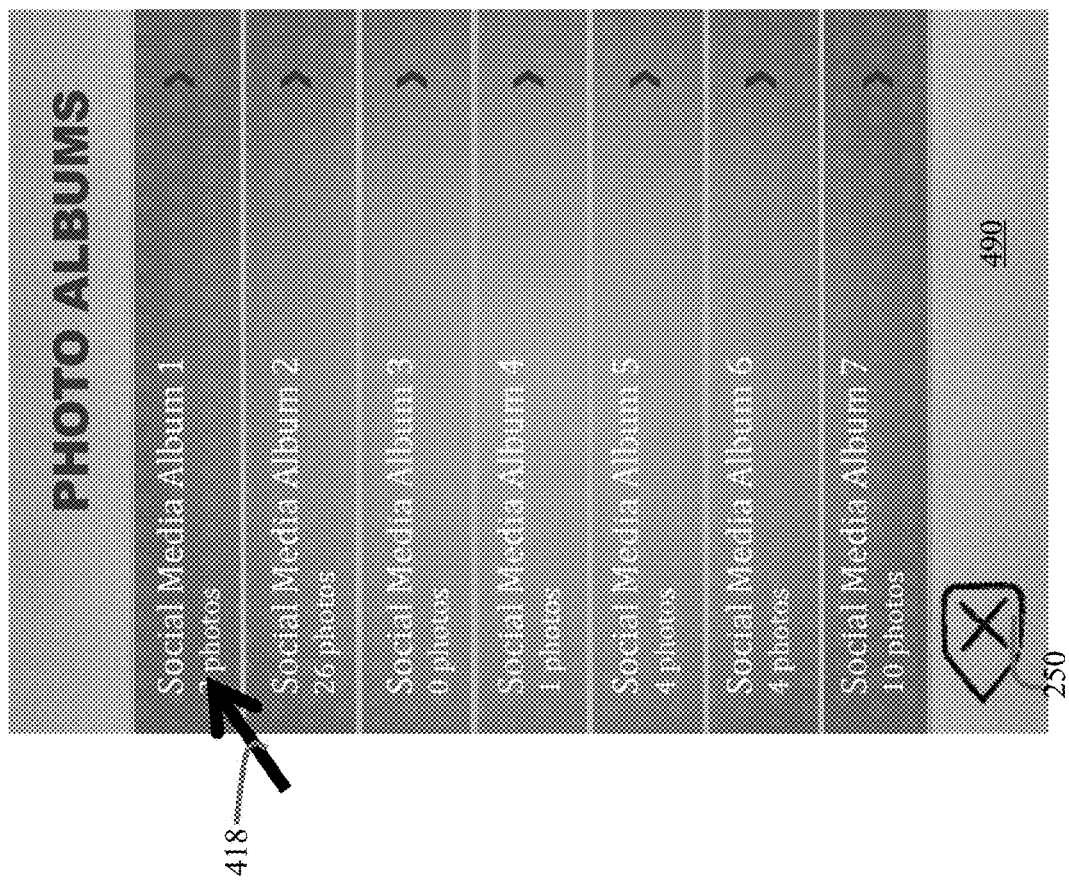
Figures 3, 4I:
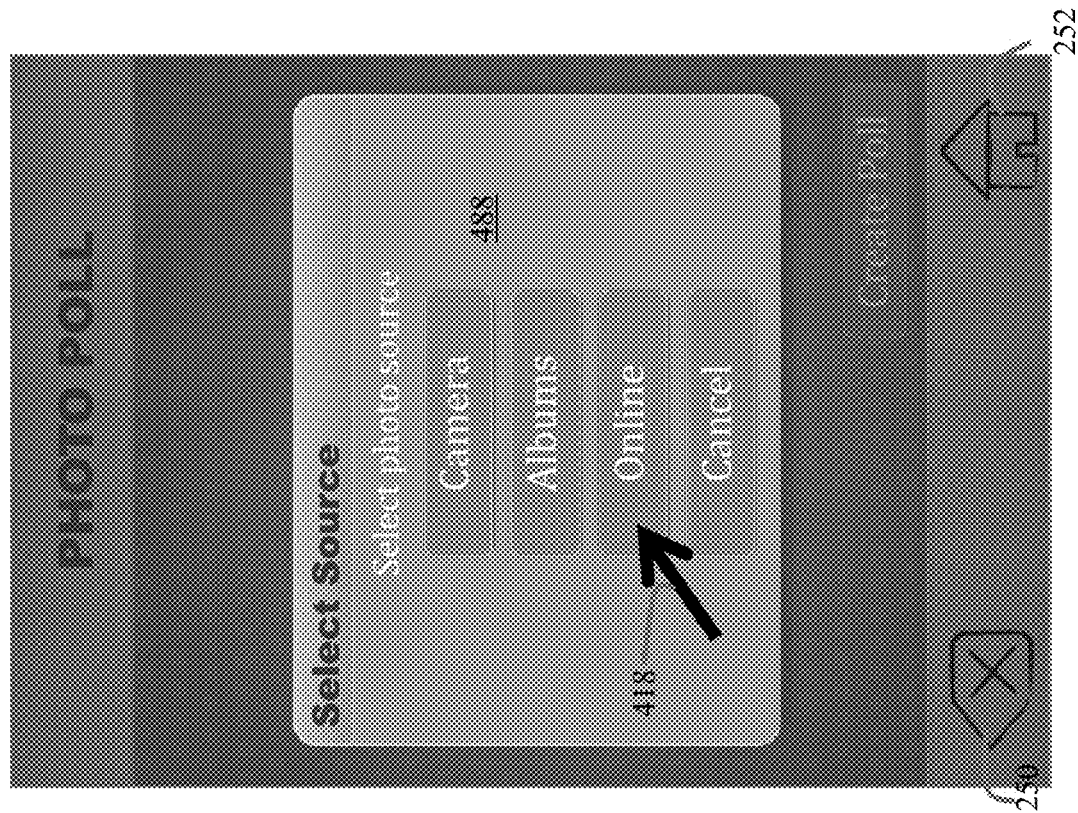
Figures 4, 4I, 5, 6:
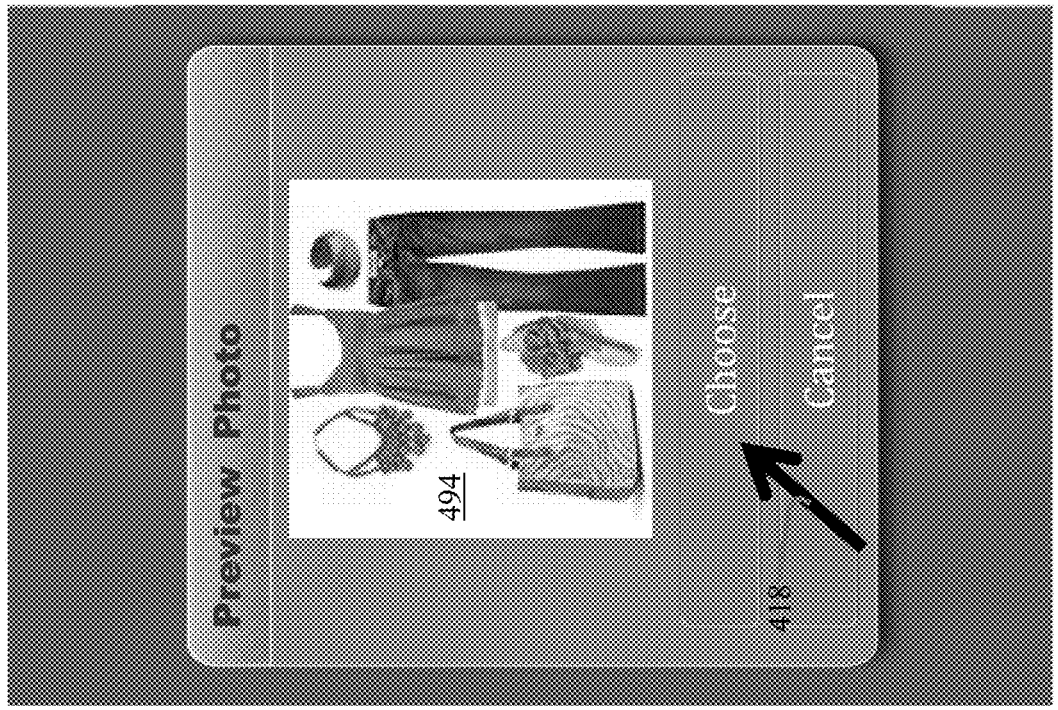
Figures 4, 4I, 5:
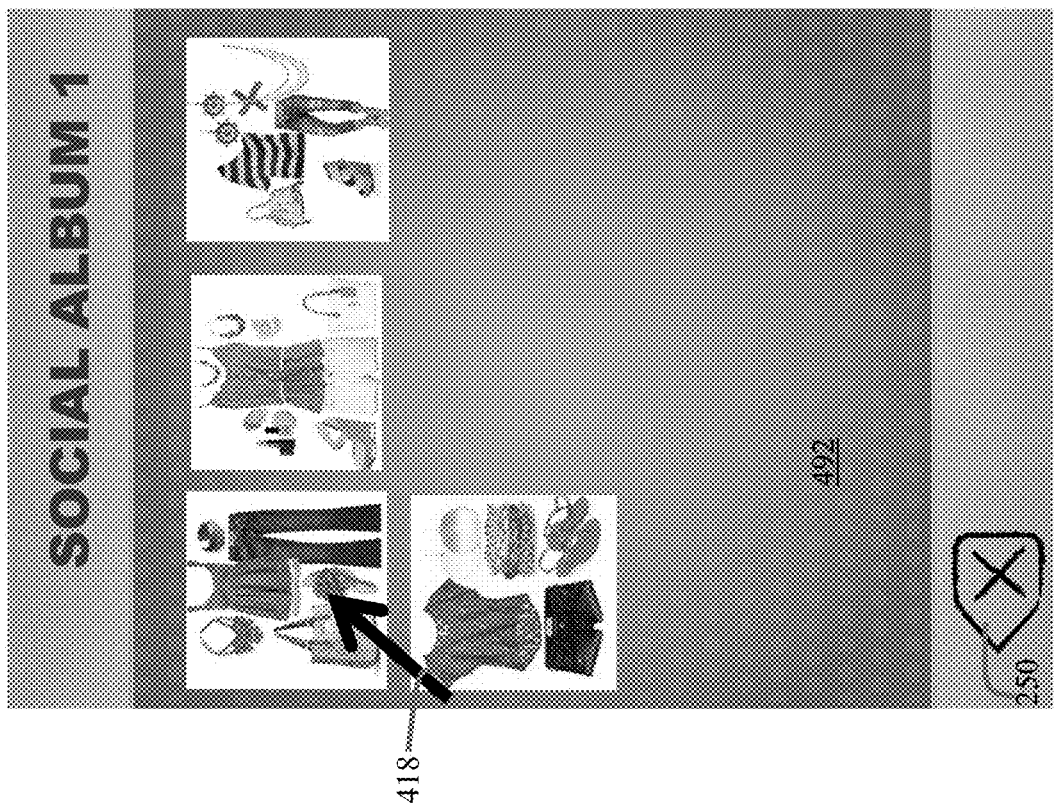
Figures 4, 4I, 5, 6, 7, 8:
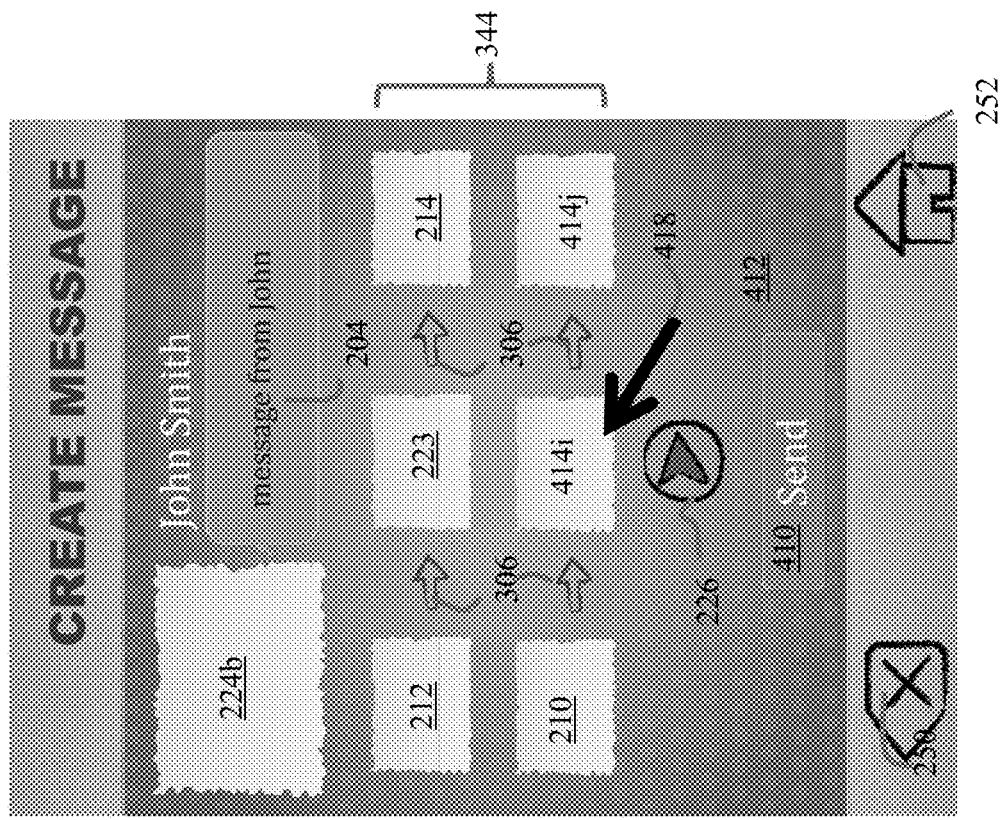
Figures 4, 4I, 5, 6, 7:
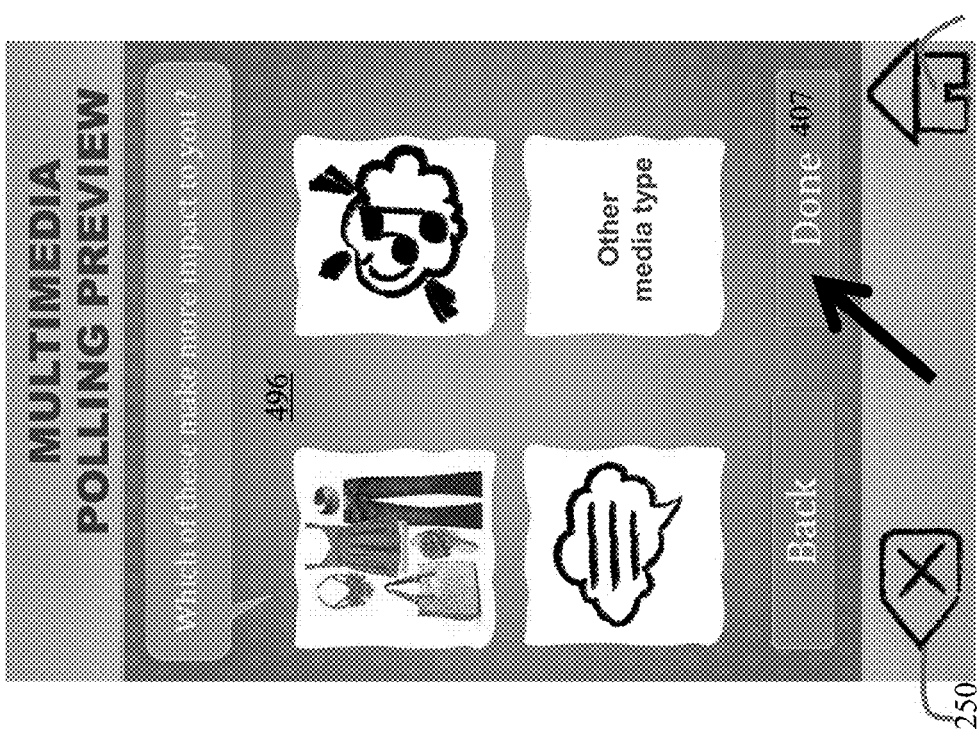
Figures 4, 4I, 5, 6, 7, 8, 9, 10:
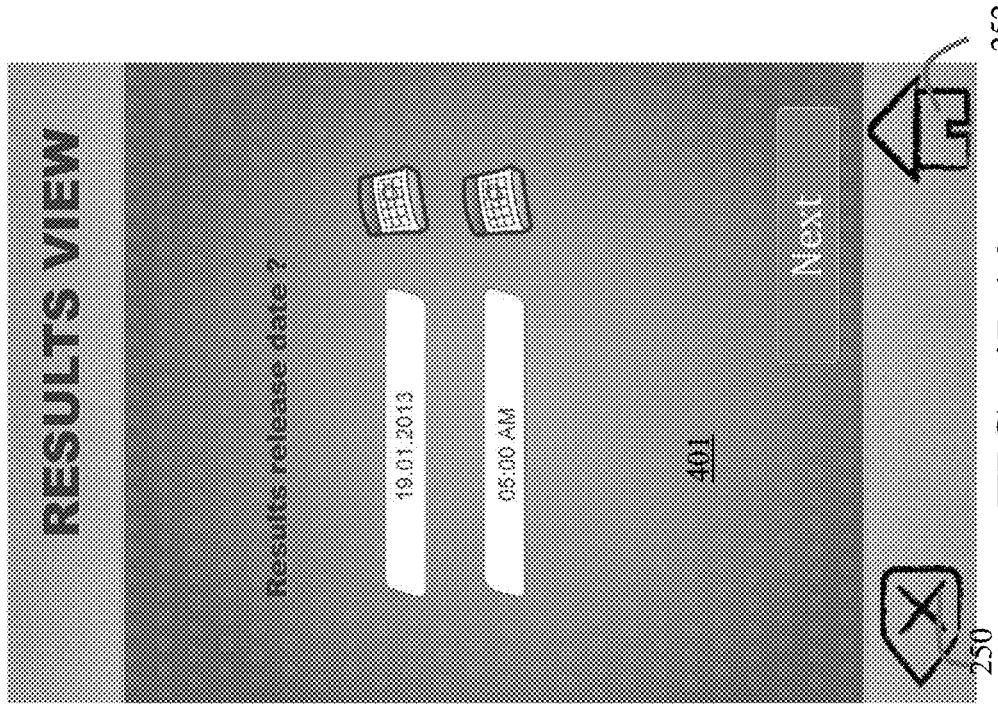
Figures 4, 4I, 5, 6, 7, 8, 9:
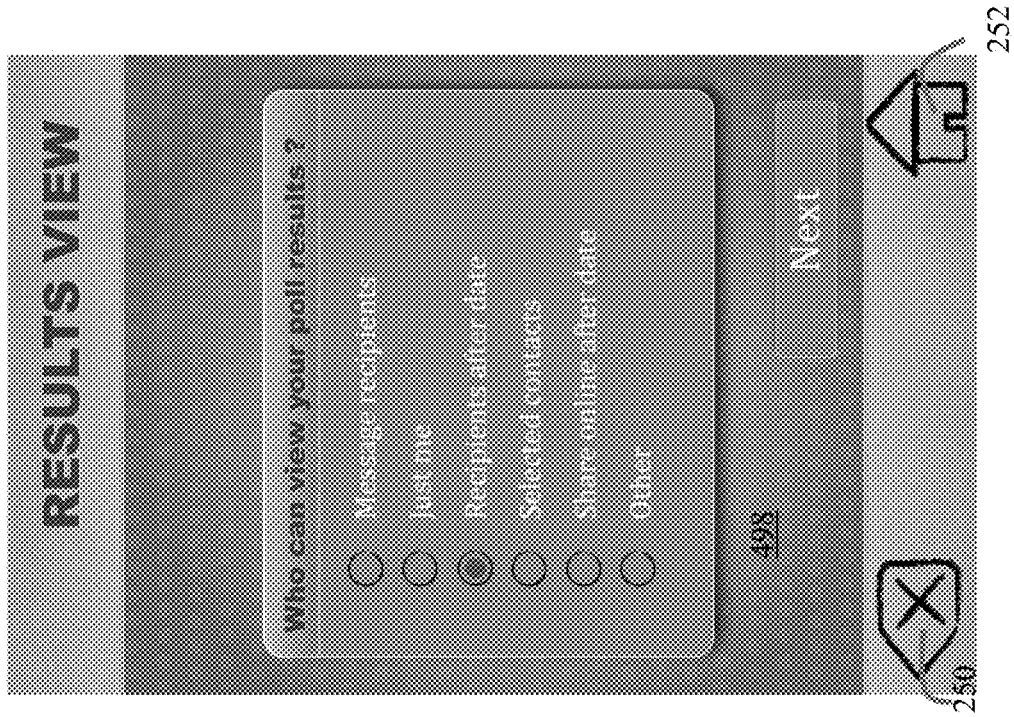
Figures 4, 4I, 5, 6, 7, 8, 9, 10, 11, 12:
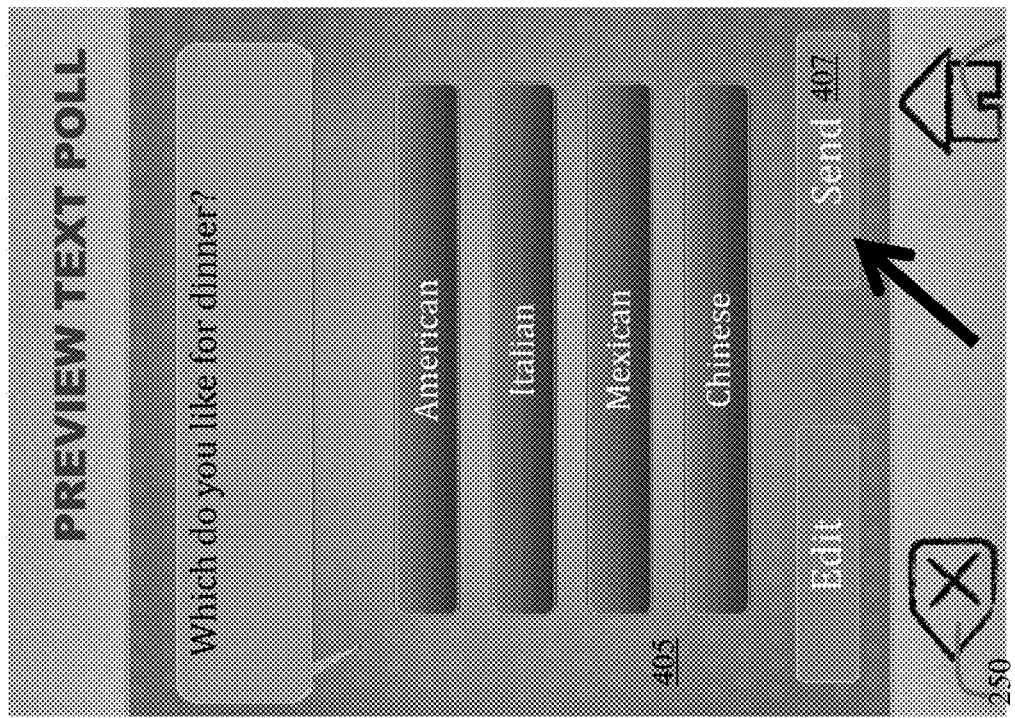
Figures 4, 4I, 5, 6, 7, 8, 9, 10, 11:
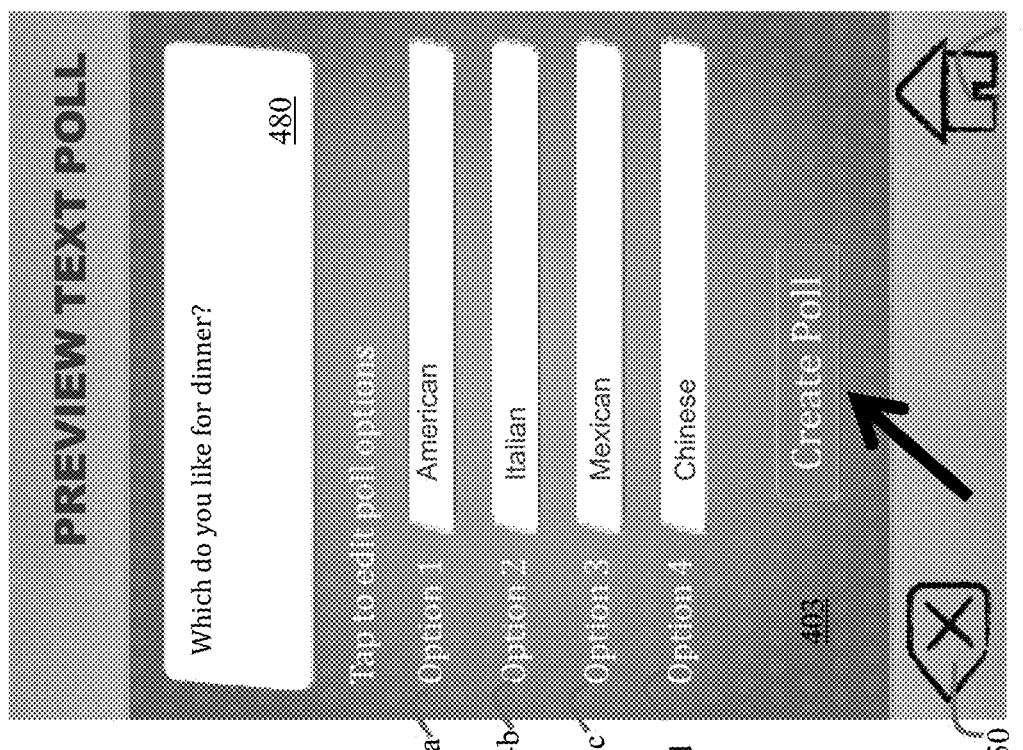
Figures 4, 4J, 5, 6, 7, 8:
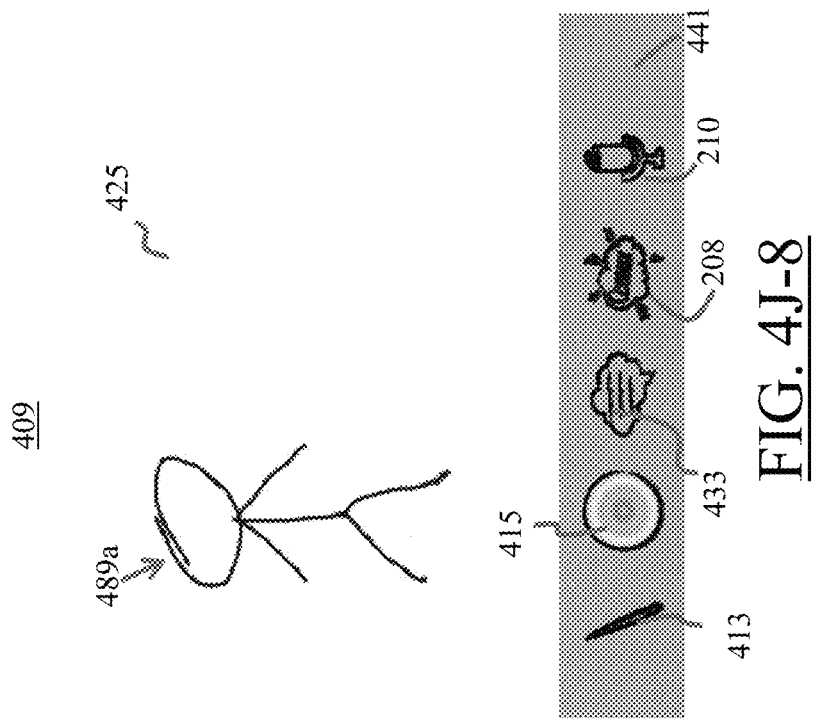
Figures 4, 4J, 5, 6, 7:
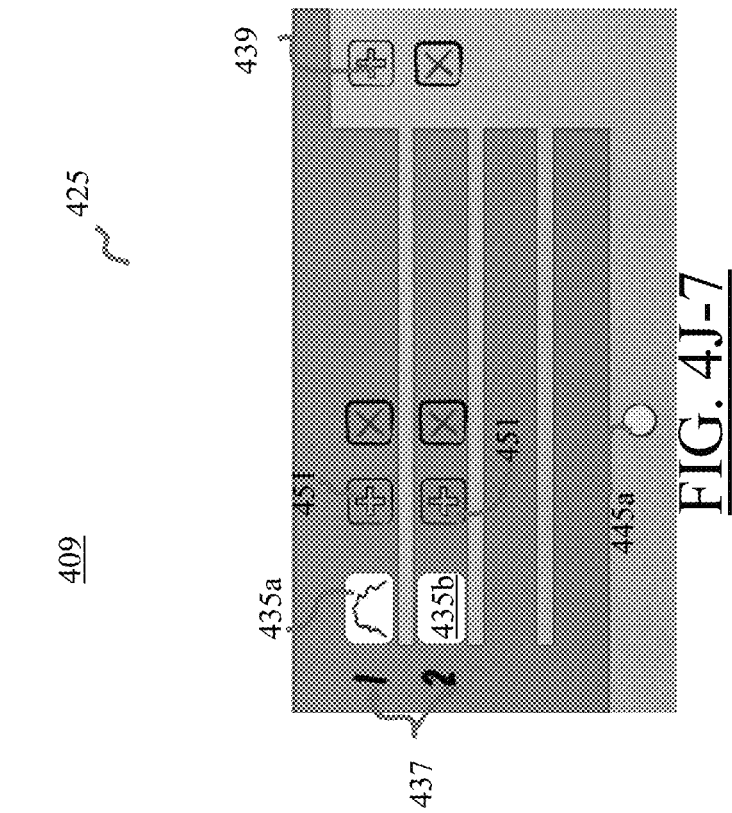
Figures 4, 4J, 5, 6, 7, 8, 9, 10:
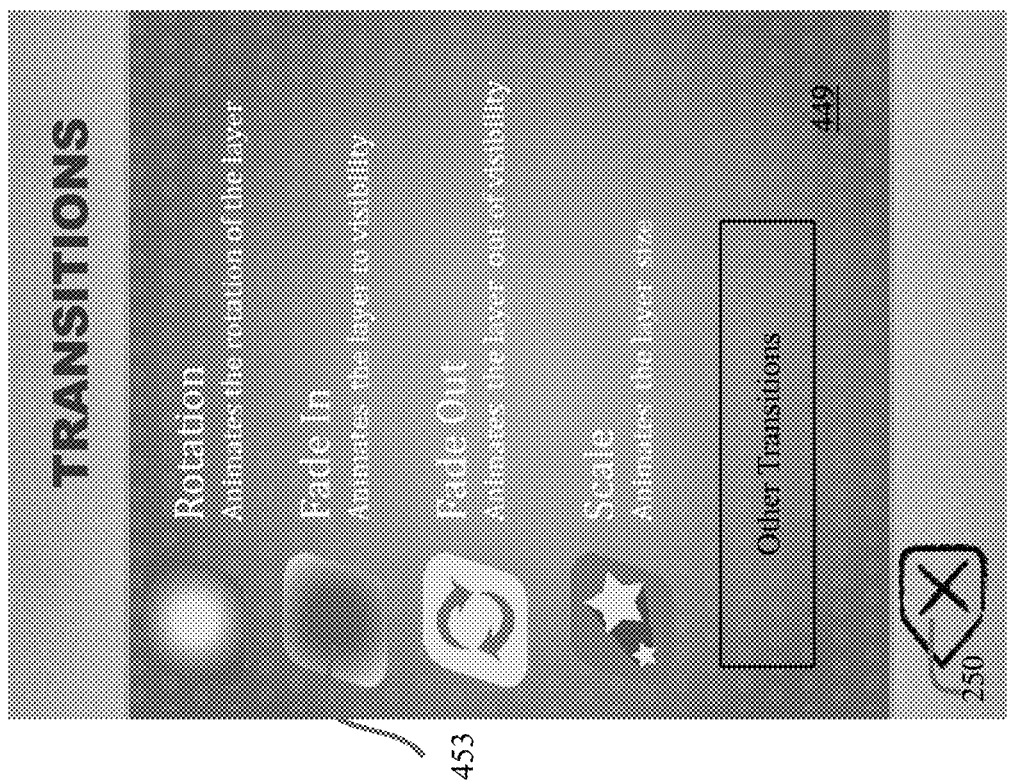
Figures 4, 4J, 5, 6, 7, 8, 9, 10, 11, 12:
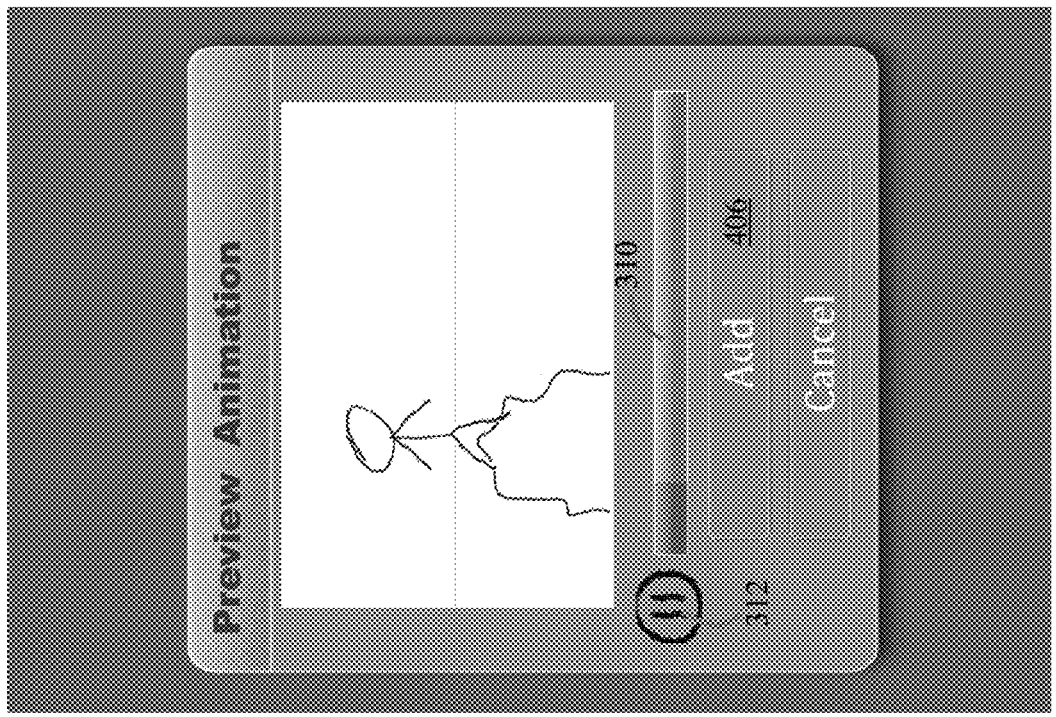
Figures 4, 4J, 5, 6, 7, 8, 9, 10, 11:
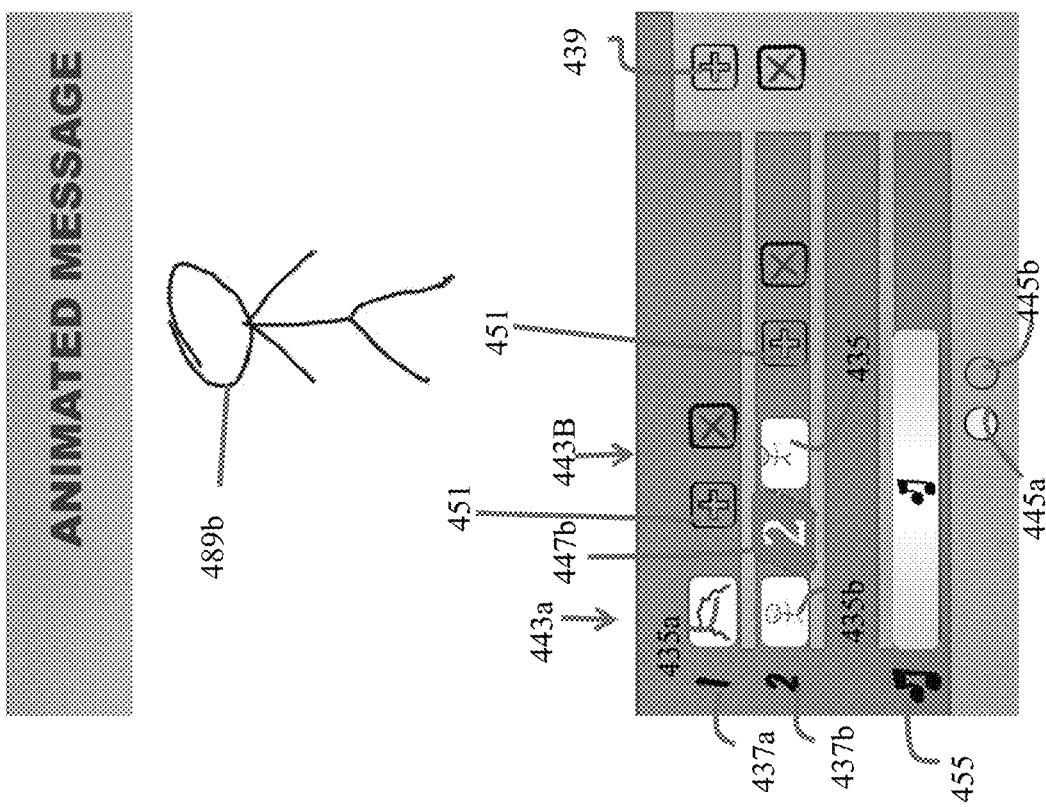
Figures 4, 4J, 5, 6, 7, 8, 9, 10, 11, 12, 13, 14:
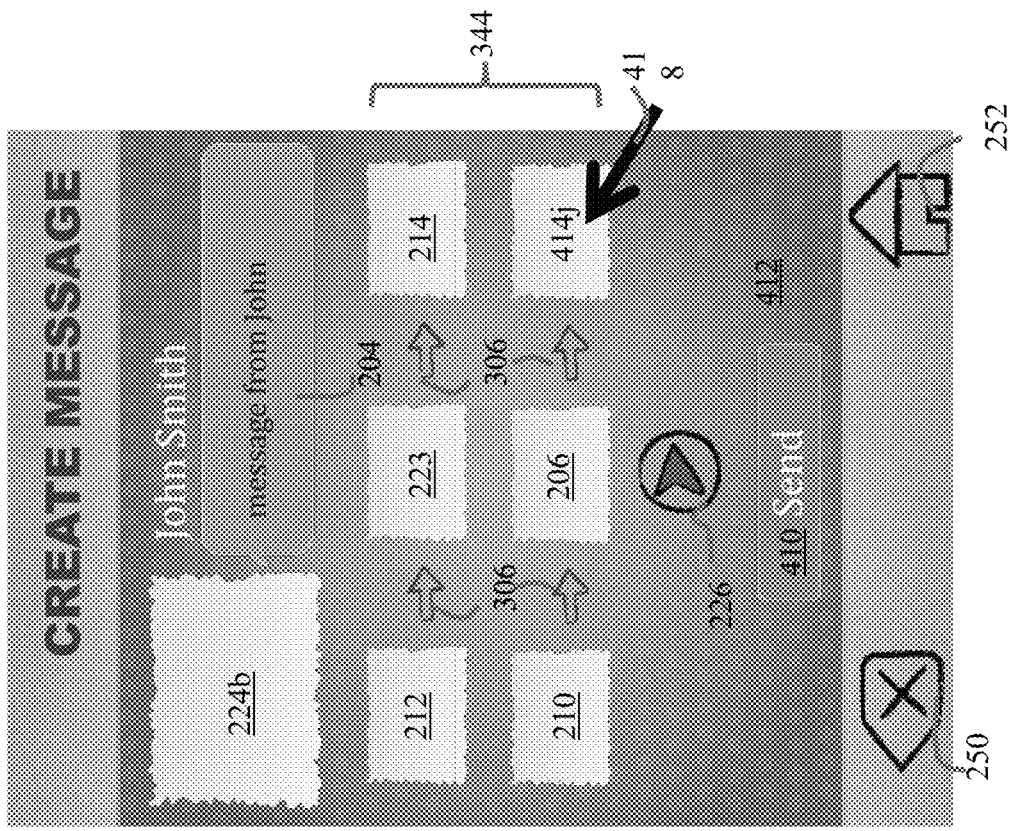
Figures 4, 4J, 5, 6, 7, 8, 9, 10, 11, 12, 13:
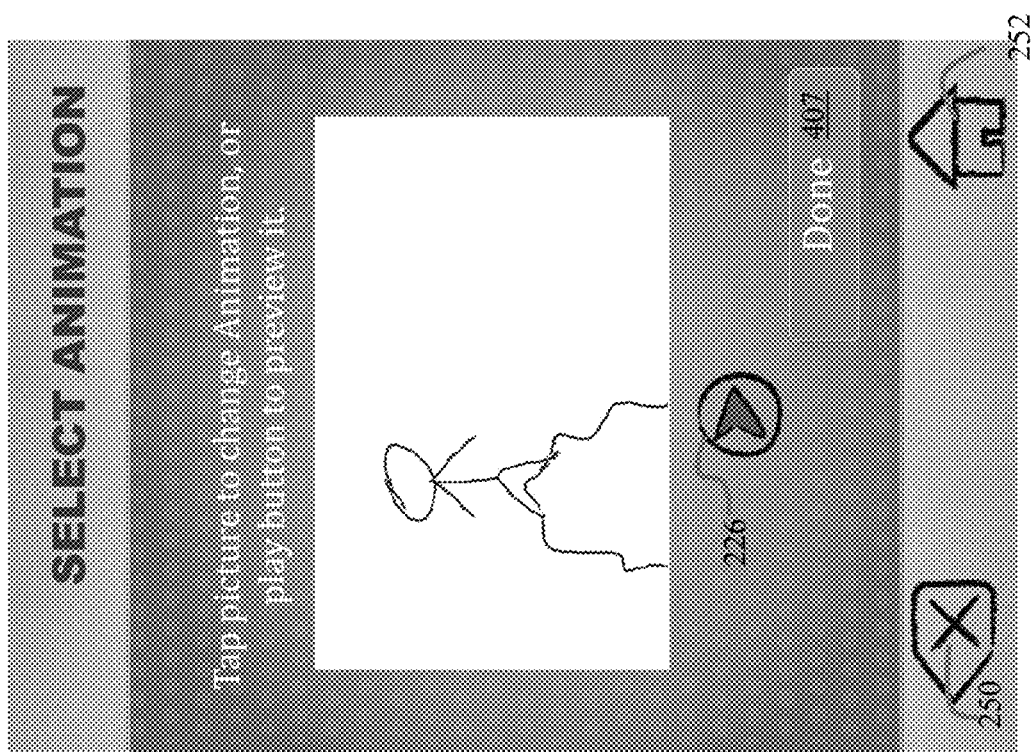
Figures 4, 4J, 5, 6, 7, 8, 9, 10, 11, 12, 13, 14, 15, 16, 17:
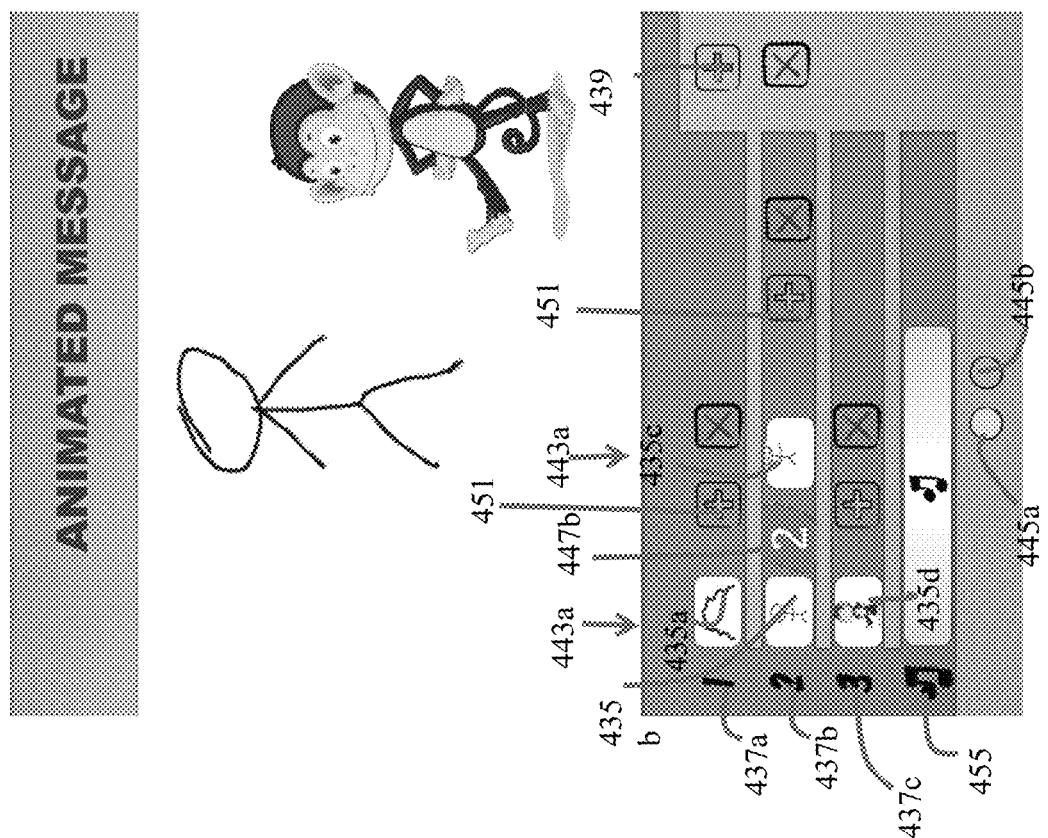
Figures 2, 4K:
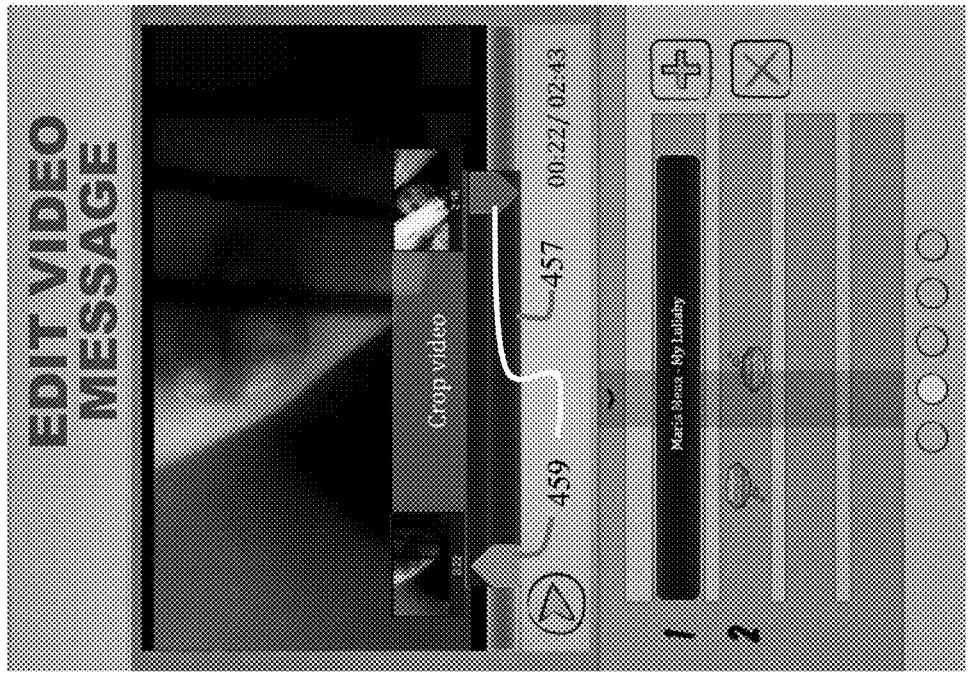
Figures 1, 4K:
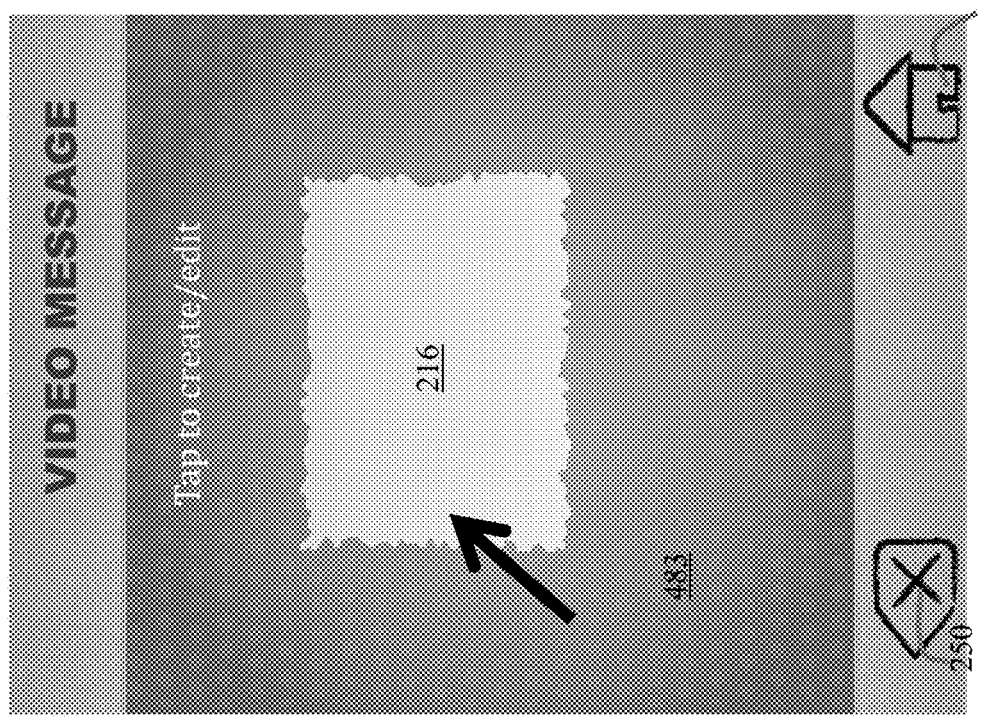
Figures 4, 4K:
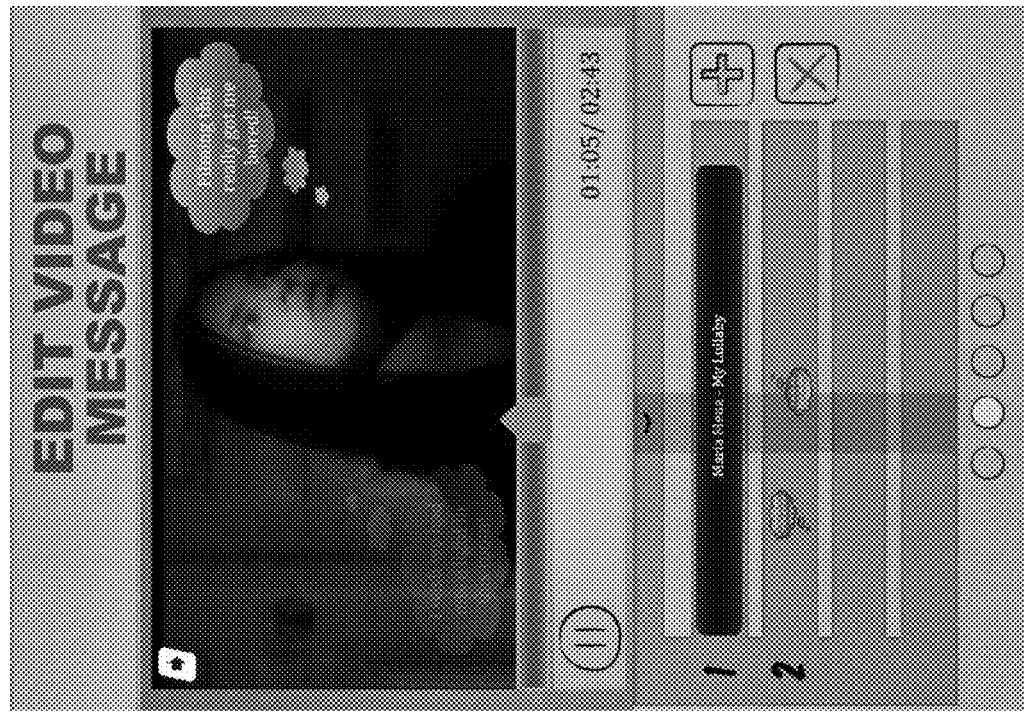
Figures 3, 4K:
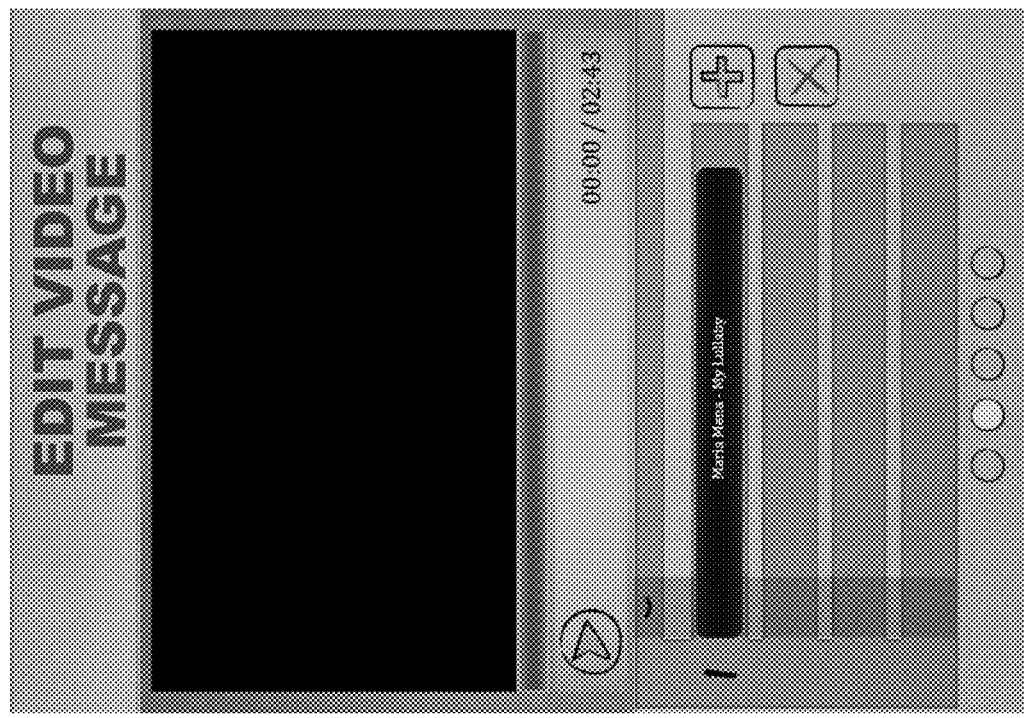
Figures 4, 4K, 5, 6:
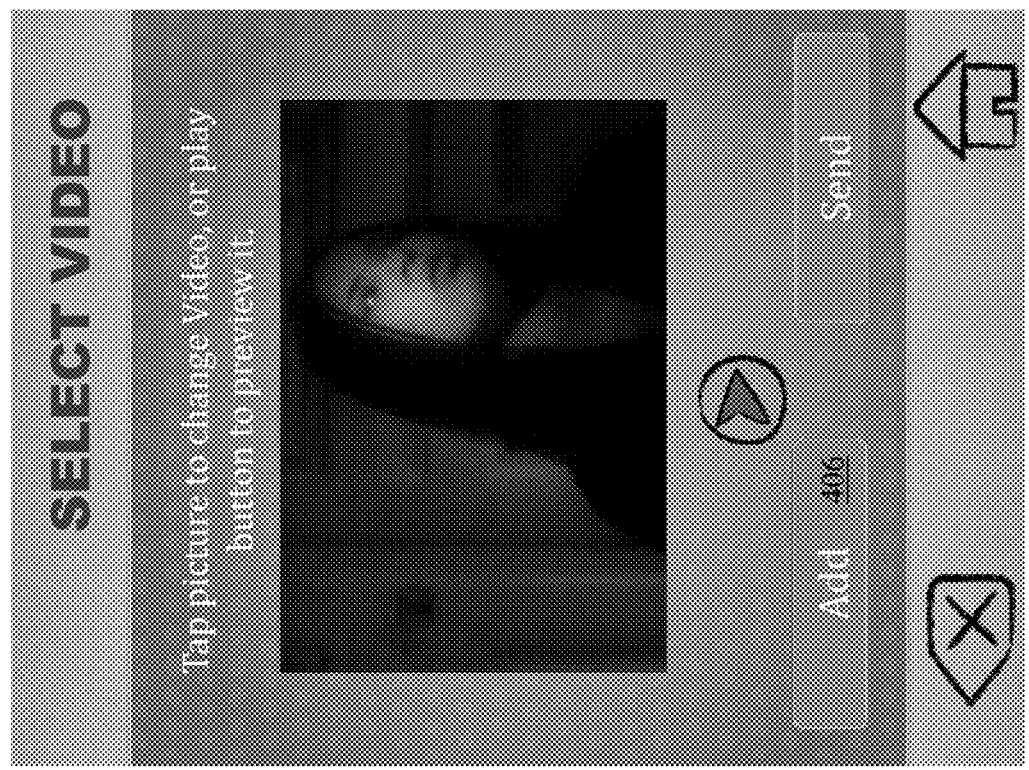
Figures 4, 4K, 5:
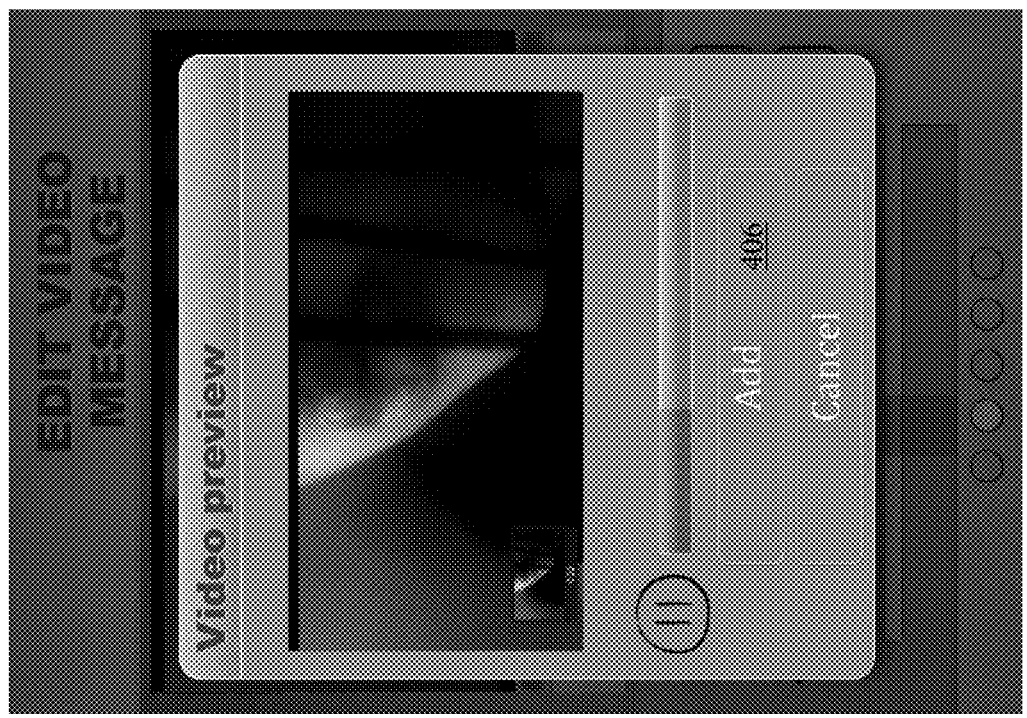
Figures 4, 4K, 5, 6, 7:
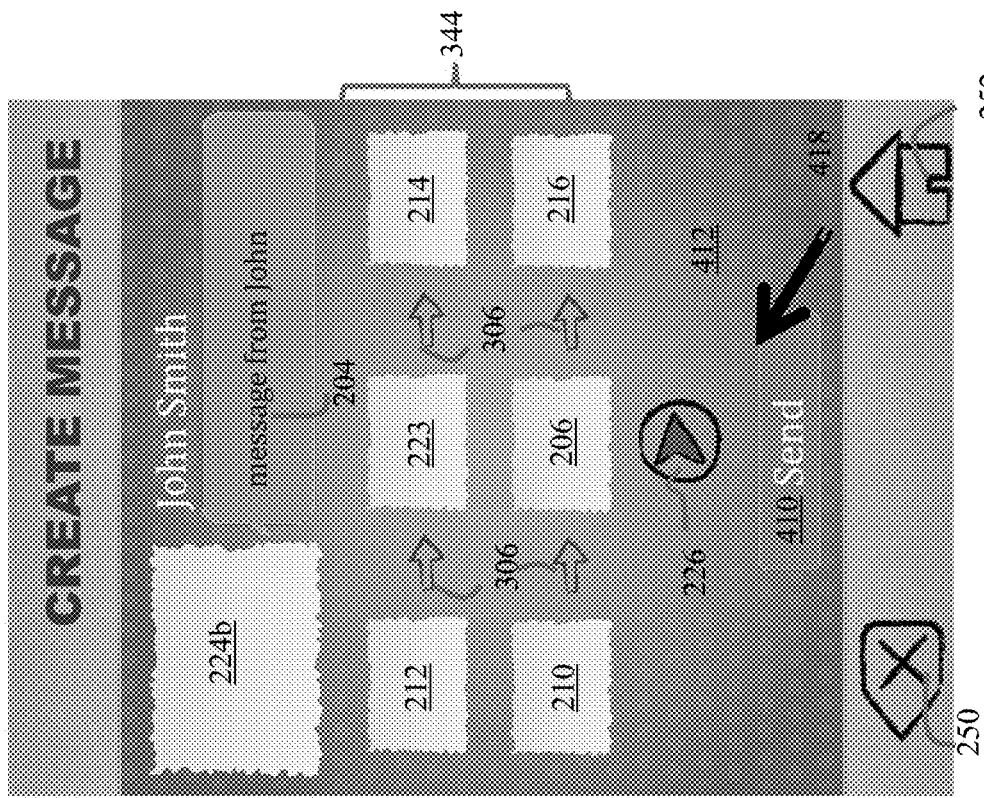
Figures 2, 4L:
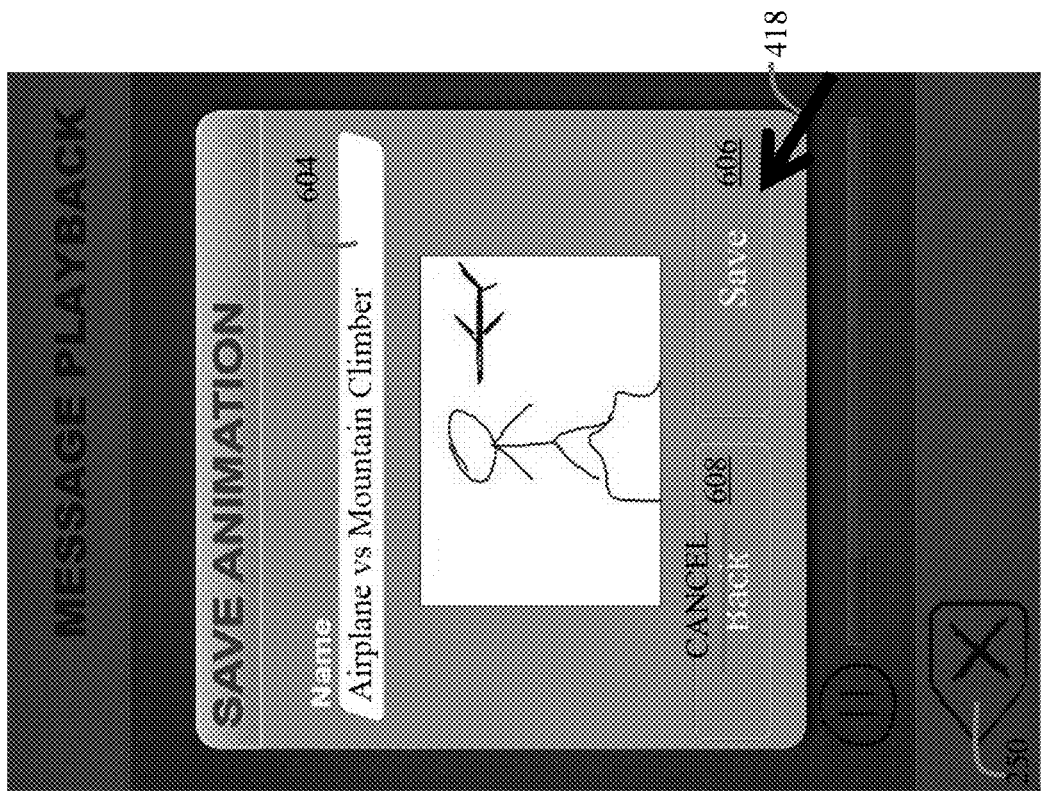
Figures 1, 4L:
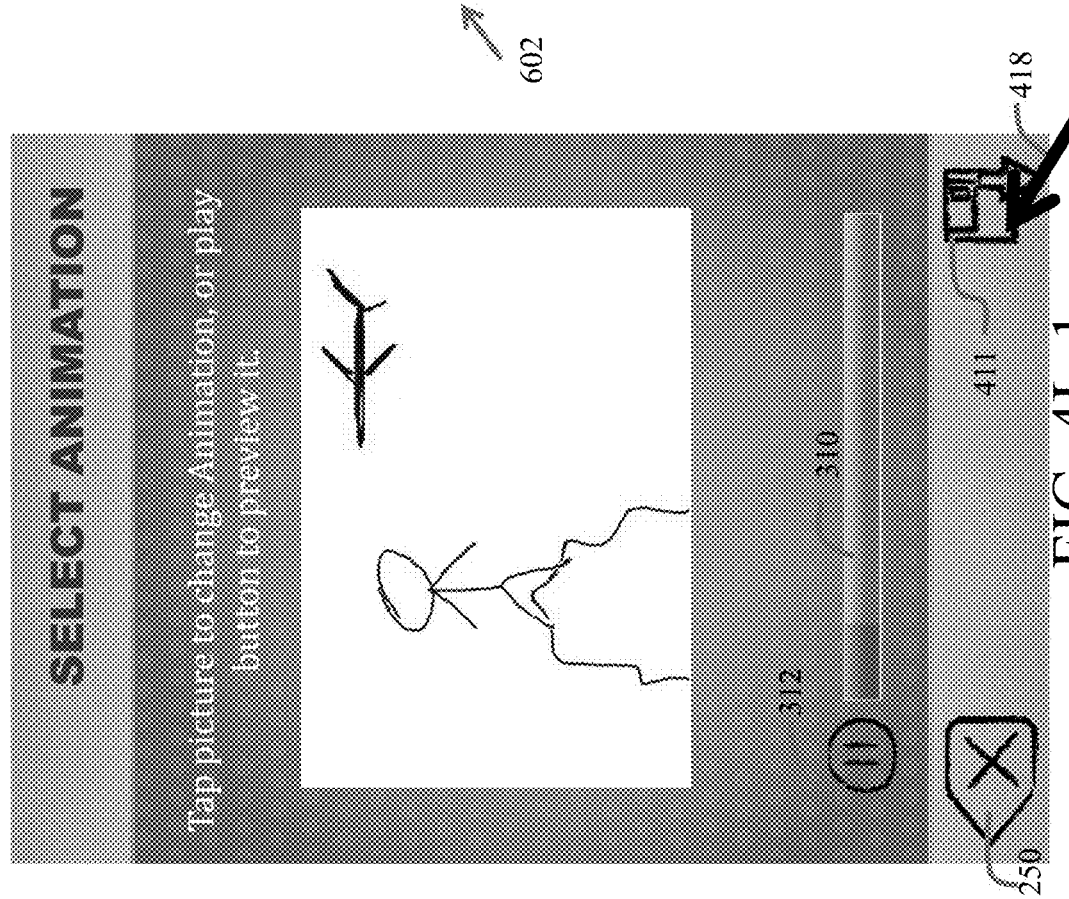
Figures 4, 4L:
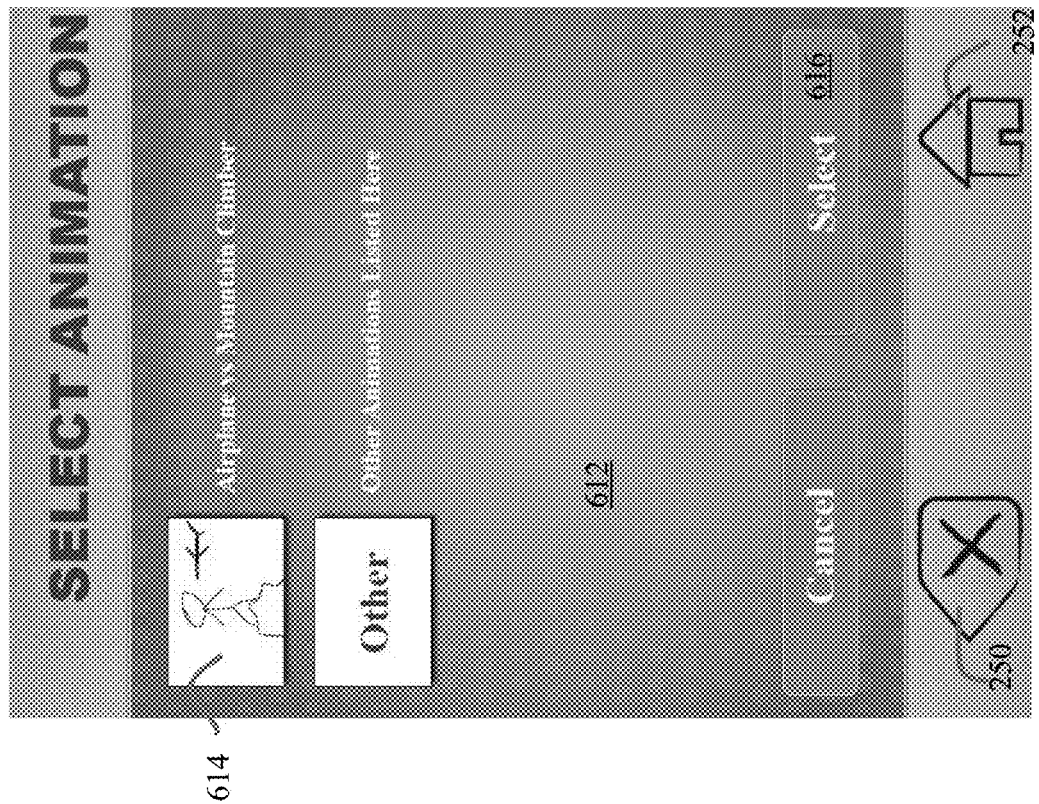
Figures 3, 4L:
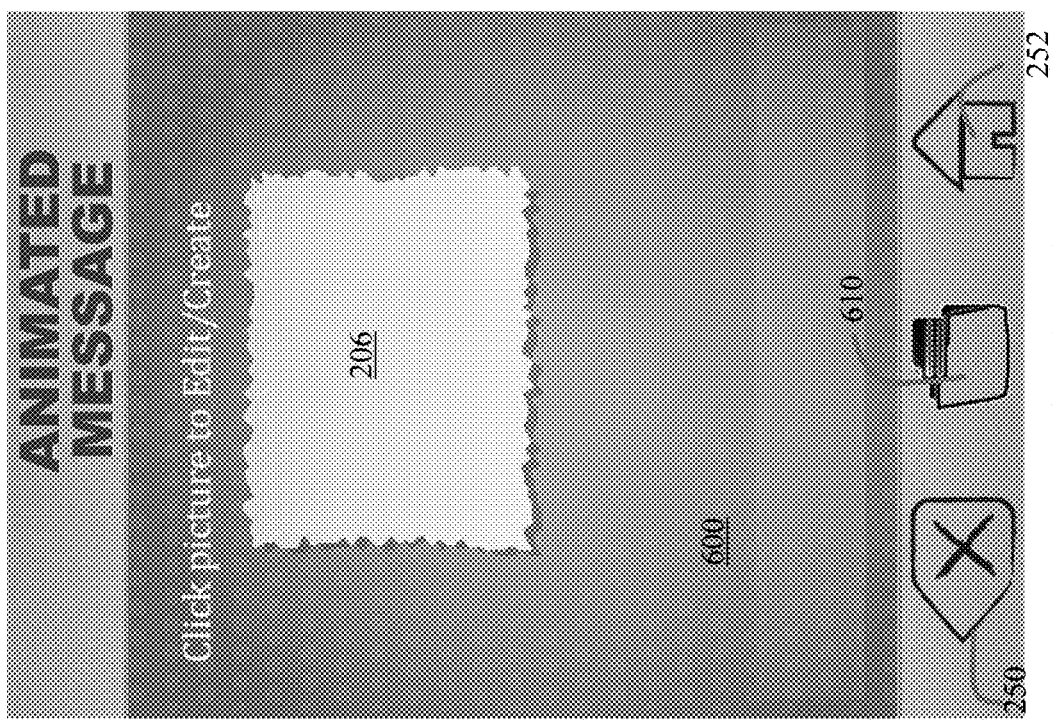
Figures 4, 4L, 5, 6:
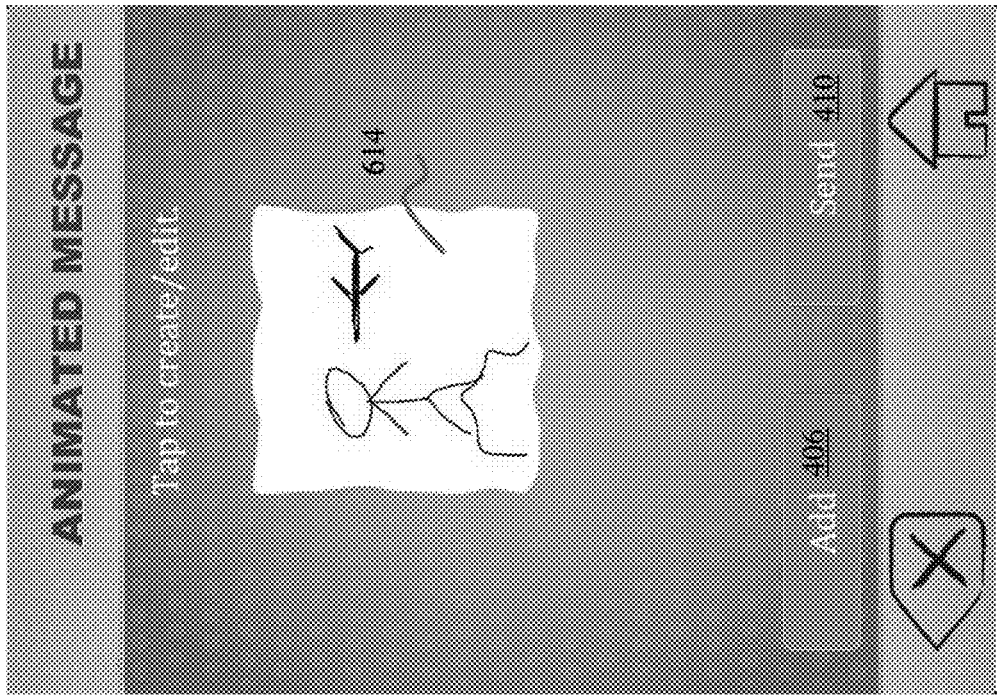
Figures 4, 4L, 5:
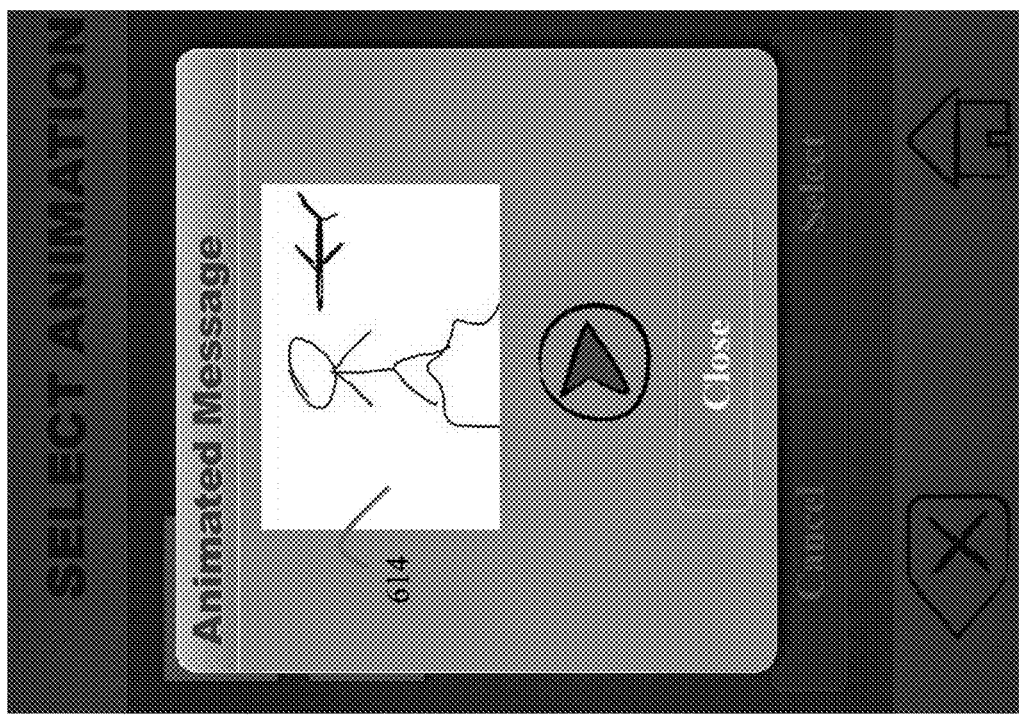

Therefore, as progressively illustrated in FIG. 3A to 3I, the messaging system of the present invention provides an electronic message 302 having integrated digital content, wherein the integrated digital content is scripted by seamless linking 306 of multiplicity of electronic media components 236, with the multiplicity of electronic media components 236 of a received electronic message 302 seamlessly and automatically executed in an order, arrangement, and sequence intended by the scripted digital content (by the composer of the message) at one of a first and second client-device 108. It should be emphasized that the electronic media components 236 of the electronic message 302 are not attachments, but actually form and are an integral, orderly integrated constituent parts of the electronic message 302 itself. In other words, they are the electronic message.

Where FIGS. 3A to 3I illustrated the progressive, orderly playing of the electronic media components 236 of the received electronic message 302 as intended by the composer (i.e., sender of the message 302) in accordance with the present invention, FIGS. 4 to 4L-6 are non-limiting, exemplary illustrations of composing of an electronic message 302 by an end-user (i.e., the composer or sender) in accordance with the present invention. FIG. 4 in particular is a non-limiting exemplary block diagram, which schematically provides an overall overview illustration of the composition and delivery of an electronic message in accordance with the present invention. FIGS. 4A to 4L-6 show non-limiting, exemplary GUI representations of a finite set of non-limiting, exemplary electronic media components for composing a message in accordance with the general, overview scheme shown in FIG. 4.

As illustrated in FIG. 4, a user may start (block 330) composing an electronic message 302 from home screen 202 or, alternatively, if an electronic message is being composed, users may select electronic media components from the electronic media component selection screen 416 (detailed below, shown in FIG. 4C). In particular, the end-user may start composing an electronic message 302 from home screen 202 (block 332) by simply selecting (block 334) any one of the electronic media components 236 with which the electronic message 302 is to be composed. Alternatively, and as illustrated in FIG. 4, an electronic message 302 may also be continued to be composed by selecting (block 334) any one of the electronic media components 236 from the media component selection screen 416 (block 332). A non-limiting, exemplary representation of the media component selection screen 416 is shown in FIG. 4C.

Referring to FIG. 4, selecting a GUI icon of any particular electronic media component 236 (block 334) directs users to a corresponding screen for that media type to start composing that particular type of media component message (block 336). After composition (block 336) of that particular media component, the end-users are provided with a choice (block 340) to decide to either send the message 302 as composed or, alternatively, add additional electronic media components 236 to the electronic message 302 being composed. If users decide (block 340) to add additional electronic media components 236 to continue composing the electronic message 302, the specific electronic media components 236 already composed will be saved in a storage unit 162 of the client device 108 as part of the electronic message client records 342. It should be noted and strongly emphasized that the "addition" of an electronic media component to the electronic message is not an independent, external attachment of that additional electronic media component to the electronic message. The additions are (or become) an integrated and integral part of the message as a whole, and are seamlessly linked and are seamlessly executed as the message itself in an order, arrangement, and sequence intended by the scripted digital content at one of a first and second client-device 108. In other words, the use of the term "Add" does not mean and should not be construed as "attachment" of electronic media components 236, but is an actual, continued composition of the electronic message 302. That is, the added electronic media component 236 actually forms and is an integral, orderly integrated part that constitutes the electronic message 302 itself. However, the present invention does support attachments (in a conventional sense).

As further illustrated in FIG. 4, the saved electronic media components 236 are displayed as a playlist 344 (exemplarily GUI of which is represented within the create message GUI screen 412). The playlist 344 is displayed as a graphic user interface (GUI) that displays a stored collection of electronic media components 236 in a sequence defining an order of play of the stored collection of electronic media components 236 for the receiving client-device 108. Thereafter, as illustrated in blocks 332, 334, and 336, the users may select the additional type of electronic media component 236 they wish to further add and continue to compose the electronic message 302 by composing the newly added electronic media component 236, and continue to have the option to decide (block 340) of adding other, additional media components 236. If no further electronic media component 236 is to be added to the electronic message 302, users can simply send (e.g., by tapping a GUI send icon) to transmit (block 346) the composed electronic message 302 with all of its integrated, constituent electronic media components 236.

The transmission of the electronic message 302 includes the transmission of client records to the server (block 348). That is, the playlist 344 includes client records 342 that have associated attributes generated and stored in the storage unit 162 of the first client-device 108 and are associated with the electronic message 302 for seamless linking of multiplicity of electronic media components 236 of the electronic message 302. The server 140 generally defines these attributes (i.e., provide values in accordance to the client records).

The client records 342 (and any associated attribute) are communicated (block 348) with a server 140, with the server 140 generating a set of values (at block 350) for the attributes of the client records 342, including values for tracking and accounting of the electronic message 302, which includes tracking and accounting of all electronic media components and their data, and order, arrangement, and sequence of the scripted digital content of the composed electronic message 302 that was intended by the composer of the message.

As further illustrated in FIG. 4, the set of values for the attributes of the client records 342 are saved in a server storage unit 148 (block 352) as server records 190 within the server 140, with the set of values for the attributes of the client records 342 transmitted by the server 140 to the client-device 108 (block 354). The set of values for the attributes of the records enable all entities to track and account the electronic message 302 prior to actual transmission thereof, with the first client-device 108 (i.e., the composer) commencing uploading (block 356) of the electronic message 302 to the server 140 for delivery (block 360) to the second client-device 108 (i.e., receiver) upon receipt of the set of values for the attributes of the records. The electronic message 302 is delivered (block 360) to the second client-device 108 after upload is confirmed (block 358), and the second client-device 108 plays the electronic message 302 in accordance with the server records 190. The server records 190 track and account the electronic message 302, including the order, arrangement, and sequence of play of the multiplicity of electronic media components 236 constituting the integrated digital content of the electronic message 302.

As indicated above, FIGS. 4 to 4L-6 are non-limiting, exemplary illustrations of composing of an electronic message by an end-user with FIG. 4 schematically providing an overview of the overall process while FIGS. 4A to 4L-6 showing non-limiting, exemplary GUI representation of a finite set of exemplary electronic media component 236 for composing of a message. In the particular exemplary instances illustrated in FIG. 4A, the end-user has selected to include a text message 204 as the first electronic media component 236 of the electronic message 302, the corresponding screen 402 for which is shown in FIG. 4A. As indicated above in relation to FIG. 4, any one of the electronic media components 236 display screens (including the illustrated display screen 402 for the text message electronic media component 204) may be access via the home screen 202 or, alternatively, the electronic media component selection display screen 416 (shown in FIG. 4C). It should be noted that throughout the figures, various GUI interface icons used for the electronic media components 236 may be universal (for example, Home GUI icon 252 or a Back GUI icon 250) or may only be specific to the electronic media component. For example, Text, Animations, and so on may include an Undo GUI icon 324 to undo portion of the text, animation, and so on whereas a comicon electronic media component may not have, need, or require an Undo GUI icon 324.

Referring to FIG. 4A, the text message 204 electronic media component 236 of an electronic message 302 allows users to send a text message 204 as an integral part of the electronic message 302. The text message display screen 402 shown in FIG. 4A allows users to type in a message or select a microphone GUI icon 404 to record their message and have it converted to text. Text messaging functionalities and features are very similar to existing text messaging systems with the exception of the additional Add GUI icon 406 in combination with the Send GUI icon 410. The Add GUI icon 406 and the Send GUI icon 410 provide the users with the decision block 340 of FIG. 4, wherein the selection of Add GUI icon 406 enables users to add another additional electronic media component 236 to the electronic message 302 or simply to send the text message with no further additions of electronic media components 236 when the Send GUI icon 410 is selected.

As has been indicated above in relation to FIG. 4 for example, the messaging system of the present invention provides users the ability to integrate different digital content, and script digital content by seamlessly linking multiple electronic media components 236 in any order, arrangement, and sequence desired. Accordingly, after composing the text message 204 as shown in FIG. 4A, the user has the ability to add other digital content, and seamlessly link the additional content in any order, arrangement, or sequence desired by simply selecting the Add GUI icon 406, which directs the user to the create message GUI screen 412 shown in FIG. 4 B.

Referring to both FIGS. 4 and 4B, upon choosing to add an additional electronic media component 236 to the electronic message 302 in FIG. 4A, the already composed text message 204 is stored as client records (block 342) in a storage unit 162 of the first client-device 108 and displayed as playlist 344 in the create message GUI display screen 412, exemplarily shown in FIG. 4B. The playlist 344 in FIG. 4B is displayed as a GUI that displays a stored collection of electronic media components 236 in a sequence defining an order of play of the stored collection of electronic media components 236 for the second client-device (e.g., the receiver end-user). The playlist 344 includes client records 342 (detailed below) that have associated attributes generated and stored in the storage unit 162 of the first client-device 108 and are associated with the electronic message 302 for seamless linking of multiplicity of electronic media components 236 of the electronic message 302.

As illustrated in FIG. 4B, create message GUI display screen 412 already includes the text message 204 composed in FIG. 4A within its playlist 344. In other words, a first queuing GUI icon 414 is already indicated as having the text message 204 queued as the first electronic media component 236 of the electronic message 302 being composed by the end user. The playlist 344 further includes a set of queuing GUI icons 414 that are empty, but that upon selecting any single queuing GUI icon 414, enables users to add an electronic media component 236 to the electronic message 302 in the selected queue 414 in correct order, arrangement, and sequence indicated by the links 306.

The layout of the queue GUI icons 414 may vary and presented in a variety of different manners so long as cumulatively, it intuitively conveys an order, arrangement, and sequence of play of the electronic media components 236 of the electronic message 206. The present invention defines a queue as list of media components of a message stored so as to be retrievable in a definite order. Therefore, upon selection of the queuing GUI icon (e.g., 414*b*), the users are provided with the electronic media type selection screen 416 shown in FIG. 4C. It should be noted that the user may easily select any other queuing GUI icon (e.g., 414*f*) instead, where that selected GUI icon (e.g., 414*f*) will contain the media type composed.

As further illustrated in FIG. 4B, the queuing GUI icons 414 for the playlist 344 of electronic media component 236, including the manner of adding electronic media component 236 to the playlist 344 may be accomplished by a variety of different manners. Accordingly, the screen 412 shown in FIG. 4B is a non-limiting, exemplary illustration of one of many ways to display and generate a playlist and should not be limiting. For example, queuing GUI icons 414 in a form of non-limiting, exemplary predetermined orderly arranged sequence of empty slots or spots may be provided with scrolling capability to bring into the viewable area of the screen additional slots (FIGS. 4G-6 and 4G-7), where a user selects the empty slots to retrieve a media type from storage and add to the playlist 344 (as shown). As another example, a single queuing GUI icon 414 (or one empty slot) may be provided wherein as soon as it is selected to add electronic media component 236, a next empty slot is automatically adjacently generated, ready for adding of additional electronic media component 236. The link arrows 306 indicate the order of play of the various electronic media components 236. It should be noted that the user may easily edit and move around the queuing GUI icons or slots even after content (or data) is associated with (or added to) the specific queuing GUI icons slot. That is, the filled up queuing GUI icons 414 may be moved around to vary the execution order, arrangement, and sequence of the electronic media components 236. For example, after composing the electronic message 302 with all the electronic media components 236 queued as desired, the end user (composer of the message) may simply select and drag to rearrange or reorder the queuing (and hence, the play) sequence of the media types. Selecting the play GUI icon 226 will actual provide a preview of the composed electronic message 302 for the uses. Other ways of adding electronic media component 236 to the electronic message 302 is to simply provide a drop-down menu, allowing the end-user to select the desired electronic media component 236 from various storage systems within which the media is stored, with the added media content organized in the GUI with the desired sequence of execution, as illustrated.

In FIG. 4B, after selected (e.g., by tapping) the next queuing GUI icon 414 (e.g., 414*b*) to add and link more digital content to the electronic message 302, the user is directed to the electronic media component selection screen 416 shown in FIG. 4C. It should be noted that the act of selecting a queuing GUI icon 414 instead of the send GUI icon 410 correlates with the decision (block 340) of FIG. 4, where the user has decided to add more media components 236 to the electronic message 302 rather than simply transmit or send the message (by selecting send GUI icon 410).

As exemplarily illustrated in FIG. 4C, the electronic media component selection screen 416 includes an array of electronic media components 236 from which the user may choose to add to the electronic message 302, which may be displayed in a variety of different manners. Further, it should be noted that although not repeatedly mentioned for every display screen, if need be, screens that need or require scrolling may have scrolling capability to view more content within the viewable area of the screen and therefore, the electronic media component selection screen 416 is not limited to only the twelve selections of electronic media component 236 shown where more media components 236 may be brought into the viewable area of the screen by a scrolling function.

As illustrated in FIGS. 4C and 4D-1, the user may choose for example, to add the electronic media component 236 that is a comix message 208 to the already composed text message 204 (shown in FIG. 4B). Upon selection (e.g., by tapping) of the comix message 208 electronic media component 236 in the electronic media component selection screen 416, the user is directed to a corresponding display screen 420 for composing the comix message 208, a non-limiting example of which is shown in FIG. 4D-1.

The comix message display screen 420 for the comix message 208 may include a comix message icon 208 where upon selection (e.g., tapping), directs users to a comix categories display screen 422 shown in FIG. 4D-2, which may display a large category of different types of comix from which the user may choose. As shown by the arrow 418, in the non-limiting exemplary instance, the user has selected the category 424, which directs the user to the next, corresponding display screen 426 that includes a large number of comix within the category 424, shown in FIG. 4D-3. Upon selection (as indicated by the arrow 418, by tapping for example) of the desired comix 428, the end user is directed to the next, preview display screen 430 for that particular selected comix 428, shown in FIG. 4D-4. There, the user may simply select the Add GUI icon 406 to add the selected comix 428, which then directs the user to the finally selected comix display screen 432 shown in FIG. 4D-5, where upon selection of the Done GUI icon 407, the selected comix 428 is added in the slot of the queuing GUI icon 414*b* of the create message GUI display screen 412 as illustrated in FIG. 4D-6 (the playlist 344). The already composed comix message 208 (including the text 204) are stored as client records (block 342 of FIG. 4) in a storage unit 162 of the first client-device 108 and displayed as playlist 344 in the create message GUI display screen 412, exemplarily shown in FIG. 4D-6. FIGS. 4B and 4D-6 illustrate the same display screen 412, with FIG. 4B showing the empty queuing GUI icon slot 414*b*, and FIG. 4D-6 showing the added comix message 208 within the empty slot 414*b* of the playlist 344.

As further illustrated in FIG. 4D-6 and the decision at block 340 of FIG. 4, the user may continue to add additional electronic media components 236 to the electronic message 302 being composed in which case, the user may select the next, empty queuing GUI icon slot 414*c* (as indicated by the arrow 418) by tapping the empty slot 414*c*, which would direct the user to the media component selection screen 416 of FIG. 4C. Alternatively, as indicated in the decision block 340 of FIG. 4, the user may simply transmit (block 346) the message 302 (by selecting the send GUI icon 410 in FIG. 4D-6). The act of selecting to send the electronic message 302 would transmit the integrated, digitally scripted electronic media components 236 (e.g., text message 204 and comix message 208). It should be noted that the user need not select the queuing GUI icon slot 414*c* as the next selection after the queuing GUI icon 414*b*, but may select any one of the queuing GUI icon slots desired. Further, any one or more of the electronic media components 236 may be used more than one time in any electronic message 302. For example, the composed electronic message 302 may include a text, comicon, a second comicon, a second text, and comix, in that order.

In the exemplary instance shown in FIG. 4D-6, the user has selected to add an additional electronic media component (by selecting the empty queuing GUI icon 414*c*), which directs the user to the media component selection screen 416 of FIG. 4C. There, the user may select to add a comicon message 212 (from the screen 416 of FIG. 4C) to the electronic message 302 being composed. In other words, choosing to add the electronic media component 236 such as the selected comicon message 212 would link this media type to the already composed text message 204 and comix 208 (shown in FIG. 4D-6).

Upon selection (e.g., by tapping) of the comicon message 212 electronic media component 236 in the electronic media component selection screen 416 (FIG. 4C), the user is directed to a corresponding display screen 434 for composing the comicon message 212, a non-limiting example of which is shown in FIG. 4E-1. The comicon message display screen 434 for the comicon message 212 may include a comicon message icon 212 where upon selection (e.g., tapping), directs users to a comicon categories display screen 436 shown in FIG. 4E-2, which may display a large category of different types of comicons from which the user may choose. As shown by the arrow 418, in the non-limiting exemplary instance, the user has selected the category 438, which directs the user to the next, corresponding display screen 440 that includes a large number of comicons within the comicon category 438, shown in FIG. 4E-3. Upon selection (as indicated by the arrow 418, by tapping for example) of the desired comicon 442, the end user is directed to the next, preview display screen 444 for that particular selected comicon 442, shown in FIG. 4E-4. There, the user may simply select the Add GUI icon 406 to add the selected comicon 442, which then directs the user to the finally selected comicon display screen 446 shown in FIG. 4E-5, where upon selection of the Done GUI icon 407, the selected comicon 442 is added in the slot of the queuing GUI icon 414*c* of the create message GUI display screen 412 as illustrated in FIG. 4E-6. It should be noted that before sending the message, one can select the play GUI icon 226 to preview the message as it will be seen on the receiving end.

The already composed comicon message 212 is stored as client records 342 in a storage unit 162 of the first client-device 108 and displayed within the playlist 344 in the create message GUI display screen 412, exemplarily shown in FIG. 4E-6. FIGS. 4B and 4E-6 illustrate the same display screen 412, with FIG. 4E-6 showing the added comicon message 212 within the empty slot 414c (FIG. 4B) of the playlist 344.

As further illustrated in FIG. 4E-6, the user may continue to choose to add additional electronic media components 236 to the electronic message 302 being composed (rather than send it as is with the text 208, comix 208, and comicon 212 messages) in which case, the user may select the next (e.g., 414d) or any of the other empty queuing GUI icon slots 414 (as indicated by the arrow 418) by tapping the slot 414d, which would direct the user to the media component selection screen 416 (shown in FIG. 4C). In the exemplary instance, the user may select to add an electronic media component 236 such as an emoticon message 220 (from the screen 416 of FIG. 4C) to the electronic message 302 being composed. In other words, choosing to add the electronic media component 236 such as the selected emoticon message 220 would link this media type to the already composed message (shown in FIG. 4E-6) at the selected empty slot (for example 414d) of the playlist 344.

Upon selection (e.g., by tapping) of the emoticon message 220 electronic media component 236 in the electronic media component selection screen 416 (FIG. 4C), the user is directed to a corresponding display screen 448 for composing the emoticon message 220, a non-limiting example of which is shown in FIG. 4F-1. The emoticon message display screen 448 for the emoticon message 220 may include an emoticon message icon 220 where upon selection (e.g., tapping), directs users to an emoticon categories display screen 450 shown in FIG. 4F-2, which may display a large category of different types of emoticons from which the user may choose. As shown by the arrow 418, in the non-limiting exemplary instance, the user may select the category 452, which directs the user to the next, corresponding display screen 454 that includes a large number of emoticons within the selected emoticon category 452, shown in FIG. 4F-3. Upon selection (as indicated by the arrow 418, by tapping for example) of the desired emoticon 456, the end user is directed to the next, preview display screen 458 for that particular selected emoticon 456, shown in FIG. 4F-4. There, the user may simply select the Add GUI icon 406 to add the selected emoticon 456, which then directs the user to the finally selected emoticon display screen 460 shown in FIG. 4F-5, where upon selection of the Done GUI icon 407, the selected emoticon 456 is added in the slot of the queuing GUI icon 414d of the create message GUI display screen 412 as illustrated in FIG. 4F-6. The already composed emoticon message 220 is stored within client records (block 342 of FIG. 4) in a storage unit 162 of the first client-device 108 and displayed within the playlist 344 in the create message GUI display screen 412, exemplarily shown in FIG. 4F-6. FIGS. 4B and 4F-6 illustrate the same display screen 412, with FIG. 4F-6 showing the added emoticon message 220 within the empty slot 414d within the playlist 344. It should be noted that the user may also select to cancel the selected emoticon 456 (FIG. 4F-4) and choose a different emoticon. Upon cancellation, the back GUI icon 250 is activated where the user may select to add a different media type.

As further illustrated in FIG. 4F-6, the user may continue to add additional electronic media components 236 to the electronic message 302 being composed (rather than send it as is with the text 204, comix 208, and comicon 212, and emoticon 220 messages) in which case, the user may select the next (e.g., 414e) or any other empty queuing GUI icon slot (as indicated by the arrow 418) by tapping the slot (e.g., 414e), which would direct the user to the media component selection screen 416 (shown in FIG. 4C). In the exemplary instance shown, the user may select to add an electronic media component 236 such as sound effects message 221 (from the screen 416 of FIG. 4C) to the electronic message 302 being composed. In other words, choosing to add the electronic media component 236 such as the selected sound effects message 221 would link this media type to the already composed message (shown in FIG. 4F-6) at the selected empty slot (e.g., 414e) of the playlist 344.

Upon selection (e.g., by tapping) of the sound effects message 221 electronic media component 236 in the electronic media component selection screen 416 (FIG. 4C), the user is directed to a corresponding display screen 462 for composing the sound effects message 221, a non-limiting example of which is shown in FIG. 4G-1. The sound effects message display screen 462 for the sound effects message 221 may include a sound effects message icon 221 where upon selection (e.g., tapping), directs users to a sound effects categories display screen 464 shown in FIG. 4G-2, which may display a large category of different types of sound effects from which the user may choose. As shown by the arrow 418, in the non-limiting exemplary instance, the user has selected the sound effects category 466, which directs the user to the next, corresponding display screen 468 that includes a large number of sound effects icons within the selected sound effects category 466, shown in FIG. 4G-3. Upon selection (as indicated by the arrow 418, by tapping for example) of the desired sound effect 470, the end user is directed to the next, preview display screen 472 for that particular selected sound effect 470, shown in FIG. 4G-4. There, the user may simply select the Add GUI icon 406 to add the selected sound effects 470, which then directs the user to the finally selected sound effects display screen 474 shown in FIG. 4G-5, where upon selection of the Done GUI icon 407, the selected sound effects 470 is added in the slot of the queuing GUI icon 414e of the create message GUI display screen 412 as illustrated in FIG. 4G-6. The already composed sound effects message 221 is stored within client records (block 342 of FIG. 4) in a storage unit 162 of the first client-device 108 and displayed within the playlist 344 in the create message GUI display screen 412, exemplarily shown in FIG. 4G-6. FIGS. 4B and 4G-6 illustrate the same display screen 412, with FIG. 4G-6 showing the added sound effects message 221 within the empty slot 414e within the playlist 344.

As further illustrated in FIG. 4G-6, the user may continue to add additional electronic media components 236 to the electronic message 302 being composed in which case, the user may select the next or any other empty queuing GUI icon slot (e.g., 414f as indicated by the arrow 418) by tapping the selected slot, which would direct the user to the media component selection screen 416 (shown in FIG. 4C). As indicated above, the number of empty queuing GUI icon slot 414 within the playlist 344 is not limited to the illustrated six within the viewable area of the screen, and as further indicated above, this create message screen 412 may include scrolling capability that allows users to view more empty queuing GUI icon slot 414 by simple stroke of the finger to scroll into the viewable area additional empty queuing GUI icon slot 414 (414g to 414j), shown in FIG. 4G-7 to add more electronic media components to the electronic message 302 being composed.

In the exemplary instance shown in FIGS. 4G-6 and 4G-7, the user may select to add an electronic media component 236 such as voice message 210 (from the screen 416 of FIG. 4C) to the electronic message 302 being composed. In other words, choosing to add the electronic media component 236 such as the voice message 210 would link this media type to the already composed message (shown in FIGS. 4G-6 and 4G-7) at the selected empty slot (e.g., 414*f*).

Upon selection (e.g., by tapping) of the voice message 210 electronic media component 236 in the electronic media component selection screen 416 (FIG. 4C), the user is directed to a corresponding display screen 476 for composing the voice message 210, a non-limiting example of which is shown in FIG. 4H-1. The voice message display screen 476 for the voice message 210 may include a voice message icon 210 where upon selection (e.g., tapping), directs users to well known conventional screen displays for recording of a voice message. Upon completion, the voice message 210 is added in the slot of the queuing GUI icon 414*f* of the create message GUI display screen 412 as illustrated in FIG. 4H-2.

As further illustrated in FIG. 4H-2, the user may still continue to further add additional electronic media components 236 to the electronic message 302 being composed in which case, the user may select the next or any other empty queuing GUI icon slot (e.g., 414*g* as indicated by the arrow 418) by tapping the selected slot (e.g., 414*g*), which would direct the user to the media component selection screen 416 (shown in FIG. 4C). In the exemplary instance shown, the user may select to add an electronic media component 236 such as rubber stamps message 223 (from the screen 416 of FIG. 4C) to the electronic message 302 being composed. In other words, choosing to add the electronic media component 236 such as the selected rubber stamps message 223 would link this media type to the already composed message (shown in FIG. 4H-2) at the selected empty slot (e.g., 414*g*) of the playlist 344.

Upon selection (e.g., by tapping) of the rubber stamps message 223 electronic media component 236 in the electronic media component selection screen 416 (FIG. 4C), the user is directed to a corresponding display screen 471 for composing the rubber stamps message 223, a non-limiting example of which is shown in FIG. 4H-3. The rubber stamps display screen 471 for the rubber stamps message 223 may include a rubber stamp icon 223 where upon selection (e.g., tapping), directs users to a rubber stamp categories display screen 473 shown in FIG. 4H-4, which may display a large category of different types of rubber stamps from which the user may choose. As shown by the arrow 418, in the non-limiting exemplary instance, the user has selected the rubber stamps category 475, which directs the user to the next, corresponding display screen 477 that includes a large number of rubber stamps icons within the selected rubber stamps category 475, shown in FIG. 4H-5. Upon selection (as indicated by the arrow 418, by tapping for example) of the desired rubber stamp 479, the end user is directed to the next, preview display screen 481 for that particular selected rubber stamp 479, shown in FIG. 4H-6. The user may select the Add GUI icon 406 to add the selected rubber stamp 479, which then directs the user to the finally selected rubber stamps message display screen 474 shown in FIG. 4H-7, where upon selection of the Done GUI icon 407, the selected rubber stamp 479 is added in the slot of the queuing GUI icon 414*g* of the create message GUI display screen 412 as illustrated in FIG. 4H-8. Upon choosing to add an additional electronic media component 236 to the electronic message 302, the already composed rubber stamps message 223 is stored within client records 342 in a storage unit 162 of the first client-device 108 and displayed within the playlist 344 in the create message GUI display screen 412, exemplarily shown in FIG. 4H-8. FIGS. 4B and 4H-8 illustrate the same display screen 412, with FIG. 4H-8 showing the added rubber stamps message 223 within the empty slot 414*g* (FIG. 4B).

As further illustrated in FIG. 4H-8, the user may continue to add additional electronic media components 236 to the electronic message 302 being composed in which case, the user may select the next, empty queuing GUI icon slot 414*h* (as indicated by the arrow 418) by tapping the slot 414*h*, which would direct the user to the media component selection screen 416 (shown in FIG. 4C). In the exemplary instance shown, the user may select to add an electronic media component 236 such as polling message 214 (from the screen 416 of FIG. 4C) to the electronic message 302 being composed. In other words, choosing to add the electronic media component 236 such as the selected polling message 214 would link this media type to the already composed message (shown in FIG. 4H-2) at the empty slot 414*h* of the playlist 344.

Upon selection (e.g., by tapping) of the polling message 214 electronic media component 236 in the electronic media component selection screen 416 (FIG. 4C), the user is directed to a corresponding create new polling message display screen 478 for composing the polling message 214, a non-limiting example of which is shown in FIG. 4I-1. The pollster may select a multiplicity of media types, for example, select two photos and a video, plus a peculiar sound file, and format and impose a polling inquiry for the selected contacts to provide a polling response in relation to the polling inquiry regarding all the media in the polling survey. The create new poll display screen 478 includes a text area 480 for the polling inquiry, which may be composed by any well known conventional manner such as typing or by voice. Tapping the text area 480 would bring up a soft-keyboard in a conventional manner, and tapping the microphone GUI icon 482 would commence conversion of speech to text of the user and type the text within the text area 480. As further illustrated in FIG. 4I-1, the create new polling display screen 478 further includes a set of empty GUI polling slots 484 that may be tapped to select and load content (any digitally saved electronic media component, including draw/animation, video, etc.) from various storage solutions for polling. It should be noted that the create new poll screen 478 has scrolling capability that may be used to view additional empty GUI polling slots 484 not shown within the viewable area of the display screen 478.

Upon selection (e.g., tapping) of any one of the empty GUI polling slots 484, the users are directed to a select media type display screen 486 to load content within the selected empty GUI polling slots 484. As shown by the arrow 418, in the non-limiting exemplary instance, the user has selected the photo/video media type, which directs the user to the next, corresponding display screen 488 that includes the various sources (storage systems) for that type of media such as photos stored within a camera, online, and so on, shown in FIG. 4I-3. Upon selection (as indicated by the arrow 418, by tapping for example) of the online source, the end user is directed to the next, display screen 490 for all online accounts of the user that may include video or a photo, shown in FIG. 4I-4. There, the user may simply select the desired source from which the photo or a video is to be loaded within the selected empty GUI polling slot 484. Upon selection of the desired source (e.g., some online social media), the user may simply select the desired photo or video from that particular online social media (FIG. 4I-5) from the display screen 490 of that particular online social media, and select (FIG. 4I-6) to load that selected content (from the online social media screen 494) within the GUI polling slot 484 (in this instance, GUI polling slot 484*a*), shown in the preview polling message display screen 496 of FIG. 4I-7. As illustrated in FIG. 4I-7, the users may process other empty GUI polling slots 484 to load other content such as music, or any other media type by accessing various sources for content. Upon selection of the Done GUI icon 407, the polling message 214 is added in the slot of the queuing GUI icon 414*g* of the create message GUI display screen 412 as illustrated in FIG. 4I-8. FIGS. 4B and 4I-8 illustrate the same display screen 412, with FIG. 4I-8 showing the added polling message 214 within the empty slot 414*h* (FIG. 4B).

It should be noted that at the create new polling display screen 478 (FIG. 4I-1), upon tapping onto an empty GUI polling slot 484, the users may simply be provided with a GUI that asks to select the storage within which the desired content is stored, very similar to conventional uploading of a file where the users select to open or access the storage (such as hard-drive, online storage, flash, or any other storage system) to retrieve content from the selected storage and load the content within the selected empty GUI polling icon 484 without having to first select the media type (such as the one shown in FIGS. 4I-2 and 4I-3).

As further illustrated in FIGS. 4I-9 and 4I-10, the polling results may be provided to one or more end-users (the receivers of the message) based on one or more criteria, non-limiting, non-exhaustive examples of which are provided in the results view display screens 498 and 401 shown in respective FIGS. 4I-9 and 4I-10. In the particular instance illustrated in FIG. 4I-9, the criteria selected is forwarding of the results of the polls after certain date, which may be set in the next display screen shown in FIG. 4I-10. Selecting next GUI icon button on the display screen 401 in FIG. 4I-10 will direct user to a preview screen shown in FIG. 4I-7. Therefore, the electronic message 302 with the poll is forwarded to all recipients, but the distribution of the results of the polls is controlled. This enables the composer of the poll to maintain the polling results confidential based on a desired criteria.

FIGS. 4I-11 and 4I-12 are non-limiting exemplary illustration of a polling message that uses text only. As illustrated in FIG. 4I-11, in a text based polling message display screens 403, the end users are provided with several empty GUI icons 484 in text box format within which they can add text. In this non-limiting exemplary instance, the composer of the text based polling message has made the simple text inquiry at 480, and provided the poll that includes the voting options of 484*a* to 484*d* about dinner. For example, a user may poll family members about what type of dinner they desire, or a polling inquiry may be made about the type of artist they like. FIG. 4I-12 is the preview of the composed text based polling message prior to sending. FIGS. 3H and 3I are the respective recipients view for voting and voting results, which are discussed above.

As further illustrated in FIG. 4I-8, the user may continue to add additional electronic media components 236 to the electronic message 302 being composed in which case, the user may select the next, empty queuing GUI icon slot 414*i* (as indicated by the arrow 418) by tapping the slot 414*i*, which would direct the user to the media component selection screen 416 (shown in FIG. 4C). In the exemplary instance shown, the user may select to add an electronic media component 236 such as draw/animation message 206 (from the screen 416 of FIG. 4C) to the electronic message 302 being composed. In other words, choosing to add the electronic media component 236 such as the selected draw/animation message 206 would link this media type to the already composed message (shown in FIG. 4I-2) at the empty slot 414*i*.

The draw/animation message 206 allows users to draw and animate a drawing figure on a blank digital canvas or on top of an electronic media component 236 such as a picture, video, etc. The most basic element of the animations is the ability to draw images using finger, stylus, or other controller depending on the particular device.

As detailed below, the draw/animation message 206 of the present invention uses layers, frames, and transitions to provide the ability of animating a drawing. Layers (which are transparent) allow users to add new elements in a new layer on top of previous elements, which allows the drawings to be animated without having to redraw the entire image. Frames are used for controlling the time flow of each image. A transition is a pre-defined animation that can be used to fade in or fade out a frame. Each transition has a basic set of "properties" that are applied to it, such as how fast the transition should take place, what direction to move, etc.

The present invention uses key frames (which are very well-known and documented in animation applications) drawings for control of a frame, and applies key frames to all layers. Each key frame defines how the end result of that key frame will appear on screen, and the application fills in the rest of the animation to get to that point. This allows the user to control the time flow, without adding complexity to the user content creation system.

As detailed below, the draw/animation message 206 also allows for the use of premade content. For example, the ability to add pre-created content items such as Comicons, Comix, Rubber Stamps, text Callouts, colorcon, and etc. to animation. These items like a regular drawing can be added to a layer and then animated with transitions as well. The user can choose any one of these items, or multiples of them and place them on their animation. Each item is maintained as a layer within a frame and it is able to be animated, modified, etc.

The draw/animation message 206 also supports the addition of recorded voice messages. Part of the animations and videos is the ability to record a voice or other sounds using phone or computer microphone. This allows users to create character voices, or superimpose their voice into animation or video clips, etc.

The draw/animation message 206 further supports superimposing of animation onto a picture or video background. In other words, users select a picture or a video to use as the background canvas for their animation. This picture or video may be loaded from any source such as a phones camera, local storage, or download pictures/videos from social media to incorporate into the animation.

Referring back to FIG. 4C, upon selection (e.g., by tapping) of the draw/animation message 206 electronic media component 236 in the electronic media component selection screen 416 (FIG. 4C), the user is directed to a corresponding create new draw/animation message display screen 600 for composing the draw/animation message 206, a non-limiting example of which is shown in FIG. 4J-1. Upon selection of the draw/animation GUI icon 206 (e.g., tapping), the user is directed to the first draw/animation screen, which is a drawing display screen (canvas) 409 shown in FIG. 4J-2.

The blank drawing display screen 409 has a scrolling capability on a tool bar section 441 to bring into view various additional drawing tools, and includes a brush GUI icon 413, where upon selection (e.g., tapping) of the brush icon 413, the user is provided with a brush size palette 421 (FIG. 4J-3) from which the user may choose (e.g., by tapping) the desired brush size (e.g., brush size 423) in order to commence drawing (e.g., by finger) the animation (e.g., a mountain 425) shown in FIG. 4J-4. As further illustrated in FIG. 4J-4, stroking the tool bar 441 scrolls other drawings tools within the viewable area of the display screen shown in FIG. 4J-5 from which the user may select. Non-limiting, non-exhaustive examples of drawing/animation tools provided for draw/animation message 206 may include well known conventional tools in addition to others such as brush 413, color palette 415, callouts 433 (FIG. 4J-5), comix 208, voice record 210 (that may accommodate the animation), rubber stamps 223 (discussed above), pictures 429 (which may be loaded from different sources to add animation thereon), layers and transitions 427, and all of the other electronic media components 236 detailed above (e.g., comicon 212, emoticon 220, sound effects 221, text 204, etc.), and others. Accordingly and as detailed below, the present invention provides both direct access to various electronic media components 236 as discussed above or, alternatively, as detailed below, the user may access the electronic media components 236 through the draw/animation message 206, which provides uses with the ability to modify (e.g., resize, crop, rotate, etc.) the electronic media components 236.

Referring back to FIG. 4J-5, additional drawing/animation may be added to the already illustrated "mountain" drawing 425 using layers and transitions to provide the animation of the drawing components. Layering and transitions are very well known and have been used in various professional graphics applications. After the first drawing (e.g., mountain 425), users may further select layering and transition GUI icon 427 (shown in FIG. 4J-5), where upon selection, commonly well known layer and transition tools (FIG. 4J-6) are provided to the users so that the users may add further drawings onto different layers. It should be noted that by default, all drawings include layering, with the first drawing/animation (shown in FIGS. 4J-4 and 4J-5) formulated on the first layer by default. As illustrated in FIG. 4J-6, the user may select a cell (e.g., cell 435a) by tapping the cell GUI icon 435, which in this exemplary instance, is the very first cell of the first frame of the first layer. Upon selecting the desired cell, a rectangular selection box 437 may appear on the drawing display screen 409 where the users may resize, rotate, move, or perform other well known drawing/animation functions found in most professional graphics applications.

As further illustrated in FIGS. 4J-6 and 4J-7, selection of the add layer GUI icon 439 adds another layer (in this instance a second layer) to the draw/animation message 206 shown in FIG. 4J-7, "fading" or graying-out the first layer (which has the illustration of a mountain 425), while adding another cell GUI icon 435b within the second layer. The icon 445a is a representation of a frame (detailed below) within which the selected cell 435b is positioned. As illustrated, the layers may be organized within rows 437. By selecting the cell GUI icon 435b, the users are directed to the drawing display screen 409 shown in FIG. 4J-8 where the first layer (which includes the cell 435a, the illustration of a mountain 425) is grayed out, and the users are presented with the draw/animation message 206 tools bar 441 to use for additional drawing, which in this non-limiting instance, includes the use of the brush 413 to draw a cartoonish resemblance of a human 489 onto a second layer. After completing the FIG. 489, the users may scroll the tools bar section 441 to access the layering and transition GUI icon 427 and upon selection, the users are directed to the layering and transition tools shown in FIG. 4J-9.

As illustrated in FIG. 4J-9a, layering and transition tools now has two rows (or layers) 437a and 437b, and two columns (or frames) 443a and 443b, with a cell 435a in the first frame 443a of the first layer 437a, another cell 435b in the first frame 443a of the second layer 437b, and a final cell 435c added to the second frame 443b of the second layer 437b. It should be noted that frames may be added by selecting (e.g., tapping) onto a add frame GUI icon 451. The content of the cell 435c is illustrated in the drawing display screen 409, with contents of other cells gray-out. In cell 435c, the drawn layer at cell 435b is simply copied and moved to show a movement (animation) of the person 489 going on top of the mountain 425. Moving the illustrated person 489 is accomplished when the cell 435c is selected, which allows the entire, already drawn feature to be tapped or selected and moved.

The type of transition desired from frame 443a to 443b (i.e., cell 435b to 435c) may be accessed by selecting the transition GUI icon 447, which directs the user to select any one of a plurality of well-known transitions shown in the transition menu GUI icons 449 shown in FIG. 4J-10. However, the transition GUI icon 447 may automatically be replaced by specific types of transitions if the drawing is manipulated. For example, if and when the cartoon depiction of the human 489 is moved on top of the mounting, the "move" transition GUI icon 447a automatically replaces the generic transition GUI icon 447 shown in FIG. 4J-9b. Other non-limiting, exemplary means to automatically replace the transition GUI icon 447 may include rotating the object, resizing it, and so on. As indicated above, the concept of layering, frames, and transitions are well known and used in most professional graphics applications. Selecting a desired transition type (e.g., transition GUI icon 453) from the transition menu GUI icons 449 will replace the transition icon 447 (FIG. 4J-9a) with that selected transition GUI 453, which is added to the move transition 447a and illustrated in FIG. 4J-11 as GUI 447b shown as number "2" since there are now two transitions, one the move transition 447a and the other the GUI icon 453. The drawing/animations illustrated in FIGS. 4J-1 to 4J-11 will play a cartoon of a human 489 moving on top of the mountain 425, with a desired transition type between frames 443a and 443b and sound (detailed below). It should be noted that as is well known, the transitions may be modified by users (e.g., their duration and various effects thereof).

It should be noted that the cells 435 within any frame and layer may include (or store) any type of digital content. For example, instead of using or starting with an empty canvas (empty display screen 409) as the default first layer, users may easily import (load) pictures, videos, or other media types 236 as the first layer within the first frame. This way, the drawing animations may be done on the imported (loaded) media component 236 within the second layer, with the media component 236 on the first layer. Of course, the media component 236 (e.g., a picture) may be loaded onto a cell of any frame of any layer.

As further indicated in FIG. 4J-11, one or more sound files 455 may be also be added to the animation. In general, the sound files may be generated by any means or loaded up onto the draw/animation message 206 by conventional methods from any storage source. In general, a sound file is a continuously executable file that has a fixed, continuous duration that commences at a first time and ends at a second time, and cannot be "broken down" into frames. In other words, a sound file is a finite time object like a video. Accordingly, a sound file may be selected to commence executing at any desired frame (e.g., frame 443*a* or 443*b*), after which, the sound file will end depending on the sound file duration, independent of any other layer, frames, transitions, etc., and hence the reason sound files or any other such finite time objects are represented as an independent layer. In the exemplary illustration of FIG. 4J-11, the sound file 455 is selected to commence at frame 443*a* and is illustrated to end at the second frame 443*b*. However, if for example, the transition 453 has a duration that is too long (e.g., longer than the sound file), the sound file 455 will still start at the selected frame 443*a*, but may end at the middle of the second frame 443*b* or even in the middle of the transition 453 while the transition 453 is executed. It should be noted that video files or any other objects with finite time may be added to draw/animation message 206, similar to sound files where the video or other finite time object will be within its layer and may be started at a desired frame.

Upon selection of the Done GUI icon 407, the draw/animation message 206 is added in the slot of the queuing GUI icon 414*i* of the create message GUI display screen 412 as illustrated in FIG. 4J-14. FIGS. 4B and 4J-14 illustrate the same display screen 412, with FIG. 4J-14 showing the added draw/animation message 206 within the empty slot 414*i* (FIG. 4B) of the playlist 344 of the electronic message 302.

As indicated above, the present invention provides the ability for users to directly access various electronic media components 236 as discussed above or, alternatively, the users may access the electronic media components 236 through the draw/animation message 206, which provides uses with the ability to modify (e.g., resize, crop, rotate, etc.) the electronic media components 236 and forward it as part of the draw/animation message 206.

FIGS. 4J-15 to 4J-19 are non-limiting, exemplary illustrations of accessing an electronic media component and modifications thereof via draw/animation message 206, rather than direct access as described above. As illustrated in FIG. 4J-15, for example, a rubber stamp message 223 may be access by tapping the rubber stamp GUI icon 223 within the tool bar section 441 of draw/animation message 206, composed and sent as draw/animation message 206 or, alternatively, integrated within an already drawn animation shown in FIG. 4J-16. Selecting the rubber stamp message 223 within draw/animation 206 of FIG. 4J-15 directs users to the GUI display screens FIGS. 4H-4 to 4H-7 described in detail above for selection of the desired rubber stamp, which exemplarily results in the selected rubber stamp 479 shown in FIG. 4J-16. By selecting (e.g., tapping) any corner 491 of the rubber stamp 479 shown in FIG. 4J-16, the users may rotate, crop, resize, and further modify the selected media component 236. As best illustrated in FIG. 4J-17, the selected media component 236 (in this exemplary instance the selected rubber stamp 479) is accommodated within the cell 435*d* of frame 443*a* of layer 437*c* where when the draw/animation message 206 is executed, the cell 435*d* will be the last frame to execute.

FIGS. 4J-18 is a non-limiting exemplary illustration of a comix message 208 accessed via draw/animation message 206 to enable modification and or incorporation of a selected comix within animation. As with rubber stamps (in relation to FIGS. 4H-4 to 4H-7), after selecting the comix message GUI icon 208 within the tool bar 441 of FIG. 4J-18 (which only shows the comix message GUI icon 208 for clarity), the specifically desired comix message 208 may be then selected with its respective display screens (shown FIGS. 4D-2 to 4D-5). FIG. 4J-19 is a non-limiting exemplary illustration of a callout message 433 accessed via draw/animation message 206 to enable modification and or incorporation of a selected callout message within animation, and as with other examples, functions in the same manner, with the additional step of allowing users to modify the content (or text) of the callout.

As indicated above, the electronic media components 236 such as comix message 208 or callout 433 or others may be composed and sent without any other electronic media component as a stand alone message via draw/animation 206 or in combination and incorporated within drawings as shown in FIG. 4J-18 and FIG. 4J-19 or, alternatively, accessed directly, composed and sent as indicated above (e.g., for comix 208 in relation to FIGS. 4D-1 to 4D-5).

Referring back to FIG. 4J-14, as further illustrated, the user may continue to add additional electronic media components 236 to the electronic message 302 being composed in which case, the user may select the next or any other empty queuing GUI icon slot (e.g., 414*j* as indicated by the arrow 418) by tapping the slot 414*j*, which would direct the user to the media component selection screen 416 (shown in FIG. 4C). In the exemplary instance shown, the user may select to add an electronic media component 236 such as video message 216 (from the screen 416 of FIG. 4C) to the electronic message 302 being composed. In other words, choosing to add the electronic media component 236 such as the selected video message 216 would link this media type to the already composed message (shown in FIG. 4I-2) at the empty slot 414*j*.

Referring back to FIG. 4C, upon selection (e.g., by tapping) of the video message 216 electronic media component 236 in the electronic media component selection screen 416 (FIG. 4C), the user is directed to a corresponding create new video message display screen 483 for composing the video message 216, a non-limiting example of which is shown in FIG. 4K-1. Upon selection of the video GUI icon 216 (e.g., tapping), the user is provided with a GUI to load the desired video from a storage source in a well-known conventional manner, and directed to the first video screen, which is a shown in FIG. 4K-2.

FIGS. 4K-2 to 4K-6 are non-limiting, exemplary illustrations of video messaging 216, which may be accessed by methods described above and added to the overall electronic message 302. The video portion of the present invention maintains many of the features of the draw/animation message 206 with its ability to add electronic media components 236 such as Comix, Comicons, Rubber Stamps, callouts, Voice Recordings, and etc. It differs from draw/animation message 206 primarily in the manner that it handles time management. Instead of using a frame system like the draw/animation message 206, the video message 216 is timed based off the actual timing of the movie.

The timeline control 457 for the video allows the user to move to any particular point in a video. They can then place one or more electronic media components 236 on the screen at this time point (shown in FIG. 4K-3). Each electronic media component is treated as a separate layer (the same as the animation) and has a specific start and stop point for which it can be displayed during the video. The timing of the start and stop points are based off of the actual timing of the video. Transitions are applied to each electronic media component 236 so that they can have an in and an out transition, such as fade in, fly out, or they can be set to rotate 360 degrees over the duration of their display, etc.

Video Effects can be applied to the video, these effects will provide basically styling to the video, such as setting the video to Sepia or Black and White, or application of dynamic effects such as "sketch" that will trace the outlines of objects on the video and make it look like a pencil sketch. The video may be selected from any source such as camera, albums, or online, and then can be cropped (GUI icon 459) to start and stop to play only the portion that is desired to be shown in the message.

Upon selection of the add GUI icon 406 (FIG. 4K-5), the video message 216 is added in the slot of the queuing GUI icon 414*j* of the create message GUI display screen 412 as illustrated in FIG. 4J-14. FIGS. 4B and 4K-7 illustrate the same display screen 412, with FIG. 4K-7 showing the added video message 216 within the empty slot 414*j* of the playlist 344 of the electronic message 302. By selecting the send GUI icon 410, the composed electronic message 302 with all of its constituent, integrated electronic media components 236 is forwarded to the second client device 108, which may be via the server 140, and played in the exact sequence, order, and arrangement composed.

The present invention provides the mechanism to maintain all the individual media components (e.g., comix, rubber stamps, etc.) of a video or draw/animation messages editable and then transmits them to the server so that they can be made compatible across all devices, which is accomplished by forwarding a complete project file as part of the message rather than sending a finalized, transcoded file. As the draw/animation or video message is build, the data is stored in raw (un-transcoded) form in a complex data object, this information contains for examples on a callout, the shape, color, size, position, and text of the callout item, or for a drawing layer the brush size, brush color, and x/y points at which to place that brush. When the recipient then receives the message, their copy of the application is retrieved from this data from the server to rebuild the animation or video project in memory of the client device. This also provides the unique ability to then use this received message as part of a new message to be sent, either a reply, or forwarding on to others, where the sender is able to access all or part of the original draw/animation or video message and make changes to it. For example, the receiver may wish to change what a callout says, or record his or her voice over, or change the way something is animated. This can be done without having to recreate the original draw/animation or video message from scratch. Accordingly, the present invention provides draw/animation and video messaging systems that are editable by the receiver (across any platform).

FIGS. 4L-1 to 4L-6 are non-limiting, exemplary illustrations of editing an electronic media component in accordance with the present invention. As illustrated, after playing a video or animation message (e.g., in the exemplar instance, the animation message 206 shown in FIG. 4L-1), users may select (e.g., by tapping as illustrated by the arrow 418) the save GUI icon 411 to save the video or animation message, which would direct users to the save GUI display screen 602 for video and animation shown in FIG. 4L-2.

The save GUI display screen 602 exemplarily shown in FIG. 4L-2 includes a text box area 604 that would enable users to enter a name for the received video or animation message and save it under that name by selecting the save GUI icon 606 (the user may also optionally cancel the save by selecting the illustrated cancel GUI icon 608). It should be noted that the entire video or animation message is saved, including any other associated media components 236 such comix, comicon, etc. that was composed by the sender of the message on the server, readily accessible by recipients. Once the video or animation message is saved, it may be retrieved, edited, and sent.

In order to retrieve a saved video or animation message, the user may simply access the create new draw/animation message display screen 600 (shown in FIG. 4J-1) or the create new video message display screen 483 (shown in FIG. 4K-1) as described above. As illustrated in FIG. 4L-3 however, if a message (video or draw/animation) has been saved previously, the create new video or draw/animation screens (e.g., the draw/animation screen 600 shown in FIG. 4L-3), will also include a Saved Files GUI icon 610. Upon selection (e.g., by tapping) the Saved Files GUI icon 610, the users are directed to a list of saved messages 612 (e.g., video or draw/animation), which is illustrated in FIG. 4L-4. Tapping a desired saved message (e.g., 614) and choosing the select GUI icon 616 in FIG. 4L-4 will simply retrieve and open the saved message as illustrated in FIG. 4L-6. However, if the actual saved message (e.g., 614) is tapped only, the message will be simply retrieved and played (as illustrated in FIG. 4L-5), after which, the users are directed to the display screen shown in FIG. 4L-6. Tapping the message 614 on the display screen of FIG. 4L-6, will open the application in the edit mode similar to illustrations shown in FIG. 4J-2 to 4J-19 for the draw/animation message. If the message 614 is a video message, then tapping it would direct users to screen displays 4K-2 to 4K-6. As Further illustrated in FIG. 4L-6, the edited message may than be added as an electronic media component 236 to an electronic message 302 by selecting the Add GUI icon 406 or, alternatively, the edited message may simply be sent by selecting the send GUI icon 410.

As detailed above, an electronic media component 236 may be comprised of a compilation of one or more media, with each media element comprised of one or more data. In particular, an electronic media component may comprise for example, data for photo (e.g., data associated with a JPEG file) or data in a sound file, or alternative, may comprise data that facilitates in creation, delivery, execution, and display of a more complex set of multiplicity of electronic media elements such as electronic media components polling message or animation. For example, an electronic media component such as animation may include several data that define a transition from one frame of an animation to another or brush size, etc. For example, data that instruct a computer processor to execute content of a first frame and then the next, second frame, with some delay. Further (and continuing with the draw/animation message 206 example), the frames themselves may contain data (e.g., in a JPEG file) related to a set of electronic media components such as photos to be displayed within the frames of the animation or other media components such as comix. As another example, the electronic media component such as the polling message may include data comprised of several other electronic media components such as photos associated with a text media component that defines the polling inquiry. The same polling message electronic media component will also include data that facilitates in creation, delivery, execution, and display of the polling message such as data that facilitate in counting of the votes, display of the results, and so on, which support the polling message functionality. Therefore, an electronic media component is and may comprise of many pieces of information (or data) that may need to be tracked, accounted for, and contained so to be seamlessly executed in the order, arrangement, and sequence as a scripted digital content as intended by the composer of the message. Accordingly, the present invention provides a management scheme that enables tracking and accounting for all data related to the overall message as a whole. As stated above, the messaging system of the present invention uses a management scheme to manage electronic messages, including all the electronic media components of the electronic message and all associated data. The management scheme includes maintaining of records that function to keep track and account of each electronic message, its electronic media components, and all associated data from creation to receipt.

Figure 5A:
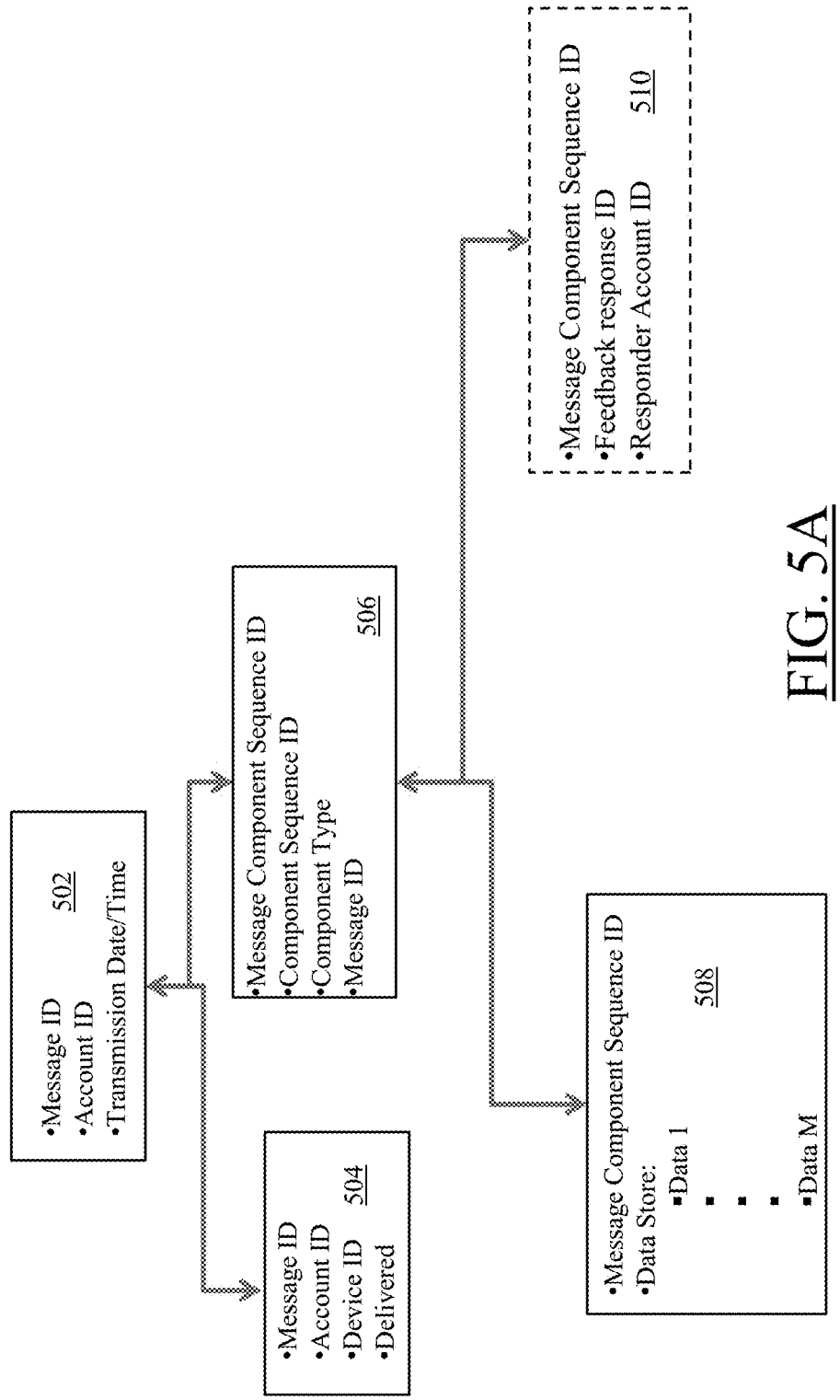
FIGS. 5A to 5C are non-limiting, exemplary block diagrams that schematically illustrate a management scheme for client and server records for tracking, accounting for, and containing data for an electronic message in accordance with the present invention.

As detailed above, the electronic media components 236 are stored in a storage unit 162 of the first client-device and displayed as playlist 344. The playlist 344 includes client records 342 (that also mimic server records 190) that have associated attributes generated and stored in the storage unit 162 of the first client-device and are associated with the electronic message 302 for seamless linking of multiplicity of electronic media components of the electronic message. FIG. 5A is non-limiting, exemplary block diagram that schematically illustrates a management scheme for client and server records for tracking, accounting for, and containing data for an electronic message in accordance with the present invention.

As illustrated in FIG. 5A, the client and server records are comprised of a message record 502 that is associated with the entirety of the electronic message 302. The message record 502 has a plurality of attributes that identify the entirety of the electronic message 302, non-limiting, non-exhaustive listing of examples of which may include a message ID for identifying the electronic message, an account ID for identifying a sender account from which the electronic message was sent, and a transmission date/time for identification of date and time at which the electronic message 302 was transmitted.

As further illustrated in FIG. 5A, the client and server records may further include one or more message component sequence record 506 for each electronic media component 236 of the electronic message 302, with a message component sequence record 506 associated with the message record 502 of the electronic message 302. The message component sequence record 506 has a plurality of attributes, non-limiting, non-exhaustive listing of examples of which may include a message component sequence ID for referencing and accounting for an electronic media component of the electronic message. Also included is an attribute related to a component sequence ID for identifying of order and sequence in which data of the electronic media component referenced and accounted by the message component sequence ID attribute is to be executed by the client-device. A further attribute of the message component sequence record 506 is component type for identifying the type of media of the electronic media component referenced and accounted by the message component sequence ID. Another attribute included with the message component sequence record 506 is the message ID that associates the message component sequence record 506 with the message record 502.

Additionally and as illustrated in FIG. 5A, the client and server records also include one or more message sequence data record 508 for containing actual data of the electronic media component 236. The message sequence data record 508 has a plurality of attributes, non-limiting, non-exhaustive listing of examples of which may include Data Store, values of which (Data 1 to Data M) is an actual data associated with the electronic media component, and the message component sequence ID identifying the order and sequence in which the data of message sequence data record referenced and accounted by the message component sequence ID attribute is to be executed by the client-device 108. It should be noted that the Data Store attribute may hold any type of data that is related to a message. So for example if it is a polling message, it will hold the polling inquiry, polling response, media that is to be polled (e.g., a photo), etc. Further, one or more message sequence data record 508 may include actual data associated with restrictions in relation to distribution of polling results that may be used by servers.

As also illustrated in FIG. 5A, the client and server records also include a message delivery record 504 that stores information related to the delivery of the electronic message 302. The message delivery record 504 has a plurality of attributes, non-limiting, non-exhaustive listing of examples of which may include—identify the message, the account from which the message is delivered, the client-device identification, and delivery to determine whether the message was actually delivered.

As further illustrated in FIG. 5A, the client and server records may further include optional one or more message feedback records 510 associated with the message component sequence record 506 of a message record 502 of the electronic message 302 for containing a voting record of a recipient of a polling inquiry, or editable media component of a draw/animation message, etc. It should be noted that the use of one or more message feedback records 510 depends on the electronic media component of the electronic message. For example, if the media comportment is a polling message where a response or feedback (e.g., vote) is required, then a message feedback record 510 may be used. The one or more message feedback records 510 have a plurality of attributes, non-limiting, non-exhaustive listing of examples of which may include identifying the message component sequence component ID, identification of the feedback response by the recipient; and responder account ID of the recipient of the poll. It should be noted that if the feedback record is used within the context of a polling message 214, the actual identification of the actual voter may be kept confidential by a variety of means that may facilitate the use of such polling message system in an actual election, meeting various legal requirement of different jurisdictions.

As further detailed above, the client records 342 (that also mimic server records 190) are communicated with a server 140, with the server 140 generating a set of values for the attributes of the both the client and server records (FIG. 5A), including values for tracking and accounting of the electronic message 302, which includes tracking and accounting of a composition of the electronic message 302, and order, arrangement, and sequence of the scripted digital content of the composed electronic message 302.

The set of values for the attributes of the records are saved in a server 140 storage unit 192 as server records 190 within the server 140, with the set of values for the attributes of the records transmitted by the server 140 back to the client-device. The set of values for the attributes of the records enable all entities to track and account the electronic message prior to actual transmission thereof, with the first client-device commencing uploading of the electronic message to the server 140 for delivery to the second client-device 108 upon receipt of the set of values for the attributes of the records. The electronic message 302 is delivered to the second client-device 108, and the second client-device plays the electronic message 302 in accordance with the server records 190. The server records 190 track and account of the electronic message 302 (intended by the client records 342), including the order, arrangement, and sequence of play of the multiplicity of electronic media components constituting the integrated digital content of the electronic message 302.

Figure 5B:
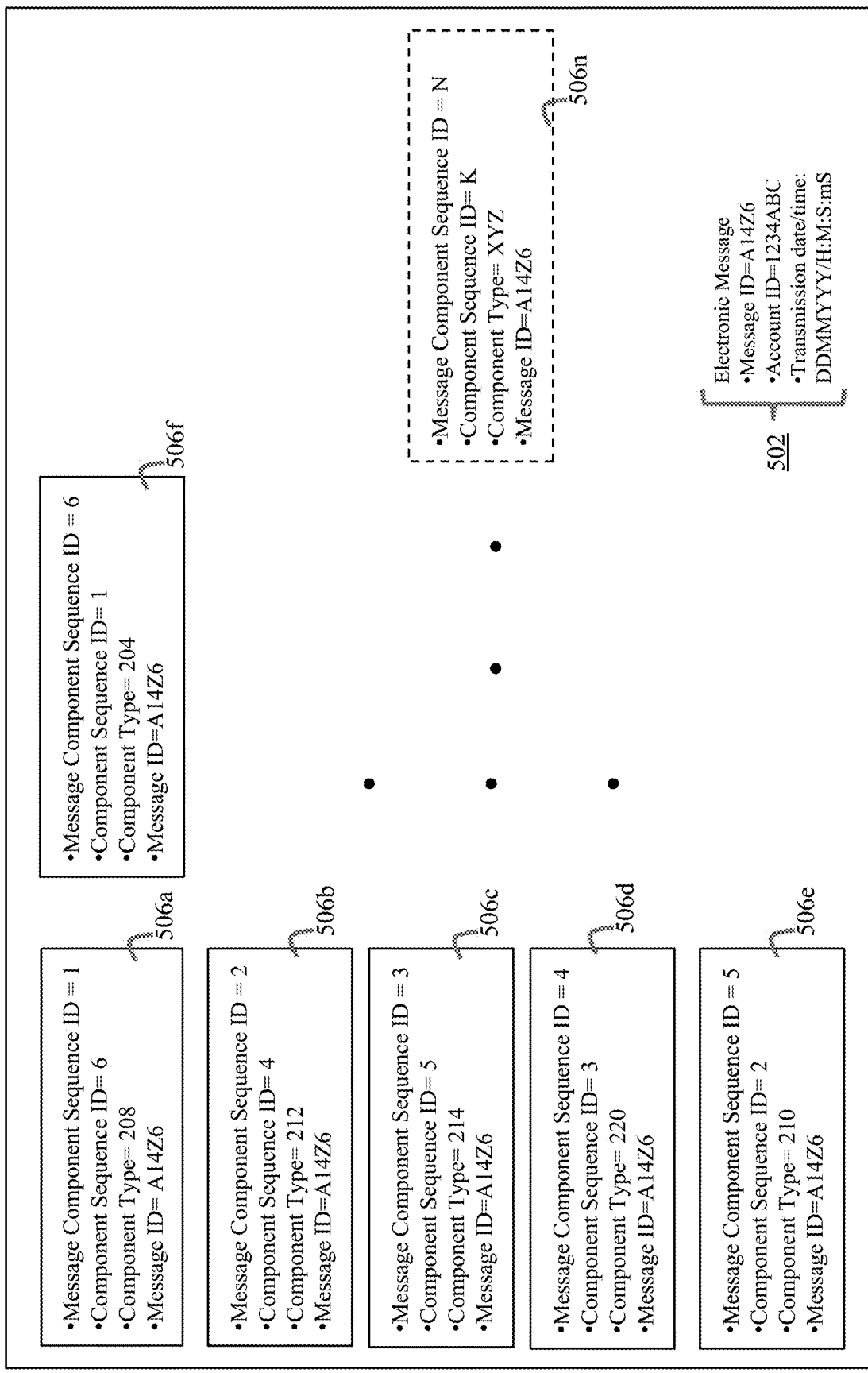

FIG. 5B is a non-limiting, exemplary block diagram that schematically illustrates an anatomy of an exemplary electronic message in accordance with the present invention and in view of the management scheme illustrated in FIG. 5A. FIG. 5B is provided with very specific electronic media components 236 that were discussed in relation to FIG. 3A as part of the electronic message 302 with specific examples of attribute values that are mapped to the schematically illustrated block diagram of FIG. 5C.

As illustrated in FIG. 5B, the electronic message 302 (of FIG. 3A) has an associated message record 502 with the following exemplary attributes and values exemplarily tabulated in the below table 1.

TABLE 1

Electronic Message Record 502

| Attribute | Value |
| --- | --- |
| Message ID | A14Z6 |
| Account ID | 1234ABC |
| Transmission date/time | DDMMYYYY/H:M:S:mS |

The exemplary message record 502 in the above table 1 (and FIG. 5B) details that the electronic message 302 (the GUI of which is shown in FIG. 3A) has a message ID with an exemplary assigned value of (for example) "A14Z6," and is from the account with the exemplary assigned account ID (for example) "1234ABC," which was transmitted on some date and time. As further illustrated in FIG. 5B, the electronic message 302 of FIG. 3A further includes integrated digital content that is scripted by seamless linking of multiplicity of electronic media components 236, with each electronic media component 236 of the electronic message 302 comprising a message component sequence record 506 associated with the message record 502.

According to the GUI read message display screen 304 of FIG. 3A, there are a non-limiting, exemplary total of six (6) electronic media components 236 within the electronic message 302, with each receiving (or assigned) a message component sequence ID from one (1) to a total number of six (6), as indicated in FIG. 5B. Although message component sequence IDs may be distributed or assigned to the electronic media components 236 in any manner desired, it is preferred if the message component sequence IDs are assigned in accordance with the sequence (or order) with which each electronic media component is added to the electronic message 302. For example, as illustrated in FIG. 5B, the first electronic media component 236 added to the electronic message 302 of FIG. 3A is the comix message 208, which is assigned the message component sequence ID=1 for the message component sequence record 506a. The next media component 236 added to the electronic message 302 of FIG. 3A is the comicon message 212, which is assigned the message component sequence ID=2 for the message component sequence record 506b, and so on. Therefore, if there are "N" electronic media components 236 within an electronic message 302, then there would be "n" message component sequence record 506n, with "N" message component sequence IDs, indicating a total number of 1 to N electronic media components in an electronic message 302. Accordingly, the message component sequence ID attribute refers to the sequence or order in which a particular electronic media was actually added to the electronic message.

As stated above, as electronic media components 236 are added to the electronic message (as described in relation to FIGS. 4 to 4L-6), they are automatically assigned a message component sequence ID for each message component sequence record 506. In the exemplary instance illustrated in FIG. 5B, the composer of the electronic message 302 (the GUI of which is illustrated in FIG. 3A) may have added and composed the comix message 208 first, where message component sequence ID was assigned as one (1) for the message component sequence record 506a. However, after composing the electronic message 302, and prior to sending the message, the user may have decided to move around and rearrange the execution sequence, order, and arrangement of each electronic media component 236 as finally shown in FIG. 3A. Therefore, although the user may have composed and added the comix message 208 as the first electronic media component 236 of the electronic message 302, which is the reason the comix message 208 received the message component sequence ID=1 for the message component sequence record 506a, the user later finally moved comix message 208 to queuing slot where it would be the last component to execute, with the last components sequence ID=6 for the message component sequence record 506a. Accordingly, the component sequence ID attribute refers to the sequence, order, or arrangement within which that particular media component is to execute.

In this particular non-limiting, exemplary instance, the first electronic media component 236 of the electronic message 302 of FIG. 3A to be "read" is the text message 204 (indicated by the component sequence ID=1), which is represented by the message component sequence record 506f in FIG. 5B, with the message component sequence ID=6. This means that the text message 204 was the sixth electronic media component 236 added to the electronic message 302, but it is to be executed first because it is assigned the component sequence ID=1. As described above, the user may have added the text message 204 to the electronic message 302 as the last electronic media component 236 (and hence the reason for the message component sequence ID=6). However, prior to sending the message 302, the user may have moved the text message 204 to the first queuing slot, where the message was assigned (or reassigned) component sequence ID=1 so to be the first electronic media component 236 of the electronic message 302 to be executed. As further indicated in the message component sequence record 506f, the electronic media component type is also tracked, which indicates that it is a text message 204, with the entire message component sequence record 506f associated with the electronic message record 502 through the message ID attribute that is assigned the value (for example) "A14Z6," which IDs the message record 502.

As further illustrated in FIG. 5B, the second electronic media component to be executed in accordance with FIG. 3A is the voice message 210, which has the message component sequence record 506e. As with the text message 204 described above, the user added the voice message 210 electronic media component 236 to the electronic message 302 as the fifth electronic media component 236 (and hence the reason for the message component sequence ID=5). However, prior to sending the message 302, the user may have moved the voice message 210 to the second queuing slot, where the message was assigned (or reassigned) component sequence ID=2 so to be the second electronic media component 236 of the electronic message 302 to be executed. As further indicated in the message component sequence record 506e, the electronic media component type is also tracked, which indicates that it is a voice message 210, with the entire message component sequence record 506e associated with the electronic message record 502 through the message ID attribute that is assigned the value "A14Z6," which IDs the message record 502.

As further illustrated in FIG. 5B, the third electronic media component to be executed in accordance with FIG. 3A is the emoticon message 220, which has the message component sequence record 506d. In this instance, the user added the emoticon message 220 electronic media component 236 to the electronic message 302 as the fourth electronic media component 236 (and hence the reason for the message component sequence ID=4). However, prior to sending the message 302, the user may have moved the emoticon message 220 to the third queuing slot, where the message was assigned (or reassigned) component sequence ID=3 so to be the third electronic media component 236 of the electronic message 302 to be executed. As further indicated in the message component sequence record 506d, the electronic media component type is also tracked, which indicates that it is a emoticon message 220, with the entire message component sequence record 506d associated with the electronic message record 502 through the message ID attribute that is assigned the value "A14Z6," which IDs the message record 502.

As further illustrated in FIG. 5B, the fourth electronic media component to be executed in accordance with FIG. 3A is the comicon message 212, which has the message component sequence record 506b. In this instance, the user added the comicon message 212 electronic media component 236 to the electronic message 302 as the second electronic media component 236 (and hence the reason for the message component sequence ID=2). However, prior to sending the message 302, the user may have moved the comicon message 212 to the fourth queuing slot, where the message was assigned (or reassigned) component sequence ID=4 so to be the fourth electronic media component 236 of the electronic message 302 to be executed. As further indicated in the message component sequence record 506b, the electronic media component type is also tracked, which indicates that it is a comicon message 212, with the entire message component sequence record 506b associated with the electronic message record 502 through the message ID attribute that is assigned the value "A14Z6," which IDs the message record 502.

As further illustrated in FIG. 5B, the fifth electronic media component to be executed in accordance with FIG. 3A is the polling message 214, which has the message component sequence record 506c. In this instance, the user added the polling message 214 electronic media component 236 to the electronic message 302 as the third electronic media component 236 (and hence the reason for the message component sequence ID=3). However, prior to sending the message 302, the user may have moved the polling message 214 to the fifth queuing slot, where the message was assigned (or reassigned) component sequence ID=5 so to be the fifth electronic media component 236 of the electronic message 302 to be executed. As further indicated in the message component sequence record 506c, the electronic media component type is also tracked, which indicates that it is a polling message 214, with the entire message component sequence record 506c associated with the electronic message record 502 through the message ID attribute that is assigned the value "A14Z6," which IDs the message record 502.

As further illustrated in FIG. 5B, the sixth electronic media component to be executed in accordance with FIG. 3A is the comix message 208, which has the message component sequence record 506a. In this instance, the user added the comix message 208 electronic media component 236 to the electronic message 302 as the first electronic media component 236 (and hence the reason for the message component sequence ID=1). However, prior to sending the message 302, the user may have moved the comix message 208 to the sixth queuing slot, where the message was assigned (or reassigned) component sequence ID=6 so to be the sixth electronic media component 236 of the electronic message 302 to be executed. As further indicated in the message component sequence record 506a, the electronic media component type is also tracked, which indicates that it is a comix message 208, with the entire message component sequence record 506a associated with the electronic message record 502 through the message ID attribute that is assigned the value (for example) "A14Z6," which IDs the message record 502.

Figure 5C:
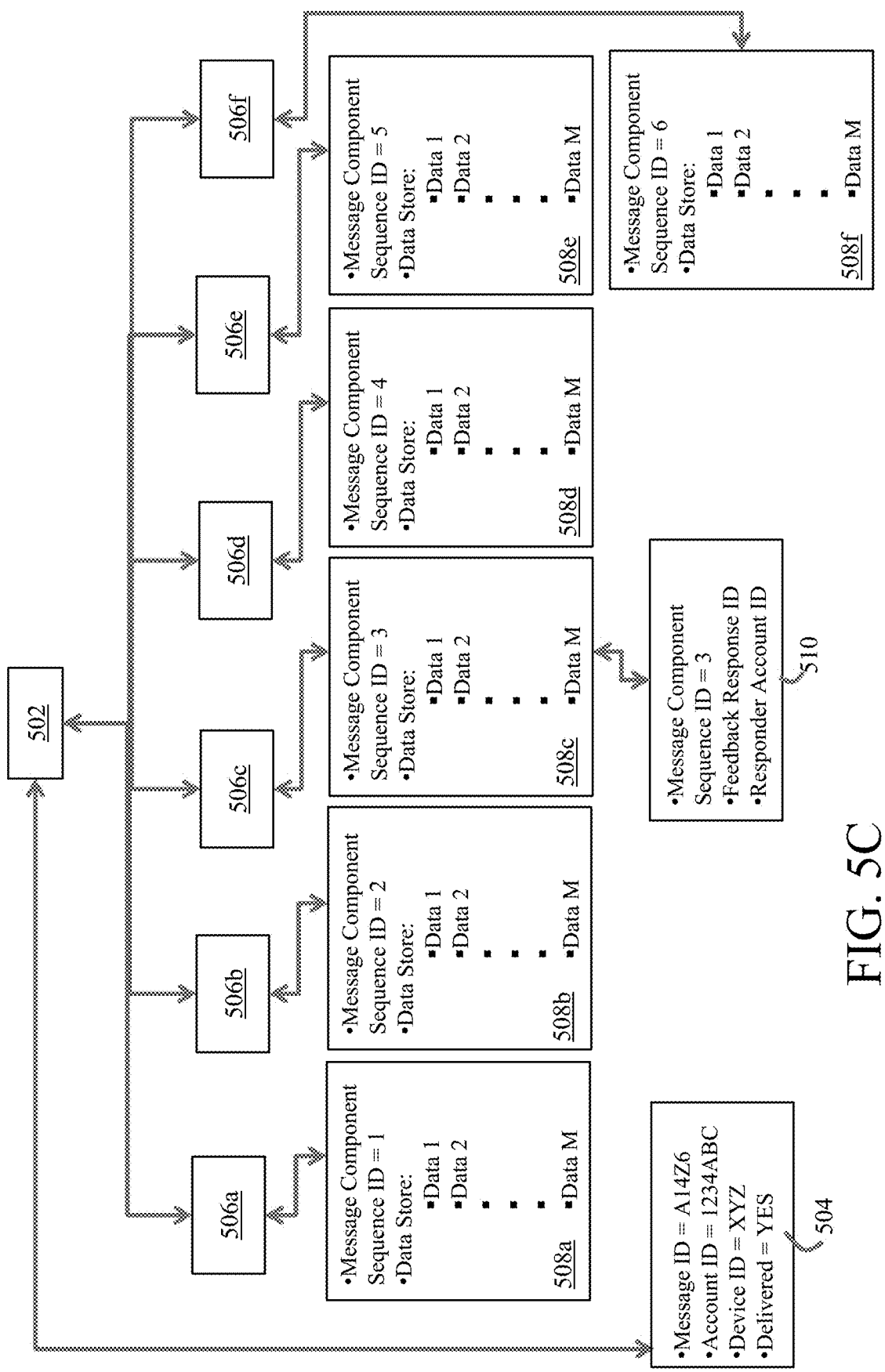

FIG. 5C maps the specific attributes of the records of the electronic message and its electronic media components illustrated in FIG. 5B onto the schematically illustrated management scheme shown in FIG. 5A. As stated above, the client and server records are comprised of one or more message sequence data records 508 for containing actual data of the electronic media component 236. As illustrated in FIG. 5C, the message sequence data record 508 has a plurality of attributes, including a Data Store, values of which (e.g., Data 1 to Data M) is an actual data associated with the electronic media component 236. The message component sequence ID is used to identify the order and sequence (by the component sequence ID) in which the data of message sequence data record 508 referenced and accounted by the message component sequence ID attribute is to be executed by the client-device.

As a more specific example, as illustrated in FIG. 5C, the message sequence data record 508c includes all data (Data 1 to Data M) associated with the message component sequence record 506c, which is the polling message 214. As illustrated in FIG. 3E, the data in the message sequence data record 508c may include files and data related to the photos that are shown in the vote poll display screen 214 of FIG. 3E, including the text question shown, and any other data the requires the rendering of the screen display shown in FIG. 3E. This principle is equally true for all other electronic media components 236, including more involved and complex-messaging applications such as the draw/animation message 206 and video message 216 discussed above.

As further illustrated in FIG. 5C, one or more message feedback record 510 used for containing a feedback record of a recipient associated with the message sequence data record 508c of the message component sequence record 506c. As indicated above, the message feedback record 510 has a plurality of attributes that identify the feedback record, including the message sequence component ID, which associates this feedback record 510 with the polling message 214 of FIG. 3A. The attribute feedback response is the identification of the feedback response by the recipient. For example, the feedback response ID may identify that the recipient of the message 302 as shown in FIG. 3E voted for the top-left FIG. 320. The responder account ID is the account information of the recipient that voted.

Referring now to FIGS. 1C and 5C, the server records 190 also track and account feedback responses and disseminate results of the feedback responses in accordance with a predetermined set of one or more criteria. In other words, for example, the tallying of votes (if feedback responses are votes) is done in the server. The set of criteria is provided to the server 140 as a set of instructions as part of client record data in message sequence data record 505c, which the server 140 then executes to determine conditions upon which a distribution decision is to be made with respect to the feedback (e.g., voting) results.

It should be emphasized that the message feedback record 510 is not limited to association with a polling message 214, but may be used with any other electronic media component 236 that may require feedback or input from recipients. For example, when sending a draw/animation or video message as an electronic media component 236 of an electronic message 302, the recipients of the draw/animation or video message may provide feedback in terms of modifying the data in the message sequence data record 508 (e.g., by redrawing the exemplary mountain 425 of FIG. 4J-4 to a different shape) associated with the message component sequence record 506 of the draw/animation message 206. In such an instance, the message feedback record is used to indicate which recipient modified which aspect of the draw/animation message 206.

As finally illustrated in FIG. 5C, the client and server records also include the message delivery record 504 that stores information related to the delivery of the electronic message 302. In the exemplary instance, message delivery record 504 has a plurality of attributes, including identify the message (in this case with a message ID=A14Z6), the account from which the message is delivered (e.g., Account ID=1234ABC), the client-device identification (Device ID=XYZ), and delivery to determine whether the message was actually delivered.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, the messaging system of the present invention may include any electronic media component 236, and should not be limited to those described above. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A messaging system, comprising:
 a source computing device configured to generate and transmit an electronic message having digital content sourced from a multiplicity of electronic media components, with the multiplicity of the electronic media components constituting the electronic message;
 wherein: the electronic message includes one or more electronic media component that is not predefined for and is not common to the source computing device and a receiver computing device;
 wherein: delivery and receipt of the multiplicity of the electronic media components are queued and seamlessly executed in original media component types and in an order intended by the electronic message at the receiver computing device;
 the source computing device includes:
 an input/output (I/O) module to enable selection, composing, and sequencing of electronic media components of the electronic message;
 a memory for storage of selected, composed, and sequenced electronic media components of the electronic message as client records;
 a communications interface that transmits the stored client records of the source computing device to a server device;
 the server device includes:
 a server communications interface that receives the transmitted client records;
 the server device generates a set of data values that further define the received client records;
 the set of data values enable the source computing device, the receiver computing device, and the server computing device to track and account for the electronic message, including the order of play of the multiplicity of the electronic media components of the electronic message, prior to actual transmission to the receiver computing device;
 a server storage module that stores the further defined client records as server records;
 the server device transmits at least a portion of the server records to the source computing device, with the source computing device transmitting the composed electronic message based on server defined client records to the receiver computing device via the server device.

2. A computer program product for a messaging system, the computer program product comprising a non-transitory computer-readable medium having computer program instructions stored therein for causing one or more computers to perform operations of:
 composing an electronic message using digital content sourced from a multiplicity of electronic media components at a source end, with the multiplicity of the electronic media components constituting the composed electronic message;
 wherein: the electronic message includes one or more electronic media component that is not predefined for and is not common to the source computing device and a receiver computing device;
 saving the electronic message as client records;
 transmitting the client records to a server;
 generating a set of values to further define the client records, enabling the source end, the receiver end, and the server to track and account for the electronic message, including the order of play of the multiplicity of the electronic media components of the electronic message, prior to actual transmission to the receiver end;

saving defined client records as server records;

transmitting at least a portion of the server records to the source end;

the source end delivering the composed electronic message based on the server defined client records to the receiver end via the server; and executing the multiplicity of the electronic media components at the receiver end in original media component types and in an order intended by the composed electronic message.

3. A method of messaging, comprising:

composing an electronic message with a computing device using digital content sourced from a multiplicity of electronic media components, with the multiplicity of the electronic media components constituting the composed electronic message and wherein: the electronic message includes one or more electronic media component that is not predefined for and is not common to the source computing device and a receiver computing device;

saving the electronic message as client records in a memory of the computing device;

transmitting the client records to a server;

generating a set of values to further define client records by the server, enabling the computing device, a recipient computing device, and the server to track and account for the electronic message, including the order of play of the multiplicity of the electronic media components of the electronic message, prior to actual transmission to recipient computing device;

saving the defined client records as server records;

transmitting at least a portion of the server records to the computing device;

transmitting the electronic message based on the server defined client records to the recipient computing device via the server;

executing the multiplicity of the electronic media components of the electronic message at the recipient computing device in original media component types and in an order intended by the composed electronic message.

4. The method of messaging as set forth in claim 3, wherein:

the method of composing the electronic message that is comprised of multiple electronic media components, includes:

queuing one or more electronic media components of the electronic message.

5. The method of messaging as set forth in claim 4, wherein:

queuing of the one or more electronic media components includes:

selecting an electronic media component;

composing the selected electronic media component of the electronic message;

adding the selected electronic media component to a queue of the electronic message.

6. The method of messaging as set forth in claim 5, further comprising:

displaying the queued electronic media components as a playlist, retrievable in a definite order.

7. The method of messaging as set forth in claim 6, wherein:

displaying of the queued electronic media components further includes displaying queuing GUI that allows for addition of a next, subsequent electronic media component of the electronic message.

8. A messaging system, comprising:

a source computing device configured to generate an electronic message having integrated digital content;

wherein the integrated digital content is scripted by seamless linking of a multiplicity of electronic media components without changing original media component types of the electronic media components, wherein an electronic media component is comprised of one or more electronic media elements, and wherein an electronic media element is comprised of one or more data;

wherein: the electronic message includes one or more electronic media component that is not predefined for and is not common to the source computing device and a receiver computing device;

the source computing device includes a memory for storage of selected, composed, and sequenced electronic media components of the electronic message as client records;

the source computing device includes a communications interface that transmits the stored client records of the source computing device to a server device;

the server device includes:

a server communications interface that receives the transmitted client records;

the server device generates a set of data values that further define the received client records;

the set of data values enable source computing device, destination computing device, and server computing device to track and account for the electronic message, including the order of play of the multiplicity of the electronic media components of the electronic message, prior to actual transmission to destination computing device;

a server storage module that stores the further defined client records as server records;

the server device transmits at least a portion of the server records to the source computing device, with source computing device transmitting the composed electronic message based on server defined client records to the destination computing device via the server device;

wherein delivery and receipt of the electronic message, with the multiplicity of electronic media components of the received electronic message at the destination computing device is seamlessly executed in an order intended by the scripted digital content in original media component types.

9. A messaging system, comprising:

a source computing device configured to generate and transmit an electronic message having integrated digital content;

wherein the integrated digital content is scripted by seamless linking of a multiplicity of electronic media components without changing original media component types of the electronic media components, wherein: the electronic message includes one or more electronic media component that is not predefined for and is not common to the source computing device and a receiver computing device;

the source computing device includes a storage module to store the electronic media components of the electronic message as electronic client records;

the source computing device transmits the electronic client records in the original format to a server;

the server further defines the electronic client records by generating a set of values for the attributes of the electronic client records, including values for tracking and accounting of the electronic message, which includes the sequence of the scripted digital content of the composed electronic message;

the server includes a server storage module that stores the further defined client records as server records;

the server includes a communications interface module that transmits the server defined client records to the source computing device, with the source computing device transmitting the composed electronic message based on the server defined client records to the destination computing device via the server device;

the destination computing device seamlessly executes the electronic message, including the electronic media components in the original media component types and in an order intended by the scripted digital content.

10. The messaging system as set forth in claim 9, wherein: the electronic media components are tracked and accounted for by the server.

11. The messaging system as set forth in claim 9, wherein: the electronic media components are stored in a storage unit of the source computing device and displayed as playlist by an output module of the source computing device.

12. The messaging system as set forth in claim 11, wherein:

the playlist is displayed as a graphic user interface (GUI) that displays a stored collection of electronic media components in a sequence defining an order of play of the stored collection of electronic media components at the destination computing device.

13. The messaging system as set forth in claim 11, wherein:

the playlist includes electronic client records that have associated attributes stored in the storage unit of the source computing device and are associated with the electronic message to seamlessly link the multiplicity of electronic media components of the electronic message.

14. The messaging system as set forth in claim 9, wherein the server records include attributes for determining whether the message was delivered.

15. A messaging system, comprising:

a source computing device configured to generate and transmit an electronic message having digital content sourced from a multiplicity of electronic media components, with the multiplicity of the electronic media components constituting the electronic message;

wherein: the digital content does not include a predefined media component common to both the source computing device and a receiver computing device;

wherein: delivery and receipt of the multiplicity of the electronic media components are queued and seamlessly executed in original media component types and in an order intended by the electronic message at the receiver computing device;

the source computing device includes:

an input/output (I/O) module to enable selection, composing, and sequencing of electronic media components of the electronic message;

a memory for storage of selected, composed, and sequenced electronic media components of the electronic message as client records;

a communications interface that transmits the stored client records of the source computing device to a server device;

the server device includes:

a server communications interface that receives the transmitted client records;

the server device generates a set of data values that further define the received client records;

the set of data values enable the source computing device, the receiver computing device, and the server computing device to track and account for the electronic message, including the order of play of the multiplicity of the electronic media components of the electronic message, prior to actual transmission to the receiver computing device;

a server storage module that stores the further defined client records as server records;

the server device transmits at least a portion of the server records to the source computing device, with the source computing device transmitting the composed electronic message based on server defined client records to the receiver computing device via the server device.

\* \* \* \* \*